(12) United States Patent
Lin et al.

(10) Patent No.: US 12,416,785 B2
(45) Date of Patent: Sep. 16, 2025

(54) OPTICAL IMAGING LENS

(71) Applicant: Genius Electronic Optical (Xiamen) Co., Ltd., Xiamen (CN)

(72) Inventors: Hai Lin, Xiamen (CN); Huabin Liao, Xiamen (CN); Jiayuan Zhang, Xiamen (CN); Hung-Chien Hsieh, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 686 days.

(21) Appl. No.: 17/836,650

(22) Filed: Jun. 9, 2022

(65) Prior Publication Data

US 2023/0204915 A1  Jun. 29, 2023

(30) Foreign Application Priority Data

Dec. 28, 2021 (CN) .......................... 202111624128.1

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ................ G02B 13/18; G02B 9/00–64; G02B 13/002–0045; G02B 3/04; G03B 30/00
See application file for complete search history.

(56) References Cited

U.S. PATENT DOCUMENTS

| 2019/0101728 | A1* | 4/2019 | Hsieh ................. G02B 13/0045 |
| 2021/0364745 | A1* | 11/2021 | Wang ....................... G02B 9/62 |
| 2022/0050267 | A1* | 2/2022 | Zhang ............... G02B 27/0081 |
| 2022/0050272 | A1* | 2/2022 | Lin .................... G02B 13/0045 |

* cited by examiner

*Primary Examiner* — Jonathan Y Jung
(74) *Attorney, Agent, or Firm* — Chen Yoshimura LLP

(57) ABSTRACT

An optical imaging lens may include a first lens element, a second lens element, a third lens element, a fourth lens element, a fifth lens element, a sixth lens element, a seventh lens element and an eighth lens element positioned in an order from an object side to an image side. Through designing concave and/or convex surfaces of the lens elements, the optical imaging lens may increase resolution, enlarge aperture stop and image height, and maintain well image quality.

20 Claims, 46 Drawing Sheets

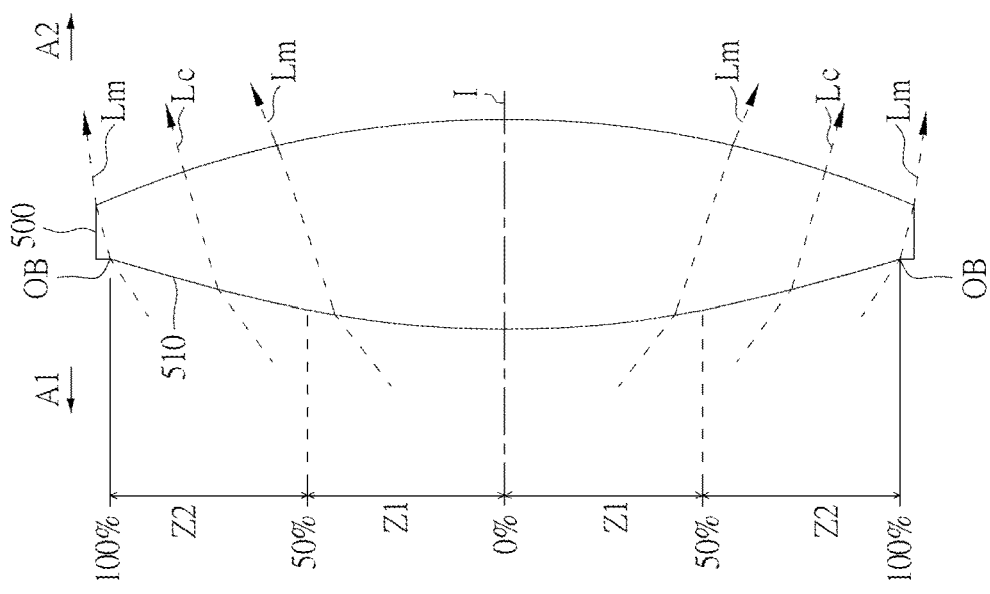
FIG. 5
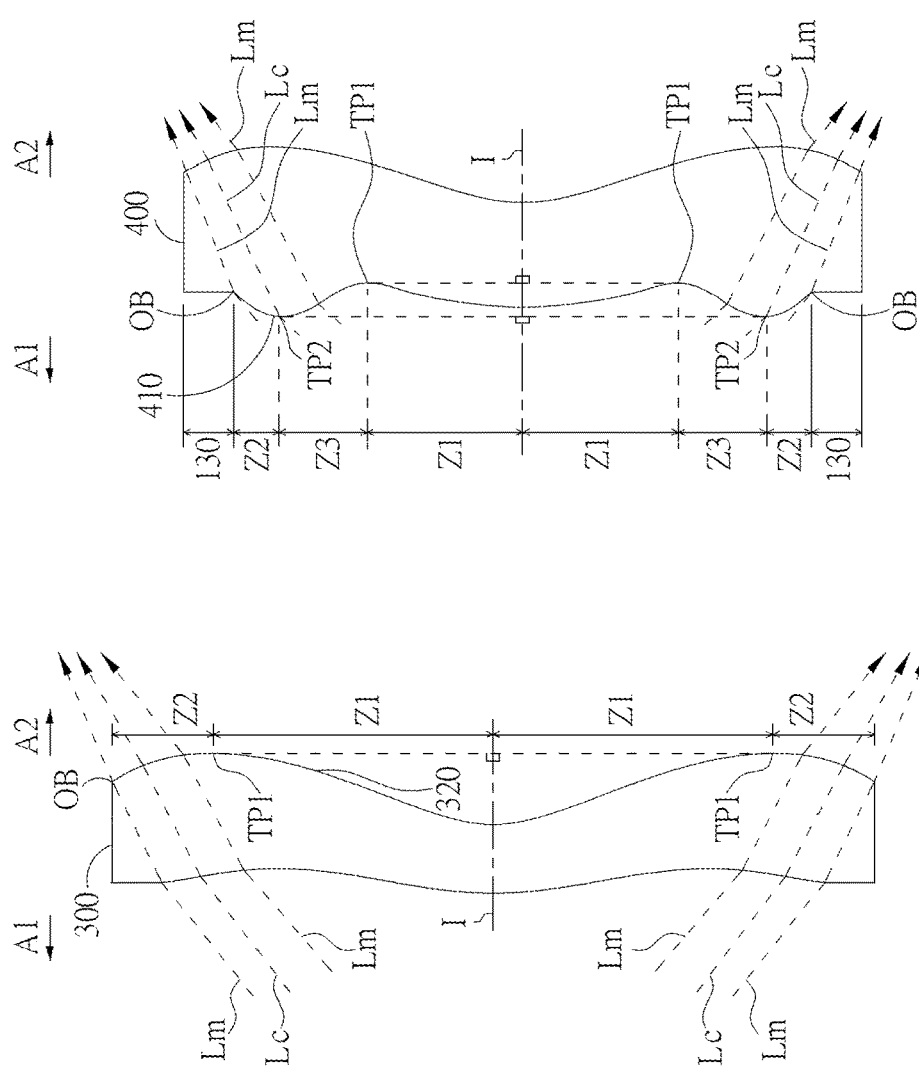
FIG. 4
FIG. 3

| Embodiment 1 |||||||
|---|---|---|---|---|---|---|
| EFL = 7.224 mm ; HFOV = 35.689 degrees ; TTL = 8.958 mm <br> Fno = 1.500 ; Image Height = 6.200 mm |||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.991 | | | | |
| L1A1 | 1st lens element | 3.260 | 1.484 | 1.545 | 55.987 | 6.777 | Plastic |
| L1A2 | | 22.883 | 0.221 | | | | |
| L2A1 | 2nd lens element | 11.813 | 0.233 | 1.661 | 20.373 | -11.238 | Plastic |
| L2A2 | | 4.550 | 0.345 | | | | |
| L3A1 | 3rd lens element | 4.442 | 0.797 | 1.545 | 55.987 | 17.676 | Plastic |
| L3A2 | | 7.707 | 0.707 | | | | |
| L4A1 | 4th lens element | 1000.000 | 0.551 | 1.671 | 19.480 | -149.058 | Plastic |
| L4A2 | | 91.706 | 0.257 | | | | |
| L5A1 | 5th lens element | 10.415 | 0.453 | 1.588 | 28.433 | 29.382 | Plastic |
| L5A2 | | 25.556 | 0.690 | | | | |
| L6A1 | 6th lens element | -1000.000 | 0.571 | 1.671 | 19.480 | 221.040 | Plastic |
| L6A2 | | -130.282 | 0.021 | | | | |
| L7A1 | 7th lens element | 7.499 | 0.910 | 1.545 | 55.987 | 27.942 | Plastic |
| L7A2 | | 14.111 | 0.791 | | | | |
| L8A1 | 8th lens element | -4.344 | 0.307 | 1.615 | 25.920 | -5.744 | Plastic |
| L8A2 | | 20.171 | 0.267 | | | | |
| TFA1 | Filtering unit | INFINITY | 0.294 | 1.560 | 51.300 | | |
| TFA2 | | INFINITY | 0.060 | | | | |
| IMA | Image plane | INFINITY | | | | | |

FIG. 8

| Embodiment 1 ||||||
|---|---|---|---|---|---|
| Aspherical Parameters ||||||
| Surface# | K | a4 | a6 | a8 | a10 |
| L1A1 | -8.716259E-02 | 2.685381E-04 | -3.925474E-05 | 2.522113E-05 | -2.119223E-05 |
| L1A2 | -1.133872E+01 | 4.370248E-03 | -2.285237E-03 | 4.786560E-04 | -7.908176E-05 |
| L2A1 | -6.499018E+00 | 2.460819E-03 | -1.708123E-03 | 7.039948E-04 | -8.700286E-05 |
| L2A2 | 8.441274E-01 | -3.596766E-03 | 1.340873E-03 | 1.491833E-04 | 5.135937E-05 |
| L3A1 | -1.847550E+00 | -1.893242E-03 | 1.328202E-03 | -5.501543E-04 | 2.795498E-04 |
| L3A2 | -1.706300E-01 | -1.427069E-03 | -2.546399E-04 | -8.064067E-05 | 4.240154E-05 |
| L4A1 | 0.000000E+00 | -6.122492E-03 | -4.085706E-03 | 1.768598E-03 | -6.233090E-04 |
| L4A2 | 0.000000E+00 | -1.871569E-03 | -1.126221E-02 | 6.846452E-03 | -2.970842E-03 |
| L5A1 | -2.722204E+01 | 3.579071E-03 | -1.136145E-02 | 4.859162E-03 | -1.276790E-03 |
| L5A2 | 0.000000E+00 | -4.273594E-03 | -7.886920E-03 | 3.814359E-03 | -1.580594E-03 |
| L6A1 | 1.037122E-04 | 2.822925E-03 | -5.225726E-03 | -3.830669E-04 | 5.288747E-04 |
| L6A2 | -9.475528E-02 | 1.525226E-03 | -9.688006E-04 | -2.173466E-03 | 1.151549E-03 |
| L7A1 | 2.943552E+00 | -1.873105E-02 | 2.515019E-03 | -1.663921E-03 | 6.916397E-04 |
| L7A2 | 9.618176E+00 | -7.317204E-03 | 2.641988E-04 | -1.260491E-04 | 4.370200E-05 |
| L8A1 | -4.518189E-01 | 8.793279E-04 | 1.084857E-04 | 4.803602E-05 | -8.844782E-06 |
| L8A2 | 0.000000E+00 | -5.993463E-03 | 5.190249E-04 | -3.692342E-05 | 1.916496E-06 |
| Surface# | a12 | a14 | a16 | a18 | a20 |
| L1A1 | 4.983133E-06 | -6.751948E-07 | 1.785358E-08 | | |
| L1A2 | 8.684785E-06 | -6.066412E-07 | 1.761427E-08 | | |
| L2A1 | -9.418730E-07 | 1.902569E-06 | -1.364005E-07 | | |
| L2A2 | -2.092309E-05 | 3.708346E-06 | -6.397146E-08 | | |
| L3A1 | -9.034477E-05 | 1.594816E-05 | -1.220909E-06 | | |
| L3A2 | -2.956755E-05 | 7.232853E-06 | -8.906845E-07 | | |
| L4A1 | 8.318683E-05 | 1.923923E-06 | -1.493217E-06 | | |
| L4A2 | 8.441496E-04 | -1.589365E-04 | 1.949969E-05 | -1.459678E-06 | 5.069770E-08 |
| L5A1 | 1.828388E-04 | -2.067308E-05 | 4.665360E-06 | -8.165733E-07 | 5.136655E-08 |
| L5A2 | 5.673309E-04 | -1.551031E-04 | 2.760007E-05 | -2.745735E-06 | 1.147290E-07 |
| L6A1 | -1.646960E-04 | 3.204532E-05 | -4.365465E-06 | 3.786613E-07 | -1.553588E-08 |
| L6A2 | -2.772731E-04 | 3.773337E-05 | -2.971543E-06 | 1.263679E-07 | -2.251562E-09 |
| L7A1 | -1.560143E-04 | 1.976060E-05 | -1.407742E-06 | 5.231521E-08 | -7.783030E-10 |
| L7A2 | -8.107805E-06 | 8.476737E-07 | -5.055309E-08 | 1.600595E-09 | -2.081400E-11 |
| L8A1 | 7.955737E-07 | -4.156147E-08 | 1.266514E-09 | -2.088000E-11 | 1.440000E-13 |
| L8A2 | -1.168764E-07 | 7.141295E-09 | -2.634860E-10 | 4.904000E-12 | -3.600000E-14 |

FIG. 9

| Embodiment 2 |||||||
|---|---|---|---|---|---|---|
| EFL = 7.250 mm ; HFOV = 37.772 degrees ; TTL = 8.880 mm |||||||
| Fno = 1.500 ; Image Height = 6.200 mm |||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.023 | | | | |
| L1A1 | 1st lens element | 3.209 | 1.661 | 1.545 | 55.987 | 6.839 | Plastic |
| L1A2 | | 18.616 | 0.125 | | | | |
| L2A1 | 2nd lens element | 10.534 | 0.204 | 1.671 | 19.480 | -11.888 | Plastic |
| L2A2 | | 4.529 | 0.352 | | | | |
| L3A1 | 3rd lens element | 4.334 | 0.443 | 1.545 | 55.987 | 18.972 | Plastic |
| L3A2 | | 7.179 | 0.770 | | | | |
| L4A1 | 4th lens element | 261.220 | 0.400 | 1.671 | 19.480 | -234.479 | Plastic |
| L4A2 | | 98.725 | 0.178 | | | | |
| L5A1 | 5th lens element | 9.331 | 0.405 | 1.545 | 55.987 | 30.952 | Plastic |
| L5A2 | | 20.504 | 0.634 | | | | |
| L6A1 | 6th lens element | -1000.000 | 0.754 | 1.671 | 19.480 | 964.721 | Plastic |
| L6A2 | | -395.385 | 0.156 | | | | |
| L7A1 | 7th lens element | 7.535 | 0.918 | 1.545 | 55.987 | 28.031 | Plastic |
| L7A2 | | 14.195 | 0.826 | | | | |
| L8A1 | 8th lens element | -4.354 | 0.386 | 1.545 | 55.987 | -6.282 | Plastic |
| L8A2 | | 16.700 | 0.267 | | | | |
| TFA1 | Filtering unit | INFINITY | 0.294 | 1.560 | 51.300 | | |
| TFA2 | | INFINITY | 0.106 | | | | |
| IMA | Image plane | INFINITY | | | | | |

FIG. 12

| Embodiment 2 ||||||
| Aspherical Parameters ||||||
| Surface# | K | a4 | a6 | a8 | a10 |
| --- | --- | --- | --- | --- | --- |
| L1A1 | -8.608615E-02 | 1.039270E-04 | -6.402608E-05 | 4.763801E-05 | -3.274327E-05 |
| L1A2 | -2.106821E+01 | 8.734516E-03 | -6.099890E-03 | 1.888076E-03 | -3.982892E-04 |
| L2A1 | -6.359409E+00 | 7.501293E-03 | -6.878933E-03 | 3.037684E-03 | -7.211954E-04 |
| L2A2 | 8.005464E-01 | -2.191618E-03 | -9.676957E-04 | 1.513351E-03 | -4.478767E-04 |
| L3A1 | -2.060400E+00 | -1.964697E-03 | 1.004677E-03 | -4.033744E-04 | 2.392784E-04 |
| L3A2 | 8.089969E-02 | -1.525088E-03 | -1.335818E-04 | -3.801041E-04 | 2.963709E-04 |
| L4A1 | 0.000000E+00 | -4.011523E-03 | -4.372274E-03 | 1.315212E-03 | -2.430835E-04 |
| L4A2 | 0.000000E+00 | 3.639454E-04 | -1.396682E-02 | 8.357392E-03 | -3.545823E-03 |
| L5A1 | -4.117193E+01 | 7.468520E-03 | -1.563014E-02 | 5.818077E-03 | -5.586312E-04 |
| L5A2 | 0.000000E+00 | -1.761275E-03 | -8.829038E-03 | 1.916722E-03 | 3.487841E-04 |
| L6A1 | -4.383865E-05 | 7.720986E-03 | -9.317973E-03 | 2.961811E-03 | -1.141394E-03 |
| L6A2 | -6.425291E-04 | 6.769651E-03 | -6.299504E-03 | 1.298075E-03 | -1.005535E-04 |
| L7A1 | 2.895459E+00 | -1.509922E-02 | -3.757088E-04 | -4.390523E-04 | 3.830042E-04 |
| L7A2 | 9.533312E+00 | -6.275541E-03 | -4.601066E-04 | 2.089405E-04 | -4.224882E-05 |
| L8A1 | -4.498408E-01 | 1.745907E-03 | -5.176585E-04 | 1.906739E-04 | -2.558249E-05 |
| L8A2 | 0.000000E+00 | -4.232517E-03 | -1.354810E-05 | 1.145404E-05 | 1.061979E-06 |
| Surface# | a12 | a14 | a16 | a18 | a20 |
| L1A1 | 8.395724E-06 | -1.164752E-06 | 4.904944E-08 | | |
| L1A2 | 5.558708E-05 | -4.585853E-06 | 1.668486E-07 | | |
| L2A1 | 1.087058E-04 | -8.972171E-06 | 3.390338E-07 | | |
| L2A2 | 1.058665E-04 | -1.645726E-05 | 1.494098E-06 | | |
| L3A1 | -9.159494E-05 | 1.910346E-05 | -1.648517E-06 | | |
| L3A2 | -1.321218E-04 | 2.892494E-05 | -2.690276E-06 | | |
| L4A1 | -6.462507E-05 | 2.956092E-05 | -3.381187E-06 | | |
| L4A2 | 1.059064E-03 | -2.503393E-04 | 4.513533E-05 | -5.093989E-06 | 2.507658E-07 |
| L5A1 | -2.795655E-04 | 8.642171E-05 | -7.040130E-06 | -2.498432E-07 | 4.308118E-08 |
| L5A2 | -1.909093E-04 | 2.940601E-06 | 8.861246E-06 | -1.526474E-06 | 8.017499E-08 |
| L6A1 | 4.015029E-04 | -9.366975E-05 | 1.267279E-05 | -8.942952E-07 | 2.481529E-08 |
| L6A2 | -1.320641E-05 | 4.084099E-06 | -4.272423E-07 | 2.142130E-08 | -4.340060E-10 |
| L7A1 | -1.220363E-04 | 2.022502E-05 | -1.850865E-06 | 8.841571E-08 | -1.716372E-09 |
| L7A2 | 4.276102E-06 | -1.949371E-07 | 5.713270E-10 | 2.452180E-10 | -5.765000E-12 |
| L8A1 | 1.939179E-06 | -8.883189E-08 | 2.434201E-09 | -3.678600E-11 | 2.370000E-13 |
| L8A2 | -2.734958E-07 | 1.978598E-08 | -6.821620E-10 | 1.157900E-11 | -7.800000E-14 |

FIG. 13

Longitudinal spherical aber.
field
1.000

Field curvature (sagittal direction)
image height (mm)
6.200

— 470 nm
--- 555 nm
-·- 650 nm

Field curvature (Tangential direction)
image height (mm)
6.200

Distortion
image height (mm)
6.200

| Embodiment 3 |||||||
|---|---|---|---|---|---|---|
| EFL = 7.314 mm ; HFOV = 36.932 degrees ; TTL = 8.866 mm |||||||
| Fno = 1.750 ; Image Height = 6.200 mm |||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.743 | | | | |
| L1A1 | 1st lens element | 3.237 | 1.197 | 1.545 | 55.987 | 6.868 | Plastic |
| L1A2 | | 20.500 | 0.263 | | | | |
| L2A1 | 2nd lens element | 10.908 | 0.200 | 1.671 | 19.480 | -11.280 | Plastic |
| L2A2 | | 4.461 | 0.535 | | | | |
| L3A1 | 3rd lens element | 4.761 | 0.550 | 1.545 | 55.987 | 21.691 | Plastic |
| L3A2 | | 7.635 | 0.535 | | | | |
| L4A1 | 4th lens element | 33.753 | 0.564 | 1.671 | 19.480 | 51.546 | Plastic |
| L4A2 | | 1000.000 | 0.707 | | | | |
| L5A1 | 5th lens element | 30.776 | 0.448 | 1.545 | 55.987 | 58.117 | Plastic |
| L5A2 | | 1000.000 | 0.480 | | | | |
| L6A1 | 6th lens element | -1000.000 | 0.200 | 1.671 | 19.480 | 1475.738 | Plastic |
| L6A2 | | -500.000 | 0.020 | | | | |
| L7A1 | 7th lens element | 7.148 | 0.782 | 1.545 | 55.987 | 26.675 | Plastic |
| L7A2 | | 13.489 | 1.437 | | | | |
| L8A1 | 8th lens element | -4.389 | 0.368 | 1.545 | 55.987 | -6.100 | Plastic |
| L8A2 | | 14.260 | 0.267 | | | | |
| TFA1 | Filtering unit | INFINITY | 0.294 | 1.560 | 51.300 | | |
| TFA2 | | INFINITY | 0.020 | | | | |
| IMA | Image plane | INFINITY | | | | | |

FIG. 16

| Embodiment 3 ||||||
| Aspherical Parameters ||||||
| Surface# | K | a4 | a6 | a8 | a10 |
| --- | --- | --- | --- | --- | --- |
| L1A1 | -8.977289E-02 | 3.079695E-04 | 1.276062E-04 | -1.313816E-04 | 5.664341E-05 |
| L1A2 | -5.053263E+00 | 2.091575E-03 | -1.151262E-03 | 4.234838E-04 | -1.638255E-04 |
| L2A1 | -5.713362E+00 | -1.627201E-03 | 1.045431E-03 | 1.804325E-04 | -1.667004E-04 |
| L2A2 | 9.457622E-01 | -4.046857E-03 | 2.321153E-03 | 1.033341E-04 | -2.029378E-04 |
| L3A1 | -1.668821E+00 | -2.177956E-04 | 2.175422E-04 | 1.656607E-04 | -1.444050E-04 |
| L3A2 | -9.201270E-01 | -1.894370E-03 | -4.322081E-04 | 1.660585E-04 | -8.110674E-05 |
| L4A1 | 0.000000E+00 | -9.393012E-03 | -1.744958E-03 | 1.558328E-04 | 6.359329E-05 |
| L4A2 | 0.000000E+00 | -8.507714E-03 | -3.418719E-03 | 1.595822E-03 | -7.693630E-04 |
| L5A1 | -5.842122E-01 | -1.621755E-03 | -5.784564E-03 | 2.573838E-03 | -1.177961E-03 |
| L5A2 | 0.000000E+00 | -9.210064E-03 | -1.390341E-03 | -1.182667E-03 | 6.870991E-04 |
| L6A1 | 5.784076E-06 | -1.876869E-02 | 2.925457E-02 | -2.373833E-02 | 8.892668E-03 |
| L6A2 | -1.625370E-04 | 2.817765E-03 | 1.227037E-02 | -1.482486E-02 | 6.530932E-03 |
| L7A1 | 2.734544E+00 | 1.640252E-02 | -2.637698E-02 | 1.164411E-02 | -3.343082E-03 |
| L7A2 | 9.769209E+00 | 7.021064E-03 | -9.489263E-03 | 3.098668E-03 | -6.941117E-04 |
| L8A1 | -4.202377E-01 | 5.027485E-03 | -2.952857E-03 | 7.129298E-04 | -7.981411E-05 |
| L8A2 | 0.000000E+00 | -2.628710E-03 | -1.002037E-03 | 2.384278E-04 | -2.430903E-05 |
| Surface# | a12 | a14 | a16 | a18 | a20 |
| L1A1 | -1.701277E-05 | 2.570689E-06 | -1.939180E-07 | | |
| L1A2 | 4.003042E-05 | -5.497036E-06 | 3.001911E-07 | | |
| L2A1 | 6.072722E-05 | -1.032599E-05 | 7.417653E-07 | | |
| L2A2 | 9.328522E-05 | -1.803288E-05 | 1.495808E-06 | | |
| L3A1 | 5.684233E-05 | -1.150034E-05 | 8.815455E-07 | | |
| L3A2 | 9.055244E-06 | 7.605846E-07 | -4.295037E-07 | | |
| L4A1 | -8.427553E-05 | 2.396466E-05 | -2.675506E-06 | | |
| L4A2 | 2.499729E-04 | -5.744453E-05 | 9.075012E-06 | -8.973234E-07 | 4.020909E-08 |
| L5A1 | 4.672518E-04 | -1.420949E-04 | 2.694823E-05 | -2.723873E-06 | 1.117901E-07 |
| L5A2 | -4.849668E-05 | -5.194498E-05 | 1.621324E-05 | -1.887254E-06 | 8.031091E-08 |
| L6A1 | -1.767240E-03 | 1.690601E-04 | -2.374443E-06 | -8.084406E-07 | 4.451328E-08 |
| L6A2 | -1.595434E-03 | 2.344823E-04 | -2.060808E-05 | 9.982941E-07 | -2.051691E-08 |
| L7A1 | 6.111731E-04 | -6.876523E-05 | 4.520496E-06 | -1.562510E-07 | 2.142465E-09 |
| L7A2 | 1.041238E-04 | -9.878595E-06 | 5.603635E-07 | -1.724650E-08 | 2.209030E-10 |
| L8A1 | 5.167647E-06 | -2.056869E-07 | 4.988659E-09 | -6.788100E-11 | 3.990000E-13 |
| L8A2 | 1.417096E-06 | -5.027429E-08 | 1.074947E-09 | -1.275500E-11 | 6.500000E-14 |

FIG. 17

| Embodiment 4 ||||||||
| EFL = 7.731 mm；HFOV = 36.564 degrees；TTL = 9.056 mm ||||||||
| Fno = 1.800；Image Height = 6.200 mm ||||||||
| Surface # | | Radius of curvature (mm) | Thickness /air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | -0.790 | | | | |
| L1A1 | 1st lens element | 3.225 | 1.133 | 1.545 | 55.987 | 6.945 | Plastic |
| L1A2 | | 18.836 | 0.291 | | | | |
| L2A1 | 2nd lens element | 10.549 | 0.200 | 1.671 | 19.480 | -11.748 | Plastic |
| L2A2 | | 4.502 | 0.645 | | | | |
| L3A1 | 3rd lens element | 4.707 | 0.412 | 1.545 | 55.987 | 23.026 | Plastic |
| L3A2 | | 7.289 | 0.553 | | | | |
| L4A1 | 4th lens element | 36.074 | 0.492 | 1.671 | 19.480 | 55.225 | Plastic |
| L4A2 | | 1000.000 | 0.922 | | | | |
| L5A1 | 5th lens element | 80.514 | 0.408 | 1.545 | 55.987 | 160.268 | Plastic |
| L5A2 | | 1000.000 | 0.356 | | | | |
| L6A1 | 6th lens element | -43.311 | 0.200 | 1.671 | 19.480 | 1412.430 | Plastic |
| L6A2 | | -41.513 | 0.020 | | | | |
| L7A1 | 7th lens element | 7.835 | 0.688 | 1.545 | 55.987 | 25.144 | Plastic |
| L7A2 | | 17.674 | 1.723 | | | | |
| L8A1 | 8th lens element | -4.445 | 0.432 | 1.545 | 55.987 | -6.306 | Plastic |
| L8A2 | | 15.845 | 0.267 | | | | |
| TFA1 | Filtering unit | INFINITY | 0.294 | 1.560 | 51.300 | | |
| TFA2 | | INFINITY | 0.020 | | | | |
| IMA | Image plane | INFINITY | | | | | |

FIG. 20

| Embodiment 4 |||||
|---|---|---|---|---|
| Aspherical Parameters |||||
| Surface# | K | a4 | a6 | a8 | a10 |
| L1A1 | -9.176385E-02 | 3.375227E-04 | 6.507795E-05 | -7.270035E-05 | 3.211078E-05 |
| L1A2 | -4.730331E+00 | 1.333022E-03 | -3.536156E-04 | -5.393049E-05 | 2.957272E-05 |
| L2A1 | -5.074047E+00 | -2.657118E-03 | 2.886996E-03 | -1.244229E-03 | 4.683587E-04 |
| L2A2 | 9.375317E-01 | -4.614094E-03 | 4.151600E-03 | -1.765156E-03 | 8.217105E-04 |
| L3A1 | -1.652575E+00 | -3.347770E-04 | 2.726164E-04 | 2.310936E-04 | -1.983609E-04 |
| L3A2 | -5.963615E-01 | -2.445047E-03 | -1.533949E-04 | 1.106196E-04 | -5.511260E-05 |
| L4A1 | 0.000000E+00 | -1.055560E-02 | -1.294555E-03 | -1.360215E-04 | 1.984509E-04 |
| L4A2 | 0.000000E+00 | -9.567943E-03 | -2.672025E-03 | 1.337120E-03 | -8.180034E-04 |
| L5A1 | -2.087747E-02 | -6.084703E-04 | -6.943846E-03 | 2.899571E-03 | -8.768510E-04 |
| L5A2 | 0.000000E+00 | -7.027671E-03 | -2.799171E-03 | -1.453759E-03 | 1.223565E-03 |
| L6A1 | -2.160369E-02 | -1.936294E-02 | 3.159720E-02 | -2.561797E-02 | 9.724706E-03 |
| L6A2 | -2.815671E-02 | 6.048434E-04 | 1.279566E-02 | -1.430752E-02 | 6.038749E-03 |
| L7A1 | 1.840952E+00 | 1.671774E-02 | -2.822151E-02 | 1.271464E-02 | -3.818377E-03 |
| L7A2 | 1.168198E+00 | 6.852695E-03 | -9.801815E-03 | 3.031113E-03 | -6.480797E-04 |
| L8A1 | -4.029298E-01 | 4.341531E-03 | -2.038491E-03 | 4.040829E-04 | -3.482942E-05 |
| L8A2 | 0.000000E+00 | -2.409180E-03 | -6.541592E-04 | 1.497930E-04 | -1.473022E-05 |
| Surface# | a12 | a14 | a16 | a18 | a20 |
| L1A1 | -1.158852E-05 | 1.940893E-06 | -1.676702E-07 | | |
| L1A2 | -9.737104E-06 | 1.639804E-06 | -1.275982E-07 | | |
| L2A1 | -1.113964E-04 | 1.615810E-05 | -9.960237E-07 | | |
| L2A2 | -2.440790E-04 | 4.342561E-05 | -3.182609E-06 | | |
| L3A1 | 7.161517E-05 | -1.303199E-05 | 9.118158E-07 | | |
| L3A2 | -1.775083E-06 | 3.382670E-06 | -6.267332E-07 | | |
| L4A1 | -1.223650E-04 | 2.982149E-05 | -3.010083E-06 | | |
| L4A2 | 3.487877E-04 | -1.047171E-04 | 2.035860E-05 | -2.274936E-06 | 1.085272E-07 |
| L5A1 | 1.737300E-04 | -2.568132E-05 | 2.156022E-06 | 1.375752E-08 | -1.037825E-08 |
| L5A2 | -3.180932E-04 | 2.841814E-05 | 1.489844E-06 | -4.068514E-07 | 1.891115E-08 |
| L6A1 | -2.022045E-03 | 2.235007E-04 | -9.700149E-06 | -2.720836E-07 | 2.855329E-08 |
| L6A2 | -1.431004E-03 | 2.066985E-04 | -1.808875E-05 | 8.826207E-07 | -1.844236E-08 |
| L7A1 | 7.482485E-04 | -9.203410E-05 | 6.762572E-06 | -2.697551E-07 | 4.488317E-09 |
| L7A2 | 9.553167E-05 | -9.113169E-06 | 5.264861E-07 | -1.660400E-08 | 2.184780E-10 |
| L8A1 | 1.616762E-06 | -4.086530E-08 | 4.692700E-10 | 8.300000E-14 | -3.400000E-14 |
| L8A2 | 8.456979E-07 | -2.989979E-08 | 6.400550E-10 | -7.610000E-12 | 3.900000E-14 |

FIG. 21

| Embodiment 5 ||||||||
| :---: | :---: | :---: | :---: | :---: | :---: | :---: | :---: |
| EFL = 7.276 mm ; HFOV = 36.618 degrees ; TTL = 9.132 mm ||||||||
| Fno = 1.500 ; Image Height = 6.200 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.006 | | | | |
| L1A1 | 1st lens element | 3.221 | 1.398 | 1.545 | 55.987 | 7.023 | Plastic |
| L1A2 | | 16.994 | 0.294 | | | | |
| L2A1 | 2nd lens element | 10.610 | 0.272 | 1.671 | 19.480 | -11.354 | Plastic |
| L2A2 | | 4.413 | 0.251 | | | | |
| L3A1 | 3rd lens element | 4.456 | 0.855 | 1.545 | 55.987 | 16.937 | Plastic |
| L3A2 | | 8.013 | 0.551 | | | | |
| L4A1 | 4th lens element | 35.511 | 0.707 | 1.671 | 19.480 | 2806.822 | Plastic |
| L4A2 | | 35.895 | 0.310 | | | | |
| L5A1 | 5th lens element | 13.785 | 0.673 | 1.545 | 55.987 | 32.544 | Plastic |
| L5A2 | | 60.313 | 0.283 | | | | |
| L6A1 | 6th lens element | -219.839 | 0.716 | 1.671 | 19.480 | 700.374 | Plastic |
| L6A2 | | -150.434 | 0.221 | | | | |
| L7A1 | 7th lens element | 7.506 | 0.865 | 1.545 | 55.987 | 28.273 | Plastic |
| L7A2 | | 14.010 | 0.695 | | | | |
| L8A1 | 8th lens element | -4.442 | 0.385 | 1.545 | 55.987 | -6.265 | Plastic |
| L8A2 | | 15.364 | 0.267 | | | | |
| TFA1 | Filtering unit | INFINITY | 0.294 | 1.560 | 51.300 | | |
| TFA2 | | INFINITY | 0.095 | | | | |
| IMA | Image plane | INFINITY | | | | | |

FIG. 24

| Embodiment 5 | | | | |
|---|---|---|---|---|
| Aspherical Parameters | | | | |
| Surface# | K | a4 | a6 | a8 | a10 |
| L1A1 | -9.677288E-02 | 2.973146E-04 | -9.195843E-05 | 6.912586E-05 | -3.806197E-05 |
| L1A2 | -1.436338E+01 | 3.737996E-03 | -1.714398E-03 | 2.978341E-04 | -4.286898E-05 |
| L2A1 | -5.354110E+00 | 4.446748E-03 | -2.852644E-03 | 8.672228E-04 | -3.658911E-05 |
| L2A2 | 6.896611E-01 | -3.357869E-04 | -1.408921E-03 | 1.157227E-03 | -3.058312E-04 |
| L3A1 | -1.914727E+00 | -1.061175E-03 | 1.505530E-04 | 2.788825E-04 | -1.984006E-04 |
| L3A2 | -1.154921E-01 | -1.003994E-03 | -5.368133E-04 | 2.278438E-04 | -1.495643E-04 |
| L4A1 | 0.000000E+00 | -7.476391E-03 | -1.878606E-03 | 7.170050E-04 | -2.458456E-04 |
| L4A2 | 0.000000E+00 | -5.287982E-03 | -1.024928E-02 | 8.903225E-03 | -5.228016E-03 |
| L5A1 | -5.007923E+01 | 1.725021E-03 | -1.331171E-02 | 8.558992E-03 | -3.530277E-03 |
| L5A2 | 0.000000E+00 | 3.150555E-03 | -1.889129E-02 | 1.109226E-02 | -4.006669E-03 |
| L6A1 | -3.898555E-03 | 6.599069E-03 | -1.489256E-02 | 7.445650E-03 | -2.383009E-03 |
| L6A2 | -6.466089E-02 | 7.660477E-04 | -4.118903E-03 | 2.630349E-03 | -9.927430E-04 |
| L7A1 | 2.943303E+00 | -1.961539E-02 | 3.977473E-03 | -1.937786E-03 | 6.647776E-04 |
| L7A2 | 9.672046E+00 | -6.817619E-03 | 1.132541E-03 | -6.886574E-04 | 1.651279E-04 |
| L8A1 | -4.200020E-01 | 5.241093E-05 | 1.071752E-03 | -2.021676E-04 | 2.216241E-05 |
| L8A2 | 0.000000E+00 | -4.451279E-03 | -4.373937E-04 | 2.329267E-04 | -3.592484E-05 |
| Surface# | a12 | a14 | a16 | a18 | a20 |
| L1A1 | 7.997724E-06 | -8.739561E-07 | 1.355226E-08 | | |
| L1A2 | 3.058894E-06 | -9.222558E-08 | -4.108068E-09 | | |
| L2A1 | -2.556831E-05 | 5.705287E-06 | -3.367786E-07 | | |
| L2A2 | 9.120628E-05 | -1.770170E-05 | 1.689042E-06 | | |
| L3A1 | 7.097945E-05 | -1.215253E-05 | 7.733363E-07 | | |
| L3A2 | 2.589781E-05 | -1.111467E-07 | -5.919958E-07 | | |
| L4A1 | -1.522890E-05 | 1.770930E-05 | -2.640342E-06 | | |
| L4A2 | 1.956155E-03 | -4.796053E-04 | 7.468459E-05 | -6.676971E-06 | 2.590112E-07 |
| L5A1 | 9.280002E-04 | -1.719167E-04 | 2.267482E-05 | -1.849071E-06 | 6.645041E-08 |
| L5A2 | 9.504877E-04 | -1.575145E-04 | 1.832809E-05 | -1.348268E-06 | 4.605282E-08 |
| L6A1 | 4.540553E-04 | -5.147782E-05 | 3.633340E-06 | -1.901996E-07 | 6.652026E-09 |
| L6A2 | 2.060708E-04 | -2.454245E-05 | 1.679238E-06 | -6.130983E-08 | 9.212290E-10 |
| L7A1 | -1.634859E-04 | 2.564075E-05 | -2.346569E-06 | 1.132303E-07 | -2.217824E-09 |
| L7A2 | -2.172186E-05 | 1.752369E-06 | -8.755201E-08 | 2.488988E-09 | -3.059400E-11 |
| L8A1 | -1.400800E-06 | 5.246680E-08 | -1.143583E-09 | 1.320000E-11 | -6.000000E-14 |
| L8A2 | 2.809443E-06 | -1.247634E-07 | 3.202555E-09 | -4.442800E-11 | 2.580000E-13 |

FIG. 25

| Embodiment 6 | | | | | | | |
|---|---|---|---|---|---|---|---|
| EFL = 7.274 mm ; HFOV = 37.907 degrees ; TTL = 9.021 mm | | | | | | | |
| Fno = 1.700 ; Image Height = 5.779 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.782 | | | | |
| L1A1 | 1st lens element | 3.224 | 1.554 | 1.545 | 55.987 | 6.888 | Plastic |
| L1A2 | | 18.689 | 0.275 | | | | |
| L2A1 | 2nd lens element | 11.016 | 0.235 | 1.671 | 19.480 | -11.697 | Plastic |
| L2A2 | | 4.569 | 0.283 | | | | |
| L3A1 | 3rd lens element | 4.529 | 0.518 | 1.545 | 55.987 | 18.343 | Plastic |
| L3A2 | | 7.931 | 0.625 | | | | |
| L4A1 | 4th lens element | 325.689 | 0.557 | 1.671 | 19.480 | -178.676 | Plastic |
| L4A2 | | 88.192 | 0.189 | | | | |
| L5A1 | 5th lens element | 10.358 | 0.471 | 1.545 | 55.987 | 30.625 | Plastic |
| L5A2 | | 26.761 | 0.592 | | | | |
| L6A1 | 6th lens element | -1000.000 | 0.705 | 1.671 | 19.480 | 483.658 | Plastic |
| L6A2 | | -246.881 | 0.057 | | | | |
| L7A1 | 7th lens element | 7.512 | 0.957 | 1.545 | 55.987 | 28.066 | Plastic |
| L7A2 | | 14.067 | 0.828 | | | | |
| L8A1 | 8th lens element | -4.373 | 0.586 | 1.545 | 55.987 | -6.196 | Plastic |
| L8A2 | | 15.685 | 0.267 | | | | |
| TFA1 | Filtering unit | INFINITY | 0.294 | 1.560 | 51.300 | | |
| TFA2 | | INFINITY | 0.029 | | | | |
| IMA | Image plane | INFINITY | | | | | |

FIG. 28

| Embodiment 6 |||||
|---|---|---|---|---|
| Aspherical Parameters |||||
| Surface# | K | a4 | a6 | a8 | a10 |
| L1A1 | -9.899896E-02 | 5.486753E-05 | 9.577220E-05 | -8.926198E-05 | 2.493989E-05 |
| L1A2 | -2.164038E+01 | 4.397613E-03 | -2.561408E-03 | 8.339343E-04 | -2.583478E-04 |
| L2A1 | -6.209868E+00 | 6.033657E-03 | -5.600817E-03 | 3.131595E-03 | -1.094463E-03 |
| L2A2 | 7.046907E-01 | 8.002127E-04 | -3.136504E-03 | 2.449933E-03 | -7.685503E-04 |
| L3A1 | -1.984505E+00 | -9.066148E-04 | 2.383656E-04 | 1.302708E-04 | -5.003233E-05 |
| L3A2 | 4.174241E-01 | -9.191419E-04 | -5.159826E-04 | 9.739789E-06 | 6.202558E-05 |
| L4A1 | 0.000000E+00 | -5.557987E-03 | -2.871523E-03 | 5.468376E-04 | -1.092259E-04 |
| L4A2 | 0.000000E+00 | -1.433781E-03 | -9.845059E-03 | 6.606269E-03 | -3.640925E-03 |
| L5A1 | -3.297674E+01 | 3.282185E-03 | -1.205010E-02 | 7.437901E-03 | -3.258287E-03 |
| L5A2 | 0.000000E+00 | -6.153379E-03 | -6.517477E-03 | 3.218374E-03 | -1.190366E-03 |
| L6A1 | 8.790557E-05 | 2.485138E-03 | -4.640262E-03 | -4.330346E-05 | 4.585059E-04 |
| L6A2 | 5.878704E-04 | 2.013672E-03 | -5.210470E-03 | 2.002604E-03 | -5.718938E-04 |
| L7A1 | 2.999534E+00 | -1.546950E-02 | -2.686835E-03 | 1.659332E-03 | -4.435248E-04 |
| L7A2 | 9.625822E+00 | -3.942293E-03 | -1.565635E-03 | 5.263856E-04 | -1.119215E-04 |
| L8A1 | -4.467717E-01 | 1.323775E-03 | -2.133618E-04 | 1.295260E-04 | -1.874234E-05 |
| L8A2 | 0.000000E+00 | -4.518661E-03 | 3.094533E-04 | -5.838440E-05 | 9.817301E-06 |
| Surface# | a12 | a14 | a16 | a18 | a20 |
| L1A1 | -4.682753E-06 | 3.177746E-07 | -2.095998E-08 | | |
| L1A2 | 4.926079E-05 | -4.845878E-06 | 1.793371E-07 | | |
| L2A1 | 2.423655E-04 | -2.784740E-05 | 1.297421E-06 | | |
| L2A2 | 1.375149E-04 | -7.826621E-06 | -2.468057E-08 | | |
| L3A1 | 2.861344E-06 | 7.582991E-07 | -6.973399E-08 | | |
| L3A2 | -5.031396E-05 | 1.173287E-05 | -1.190450E-06 | | |
| L4A1 | -3.072664E-05 | 1.340541E-05 | -1.829065E-06 | | |
| L4A2 | 1.399658E-03 | -3.674030E-04 | 6.168405E-05 | -5.903680E-06 | 2.425445E-07 |
| L5A1 | 9.840290E-04 | -2.027881E-04 | 2.639672E-05 | -1.905122E-06 | 5.713960E-08 |
| L5A2 | 3.491411E-04 | -7.473147E-05 | 1.018359E-05 | -7.806897E-07 | 2.641216E-08 |
| L6A1 | -2.177513E-04 | 5.786515E-05 | -9.163027E-06 | 7.924382E-07 | -2.891162E-08 |
| L6A2 | 1.067357E-04 | -1.257846E-05 | 9.126079E-07 | -3.738943E-08 | 6.609220E-10 |
| L7A1 | 5.835305E-05 | -3.172878E-06 | -5.209139E-08 | 1.285933E-08 | -3.849150E-10 |
| L7A2 | 1.477010E-05 | -1.192959E-06 | 5.716266E-08 | -1.496229E-09 | 1.656400E-11 |
| L8A1 | 1.488411E-06 | -7.091502E-08 | 2.011673E-09 | -3.134300E-11 | 2.070000E-13 |
| L8A2 | -9.254673E-07 | 4.834483E-08 | -1.401407E-09 | 2.121200E-11 | -1.310000E-13 |

FIG. 29

| Embodiment 7 ||||||||
| :---: | :---: | :---: | :---: | :---: | :---: | :---: | :---: |
| EFL = 7.239 mm ; HFOV = 37.907 degrees ; TTL = 8.603 mm ||||||||
| Fno = 1.500 ; Image Height = 6.396 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.054 | | | | |
| L1A1 | 1st lens element | 3.171 | 1.305 | 1.545 | 55.987 | 6.919 | Plastic |
| L1A2 | | 16.823 | 0.134 | | | | |
| L2A1 | 2nd lens element | 9.623 | 0.200 | 1.671 | 19.480 | -12.452 | Plastic |
| L2A2 | | 4.458 | 0.637 | | | | |
| L3A1 | 3rd lens element | 4.931 | 0.432 | 1.545 | 55.987 | 22.715 | Plastic |
| L3A2 | | 7.930 | 0.780 | | | | |
| L4A1 | 4th lens element | 52.913 | 0.390 | 1.671 | 19.480 | 82.448 | Plastic |
| L4A2 | | 1000.000 | 0.451 | | | | |
| L5A1 | 5th lens element | 7.798 | 0.331 | 1.545 | 55.987 | 37.046 | Plastic |
| L5A2 | | 12.497 | 0.920 | | | | |
| L6A1 | 6th lens element | -998.270 | 0.200 | 1.671 | 19.480 | 2308.812 | Plastic |
| L6A2 | | -609.429 | 0.034 | | | | |
| L7A1 | 7th lens element | 7.216 | 0.574 | 1.545 | 55.987 | 26.834 | Plastic |
| L7A2 | | 13.815 | 1.247 | | | | |
| L8A1 | 8th lens element | -4.328 | 0.329 | 1.545 | 55.987 | -6.155 | Plastic |
| L8A2 | | 15.477 | 0.267 | | | | |
| TFA1 | Filtering unit | INFINITY | 0.294 | 1.560 | 51.300 | | |
| TFA2 | | INFINITY | 0.077 | | | | |
| IMA | Image plane | INFINITY | | | | | |

FIG. 32

| Embodiment 7 |||||
| --- | --- | --- | --- | --- |
| Aspherical Parameters |||||
| Surface# | K | a4 | a6 | a8 | a10 |
| L1A1 | -6.479705E-02 | 4.641100E-04 | 7.918029E-05 | -3.534929E-05 | 1.385063E-05 |
| L1A2 | -9.150390E+00 | 4.558954E-03 | -2.312756E-03 | 3.829609E-04 | 5.519339E-06 |
| L2A1 | -9.394324E+00 | 1.759078E-03 | -1.065399E-03 | 3.590158E-04 | 3.889991E-05 |
| L2A2 | 1.091214E+00 | -2.506085E-03 | 1.485163E-03 | 8.616742E-05 | 2.521836E-05 |
| L3A1 | -2.009233E+00 | -5.833305E-04 | 5.359201E-04 | -3.792858E-04 | 2.460630E-04 |
| L3A2 | -1.132402E+00 | -2.220479E-03 | 7.880699E-05 | -5.308627E-04 | 3.398315E-04 |
| L4A1 | 0.000000E+00 | -6.354806E-03 | -2.820242E-03 | 8.541821E-04 | -2.382026E-04 |
| L4A2 | 0.000000E+00 | -8.667657E-03 | -2.633120E-03 | 9.977352E-05 | 4.680856E-04 |
| L5A1 | -3.204734E+01 | -2.622351E-03 | 1.669257E-03 | -5.947844E-03 | 3.953280E-03 |
| L5A2 | 0.000000E+00 | -1.105052E-02 | 5.149206E-03 | -7.075032E-03 | 3.992278E-03 |
| L6A1 | -6.203122E-04 | -7.145766E-03 | 1.729840E-02 | -1.625067E-02 | 6.459293E-03 |
| L6A2 | 9.620368E-04 | 5.820334E-03 | 7.385422E-03 | -1.257519E-02 | 5.996593E-03 |
| L7A1 | 4.972721E-01 | 8.947909E-03 | -1.640458E-02 | 3.711820E-03 | 1.168976E-04 |
| L7A2 | 9.502045E+00 | 6.265265E-03 | -8.006389E-03 | 1.680942E-03 | -1.134358E-04 |
| L8A1 | -4.509544E-01 | 6.040910E-03 | -2.431949E-03 | 5.458248E-04 | -6.222724E-05 |
| L8A2 | 0.000000E+00 | -2.102092E-03 | -6.942087E-04 | 1.608536E-04 | -1.587482E-05 |
| Surface# | a12 | a14 | a16 | a18 | a20 |
| L1A1 | -5.692029E-06 | 1.109979E-06 | -1.130928E-07 | | |
| L1A2 | -1.674756E-05 | 2.857004E-06 | -1.707507E-07 | | |
| L2A1 | -3.245467E-05 | 5.907764E-06 | -3.341846E-07 | | |
| L2A2 | -6.056972E-06 | 6.830087E-07 | 1.325339E-07 | | |
| L3A1 | -9.016787E-05 | 1.743024E-05 | -1.422773E-06 | | |
| L3A2 | -1.285247E-04 | 2.472120E-05 | -2.024643E-06 | | |
| L4A1 | -1.700808E-07 | 7.595160E-06 | -1.062241E-06 | | |
| L4A2 | -3.174657E-04 | 9.307528E-05 | -1.460863E-05 | 1.177620E-06 | -3.855717E-08 |
| L5A1 | -1.460303E-03 | 3.255849E-04 | -4.442139E-05 | 3.477101E-06 | -1.202576E-07 |
| L5A2 | -1.291976E-03 | 2.529421E-04 | -2.975979E-05 | 1.946589E-06 | -5.432991E-08 |
| L6A1 | -1.487276E-03 | 2.134208E-04 | -1.931813E-05 | 1.057350E-06 | -2.859976E-08 |
| L6A2 | -1.515935E-03 | 2.257312E-04 | -1.986222E-05 | 9.563389E-07 | -1.944601E-08 |
| L7A1 | -2.122996E-04 | 4.227064E-05 | -3.943008E-06 | 1.819096E-07 | -3.318710E-09 |
| L7A2 | -2.170840E-05 | 5.618078E-06 | -5.341349E-07 | 2.412580E-08 | -4.282630E-10 |
| L8A1 | 4.242415E-06 | -1.797984E-07 | 4.650510E-09 | -6.732500E-11 | 4.190000E-13 |
| L8A2 | 8.740845E-07 | -2.882025E-08 | 5.664380E-10 | -6.102000E-12 | 2.700000E-14 |

FIG. 33

| Embodiment 8 | | | | | | | |
|---|---|---|---|---|---|---|---|
| EFL = 7.467 mm ; HFOV = 37.907 degrees ; TTL = 7.869 mm | | | | | | | |
| Fno = 2.229 ; Image Height = 5.424 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.624 | | | | |
| L1A1 | 1st lens element | 2.524 | 1.141 | 1.545 | 55.987 | 7.137 | Plastic |
| L1A2 | | 6.016 | 0.053 | | | | |
| L2A1 | 2nd lens element | 6.076 | 0.200 | 1.671 | 19.480 | -13.536 | Plastic |
| L2A2 | | 3.606 | 0.111 | | | | |
| L3A1 | 3rd lens element | 4.938 | 0.231 | 1.545 | 55.987 | 117.147 | Plastic |
| L3A2 | | 5.263 | 0.217 | | | | |
| L4A1 | 4th lens element | 8.233 | 0.263 | 1.567 | 37.533 | 401.148 | Plastic |
| L4A2 | | 8.441 | 0.127 | | | | |
| L5A1 | 5th lens element | 5.524 | 0.328 | 1.545 | 55.987 | 23.402 | Plastic |
| L5A2 | | 9.522 | 0.595 | | | | |
| L6A1 | 6th lens element | -8.060 | 0.256 | 1.567 | 37.533 | 440.186 | Plastic |
| L6A2 | | -7.899 | 0.038 | | | | |
| L7A1 | 7th lens element | 7.683 | 0.224 | 1.545 | 55.987 | 17.106 | Plastic |
| L7A2 | | 42.752 | 2.330 | | | | |
| L8A1 | 8th lens element | -4.541 | 0.583 | 1.545 | 55.987 | -7.558 | Plastic |
| L8A2 | | 47.497 | 0.267 | | | | |
| TFA1 | Filtering unit | INFINITY | 0.294 | 1.560 | 51.300 | | |
| TFA2 | | INFINITY | 0.611 | | | | |
| IMA | Image plane | INFINITY | | | | | |

FIG. 36

| Embodiment 8 |||||
|---|---|---|---|---|
| Aspherical Parameters |||||
| Surface# | K | a4 | a6 | a8 | a10 |
| L1A1 | -7.628627E-02 | -2.726686E-05 | 5.822936E-04 | 1.540598E-05 | -4.290170E-04 |
| L1A2 | -8.959185E+00 | 1.308109E-03 | 1.455919E-02 | -3.469765E-02 | 3.854590E-02 |
| L2A1 | -1.563065E+01 | 2.983383E-03 | 3.009207E-03 | -1.035943E-02 | 1.083250E-02 |
| L2A2 | 8.365963E-01 | 7.020273E-03 | -3.634209E-02 | 7.248651E-02 | -7.277719E-02 |
| L3A1 | -1.262927E+00 | 1.699416E-02 | -7.418220E-02 | 1.328570E-01 | -1.226769E-01 |
| L3A2 | -2.436290E+00 | 1.399754E-02 | -6.954124E-02 | 1.245234E-01 | -1.197472E-01 |
| L4A1 | 0.000000E+00 | 1.343734E-02 | -7.270271E-02 | 1.165371E-01 | -1.079726E-01 |
| L4A2 | 0.000000E+00 | 1.597111E-02 | -9.740197E-02 | 1.589911E-01 | -1.550451E-01 |
| L5A1 | -2.706248E+01 | 1.387754E-02 | -4.390793E-02 | 2.534195E-02 | 2.571097E-02 |
| L5A2 | 0.000000E+00 | -1.392735E-02 | -4.752792E-03 | -1.828589E-02 | 3.444498E-02 |
| L6A1 | -2.832694E+01 | 3.477849E-03 | 2.384605E-02 | -4.723930E-02 | 3.760065E-02 |
| L6A2 | 0.000000E+00 | 0.000000E+00 | -5.354853E-03 | 1.465862E-02 | -2.648723E-02 |
| L7A1 | -2.352892E+01 | 1.400575E-02 | -3.852711E-02 | 6.571716E-03 | 3.555672E-03 |
| L7A2 | -1.687391E+00 | 3.785155E-02 | -3.048439E-02 | -3.954571E-03 | 9.814517E-03 |
| L8A1 | -4.461240E-01 | 8.082701E-04 | -2.551251E-03 | 8.013265E-04 | -9.817002E-05 |
| L8A2 | 0.000000E+00 | -5.202007E-04 | -2.178191E-03 | 4.214639E-04 | -4.199639E-05 |
| Surface# | a12 | a14 | a16 | a18 | a20 |
| L1A1 | 3.624711E-04 | -1.149848E-04 | 1.420389E-05 | | |
| L1A2 | -2.350322E-02 | 7.561355E-03 | -9.786727E-04 | | |
| L2A1 | -6.939597E-03 | 2.560933E-03 | -3.877687E-04 | | |
| L2A2 | 3.859214E-02 | -1.023723E-02 | 1.079407E-03 | | |
| L3A1 | 6.148344E-02 | -1.561132E-02 | 1.568189E-03 | | |
| L3A2 | 6.525842E-02 | -1.836126E-02 | 2.067316E-03 | | |
| L4A1 | 5.600618E-02 | -1.485289E-02 | 1.575003E-03 | | |
| L4A2 | 9.574130E-02 | -4.059505E-02 | 1.225604E-02 | -2.413638E-03 | 2.226596E-04 |
| L5A1 | -5.032922E-02 | 3.478830E-02 | -1.260727E-02 | 2.417083E-03 | -1.959501E-04 |
| L5A2 | -2.872750E-02 | 1.377818E-02 | -4.025589E-03 | 6.938393E-04 | -5.460955E-05 |
| L6A1 | -1.804131E-02 | 5.158012E-03 | -8.478815E-04 | 6.937535E-05 | -2.375689E-06 |
| L6A2 | 2.273808E-02 | -1.136149E-02 | 3.502354E-03 | -6.624490E-04 | 7.082629E-05 |
| L7A1 | -2.352002E-03 | 7.753700E-04 | -1.723966E-04 | 2.295866E-05 | -1.318214E-06 |
| L7A2 | -4.480992E-03 | 1.092229E-03 | -1.584032E-04 | 1.303972E-05 | -4.737226E-07 |
| L8A1 | 6.492563E-06 | -2.472546E-07 | 5.197151E-09 | -4.967000E-11 | 8.700000E-14 |
| L8A2 | 2.173043E-06 | -3.016940E-08 | -2.402636E-09 | 1.174510E-10 | -1.567000E-12 |

FIG. 37

| Embodiment 9 | | | | | | |
|---|---|---|---|---|---|---|
| EFL = 6.939 mm ; HFOV = 37.907 degrees ; TTL = 8.875 mm | | | | | | |
| Fno = 1.432 ; Image Height = 5.276 mm | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.040 | | | | |
| L1A1 | 1st lens element | 3.104 | 1.522 | 1.545 | 55.987 | 6.689 | Plastic |
| L1A2 | | 17.068 | 0.290 | | | | |
| L2A1 | 2nd lens element | 11.679 | 0.200 | 1.671 | 19.480 | -10.610 | Plastic |
| L2A2 | | 4.419 | 0.327 | | | | |
| L3A1 | 3rd lens element | 4.571 | 0.447 | 1.545 | 55.987 | 17.578 | Plastic |
| L3A2 | | 8.422 | 0.627 | | | | |
| L4A1 | 4th lens element | 21.156 | 0.504 | 1.671 | 19.480 | 31.894 | Plastic |
| L4A2 | | 1000.000 | 0.216 | | | | |
| L5A1 | 5th lens element | 16.218 | 0.214 | 1.545 | 55.987 | -1000.000 | Plastic |
| L5A2 | | 15.677 | 0.390 | | | | |
| L6A1 | 6th lens element | -139.785 | 0.397 | 1.671 | 19.480 | 669.065 | Plastic |
| L6A2 | | -106.961 | 0.026 | | | | |
| L7A1 | 7th lens element | 7.034 | 0.793 | 1.545 | 55.987 | 26.226 | Plastic |
| L7A2 | | 13.268 | 0.782 | | | | |
| L8A1 | 8th lens element | -4.749 | 1.545 | 1.545 | 55.987 | 999.999 | Plastic |
| L8A2 | | -5.249 | 0.267 | | | | |
| TFA1 | Filtering unit | INFINITY | 0.294 | 1.560 | 51.300 | | |
| TFA2 | | INFINITY | 0.035 | | | | |
| IMA | Image plane | INFINITY | | | | | |

FIG. 40

| Embodiment 9 | | | | | |
|---|---|---|---|---|---|
| Aspherical Parameters | | | | | |
| Surface# | K | a4 | a6 | a8 | a10 |
| L1A1 | -1.178256E-01 | 2.334300E-04 | -3.313161E-04 | 2.396535E-04 | -1.035143E-04 |
| L1A2 | -1.140251E+01 | 4.852497E-03 | -2.301750E-03 | 6.351712E-04 | -2.237284E-04 |
| L2A1 | -8.175231E+00 | 5.637718E-03 | -3.112369E-03 | -2.764566E-05 | 5.819817E-04 |
| L2A2 | 6.775273E-01 | 1.814002E-03 | -3.928785E-03 | 2.797773E-03 | -1.243967E-03 |
| L3A1 | -2.083915E+00 | -1.898561E-03 | 2.396957E-03 | -1.368646E-03 | 4.189748E-04 |
| L3A2 | -7.639760E-01 | -2.037151E-03 | -1.420582E-04 | 6.255200E-04 | -5.980945E-04 |
| L4A1 | 0.000000E+00 | -7.596094E-03 | 3.147729E-03 | -5.581621E-03 | 3.191825E-03 |
| L4A2 | 0.000000E+00 | -9.677379E-04 | -9.134981E-03 | 1.101514E-02 | -1.026201E-02 |
| L5A1 | -2.989594E+01 | 1.711653E-02 | -5.805180E-02 | 6.474217E-02 | -4.001063E-02 |
| L5A2 | 0.000000E+00 | 1.612167E-02 | -7.023013E-02 | 7.141164E-02 | -3.991054E-02 |
| L6A1 | 3.533791E+00 | 2.956364E-02 | -4.352497E-02 | 3.060085E-02 | -1.359484E-02 |
| L6A2 | -5.292287E-01 | 7.825959E-03 | -1.022571E-02 | 6.312763E-03 | -2.539965E-03 |
| L7A1 | 3.233165E+00 | -1.961619E-02 | 8.639362E-04 | -1.059376E-03 | 8.218804E-04 |
| L7A2 | 9.908238E+00 | 1.306444E-02 | -1.168226E-02 | 3.073871E-03 | -4.323740E-04 |
| L8A1 | -4.293337E-01 | 2.561988E-02 | -1.270393E-02 | 2.697372E-03 | -3.023880E-04 |
| L8A2 | 0.000000E+00 | 7.559876E-02 | -2.191267E-02 | 3.502789E-03 | -3.415966E-04 |
| Surface# | a12 | a14 | a16 | a18 | a20 |
| L1A1 | 2.156196E-05 | -2.340077E-06 | 7.720053E-08 | | |
| L1A2 | 5.533544E-05 | -7.531280E-06 | 4.122199E-07 | | |
| L2A1 | -1.978639E-04 | 2.823831E-05 | -1.462382E-06 | | |
| L2A2 | 4.530110E-04 | -9.131024E-05 | 7.710133E-06 | | |
| L3A1 | -6.954061E-05 | 5.267511E-06 | 4.873383E-09 | | |
| L3A2 | 1.963053E-04 | -3.013286E-05 | 1.642411E-06 | | |
| L4A1 | -1.022248E-03 | 1.691646E-04 | -1.171698E-05 | | |
| L4A2 | 5.406540E-03 | -1.692520E-03 | 3.139836E-04 | -3.196070E-05 | 1.375913E-06 |
| L5A1 | 1.466980E-02 | -3.300079E-03 | 4.482450E-04 | -3.378834E-05 | 1.085999E-06 |
| L5A2 | 1.333599E-02 | -2.736497E-03 | 3.378346E-04 | -2.303052E-05 | 6.670562E-07 |
| L6A1 | 3.631638E-03 | -5.819293E-04 | 5.432717E-05 | -2.714317E-06 | 5.595044E-08 |
| L6A2 | 6.033578E-04 | -8.552699E-05 | 7.162998E-06 | -3.278640E-07 | 6.323989E-09 |
| L7A1 | -2.581624E-04 | 4.106509E-05 | -3.545046E-06 | 1.591810E-07 | -2.921609E-09 |
| L7A2 | 3.275049E-05 | -1.034967E-06 | -1.951988E-08 | 2.273541E-09 | -4.484300E-11 |
| L8A1 | 2.019114E-05 | -8.312914E-07 | 2.069934E-08 | -2.856200E-10 | 1.675000E-12 |
| L8A2 | 2.083774E-05 | -8.020013E-07 | 1.905893E-08 | -2.566740E-10 | 1.501000E-12 |

FIG. 41

Longitudinal spherical aber.
field
1.000

Field curvature
(sagittal direction)
image height (mm)
5.975

——— 470 nm
- - - 555 nm
—·— 650 nm

Field curvature
(Tangential direction)
image height (mm)
5.975

Distortion
image height
(mm)
5.975

| Embodiment 10 |||||||
|---|---|---|---|---|---|---|
| EFL = 7.868 mm ; HFOV = 37.907 degrees ; TTL = 9.440 mm |||||||
| Fno = 1.748 ; Image Height = 5.975 mm |||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.888 | | | | |
| L1A1 | 1st lens element | 3.118 | 1.615 | 1.545 | 55.987 | 6.902 | Plastic |
| L1A2 | | 14.718 | 0.094 | | | | |
| L2A1 | 2nd lens element | 8.524 | 0.200 | 1.671 | 19.480 | -11.817 | Plastic |
| L2A2 | | 4.089 | 0.488 | | | | |
| L3A1 | 3rd lens element | 4.206 | 0.366 | 1.545 | 55.987 | 21.681 | Plastic |
| L3A2 | | 6.321 | 0.537 | | | | |
| L4A1 | 4th lens element | 47.193 | 0.334 | 1.671 | 19.480 | 118.213 | Plastic |
| L4A2 | | 114.566 | 0.417 | | | | |
| L5A1 | 5th lens element | 8.965 | 0.417 | 1.545 | 55.987 | 33.748 | Plastic |
| L5A2 | | 17.165 | 0.567 | | | | |
| L6A1 | 6th lens element | -158.317 | 0.383 | 1.671 | 19.480 | -1161.338 | Plastic |
| L6A2 | | -198.390 | 0.039 | | | | |
| L7A1 | 7th lens element | 14.097 | 0.990 | 1.545 | 55.987 | -1143.180 | Plastic |
| L7A2 | | 13.444 | 0.896 | | | | |
| L8A1 | 8th lens element | -4.722 | 1.513 | 1.545 | 55.987 | 999.996 | Plastic |
| L8A2 | | -5.211 | 0.267 | | | | |
| TFA1 | Filtering unit | INFINITY | 0.294 | 1.560 | 51.300 | | |
| TFA2 | | INFINITY | 0.024 | | | | |
| IMA | Image plane | INFINITY | | | | | |

FIG. 44

| \multicolumn{6}{c|}{Embodiment 10} |
||||||
| \multicolumn{6}{c|}{Aspherical Parameters} |
| Surface# | K | a4 | a6 | a8 | a10 |
| --- | --- | --- | --- | --- | --- |
| L1A1 | -1.229630E-01 | 2.225712E-04 | -2.142889E-04 | 1.638793E-04 | -9.161894E-05 |
| L1A2 | -1.912981E+01 | 8.039760E-03 | -3.912958E-03 | -2.711818E-05 | 1.976880E-04 |
| L2A1 | -8.249482E+00 | 2.776871E-03 | 2.120770E-03 | -3.615433E-03 | 1.660845E-03 |
| L2A2 | 6.701570E-01 | -7.200007E-03 | 6.794991E-03 | -3.683060E-03 | 1.203706E-03 |
| L3A1 | -2.375492E+00 | -2.174653E-03 | 1.494498E-03 | -5.151622E-04 | 1.472176E-04 |
| L3A2 | -2.232621E+00 | -2.347702E-03 | 9.039998E-04 | -1.269025E-03 | 7.544513E-04 |
| L4A1 | 0.000000E+00 | -6.292771E-03 | -2.034390E-03 | 1.026978E-03 | -7.033130E-04 |
| L4A2 | 0.000000E+00 | -5.908926E-03 | -1.091555E-02 | 1.310190E-02 | -1.033569E-02 |
| L5A1 | -1.891154E+01 | 2.000137E-03 | -2.115635E-02 | 2.117208E-02 | -1.345380E-02 |
| L5A2 | 0.000000E+00 | -1.342353E-05 | -2.160714E-02 | 1.970270E-02 | -1.177208E-02 |
| L6A1 | 3.209266E-02 | 2.092028E-03 | -4.578994E-03 | -1.507020E-03 | 1.780560E-03 |
| L6A2 | 4.229634E-03 | 5.558251E-03 | -7.070521E-03 | 1.984807E-03 | -5.937428E-04 |
| L7A1 | 8.389404E+00 | -6.113117E-03 | -1.234877E-02 | 5.991256E-03 | -1.473160E-03 |
| L7A2 | 9.338310E+00 | 5.982316E-03 | -1.051354E-02 | 3.170316E-03 | -4.983312E-04 |
| L8A1 | -4.072216E-01 | 2.535176E-03 | -1.264325E-02 | 2.687188E-03 | -3.052394E-04 |
| L8A2 | 0.000000E+00 | 7.098910E-02 | -2.192576E-02 | 3.748199E-03 | -3.994618E-04 |
| Surface# | a12 | a14 | a16 | a18 | a20 |
| L1A1 | 2.484920E-05 | -3.688200E-06 | 2.002104E-07 | | |
| L1A2 | -1.511079E-05 | -4.619455E-06 | 6.348803E-07 | | |
| L2A1 | -3.297834E-04 | 2.979415E-05 | -6.875093E-07 | | |
| L2A2 | -9.568749E-05 | -2.702266E-05 | 5.212655E-06 | | |
| L3A1 | -4.808571E-05 | 1.182978E-05 | -1.318394E-06 | | |
| L3A2 | -2.918417E-04 | 5.768751E-05 | -4.697825E-06 | | |
| L4A1 | 1.858002E-04 | -2.886412E-05 | 2.055258E-06 | | |
| L4A2 | 5.050656E-03 | -1.583597E-03 | 3.070531E-04 | | |
| L5A1 | 5.427767E-03 | -1.401086E-03 | 2.197070E-04 | -1.870045E-05 | 6.514329E-07 |
| L5A2 | 4.542604E-03 | -1.124828E-03 | 1.704193E-04 | -1.425748E-05 | 5.037211E-07 |
| L6A1 | -1.089044E-03 | 3.813916E-04 | -7.403178E-05 | 7.530415E-06 | -3.187953E-07 |
| L6A2 | 1.188038E-04 | -9.830250E-06 | -1.962686E-07 | 7.478312E-08 | -3.055981E-09 |
| L7A1 | 2.243039E-04 | -2.498659E-05 | 2.117932E-06 | -1.144708E-07 | 2.726144E-09 |
| L7A2 | 4.552844E-05 | -2.400041E-06 | 6.371597E-08 | -3.937300E-10 | -1.062900E-11 |
| L8A1 | 2.088406E-05 | -8.894709E-07 | 2.306593E-08 | -3.321990E-10 | 2.025000E-12 |
| L8A2 | 2.756716E-05 | -1.247661E-06 | 3.614694E-08 | -6.115240E-10 | 4.603000E-12 |

FIG. 45

| Embodiment | 1st | 2nd | 3rd | 4th | 5th |
| --- | --- | --- | --- | --- | --- |
| EFL | 7.224 | 7.250 | 7.314 | 7.731 | 7.276 |
| Fno | 1.500 | 1.500 | 1.750 | 1.800 | 1.500 |
| HFOV | 35.689 | 37.772 | 36.932 | 36.564 | 36.618 |
| ImgH | 6.200 | 6.200 | 6.200 | 6.200 | 6.200 |
| T1 | 1.484 | 1.661 | 1.197 | 1.133 | 1.398 |
| G12 | 0.221 | 0.125 | 0.263 | 0.291 | 0.294 |
| T2 | 0.233 | 0.204 | 0.200 | 0.200 | 0.272 |
| G23 | 0.345 | 0.352 | 0.535 | 0.645 | 0.251 |
| T3 | 0.797 | 0.443 | 0.550 | 0.412 | 0.855 |
| G34 | 0.707 | 0.770 | 0.535 | 0.553 | 0.551 |
| T4 | 0.551 | 0.400 | 0.564 | 0.492 | 0.707 |
| G45 | 0.257 | 0.178 | 0.707 | 0.922 | 0.310 |
| T5 | 0.453 | 0.405 | 0.448 | 0.408 | 0.673 |
| G56 | 0.690 | 0.634 | 0.480 | 0.356 | 0.283 |
| T6 | 0.571 | 0.754 | 0.200 | 0.200 | 0.716 |
| G67 | 0.021 | 0.156 | 0.020 | 0.020 | 0.221 |
| T7 | 0.910 | 0.918 | 0.782 | 0.688 | 0.865 |
| G78 | 0.791 | 0.826 | 1.437 | 1.723 | 0.695 |
| T8 | 0.307 | 0.386 | 0.368 | 0.432 | 0.385 |
| G8P | 0.267 | 0.267 | 0.267 | 0.267 | 0.267 |
| TTF | 0.294 | 0.294 | 0.294 | 0.294 | 0.294 |
| GFP | 0.060 | 0.106 | 0.020 | 0.020 | 0.095 |
| V1 | 55.987 | 55.987 | 55.987 | 55.987 | 55.987 |
| V2 | 20.373 | 19.480 | 19.480 | 19.480 | 19.480 |
| V3 | 55.987 | 55.987 | 55.987 | 55.987 | 55.987 |
| V4 | 19.480 | 19.480 | 19.480 | 19.480 | 19.480 |
| V5 | 28.433 | 55.987 | 55.987 | 55.987 | 55.987 |
| V6 | 19.480 | 19.480 | 19.480 | 19.480 | 19.480 |
| V7 | 55.987 | 55.987 | 55.987 | 55.987 | 55.987 |
| V8 | 25.920 | 55.987 | 55.987 | 55.987 | 55.987 |
| BFL | 0.620 | 0.666 | 0.580 | 0.581 | 0.656 |
| ALT | 5.305 | 5.172 | 4.308 | 3.965 | 5.870 |
| AAG | 3.033 | 3.041 | 3.977 | 4.510 | 2.606 |
| TL | 8.338 | 8.214 | 8.285 | 8.476 | 8.476 |
| TTL | 8.958 | 8.880 | 8.866 | 9.056 | 9.132 |
| EPD | 4.816 | 4.833 | 4.180 | 4.295 | 4.851 |

FIG. 46A

| Embodiment | 1st | 2nd | 3rd | 4th | 5th |
|---|---|---|---|---|---|
| Fno*(D12t32+D41t52)/(T1+G34) | 1.955 | 1.301 | 3.300 | 3.600 | 2.587 |
| ALT*Fno/T1 | 5.363 | 4.671 | 6.300 | 6.300 | 6.299 |
| (D12t32+D41t52)/G34 | 4.038 | 2.739 | 6.100 | 6.100 | 6.100 |
| (V4+V6+V8)/V5 | 2.282 | 1.696 | 1.696 | 1.696 | 1.696 |
| Fno*TTL/(T1+D71t82) | 3.848 | 3.514 | 4.100 | 4.100 | 4.099 |
| D21t32/G34 | 1.942 | 1.299 | 2.399 | 2.276 | 2.500 |
| (D21t32+T6+G67)/(T4+G45) | 2.433 | 3.300 | 1.184 | 1.045 | 2.276 |
| (EPD+ImgH)/ALT | 2.076 | 2.133 | 2.409 | 2.647 | 1.882 |
| (T6+G67+G78)/T8 | 4.500 | 4.500 | 4.500 | 4.500 | 4.241 |
| (G12+D21t32)/T4 | 2.895 | 2.808 | 2.745 | 3.147 | 2.363 |
| D21t32/G45 | 5.350 | 5.600 | 1.816 | 1.363 | 4.448 |
| (T5+T6)/G56 | 1.483 | 1.829 | 1.352 | 1.707 | 4.900 |
| V5+V6 | 47.913 | 75.467 | 75.467 | 75.467 | 75.467 |
| V3+V4 | 75.467 | 75.467 | 75.467 | 75.467 | 75.467 |
| V4+V7 | 75.467 | 75.467 | 75.467 | 75.467 | 75.467 |
| TL/EPD | 1.731 | 1.699 | 1.982 | 1.973 | 1.747 |
| EFL/(T1+G34) | 3.297 | 2.983 | 4.223 | 4.587 | 3.733 |
| Fno*(T2+T3+T5+T6+G78+BFL)/AAG | 1.714 | 1.627 | 1.503 | 1.406 | 2.226 |

FIG. 46B

| Embodiment | 6th | 7th | 8th | 9th | 10th |
|---|---|---|---|---|---|
| EFL | 7.274 | 7.239 | 7.467 | 6.939 | 7.868 |
| Fno | 1.700 | 1.500 | 2.229 | 1.432 | 1.748 |
| HFOV | 37.907 | 37.907 | 37.907 | 37.907 | 37.907 |
| ImgH | 5.779 | 6.396 | 5.424 | 5.276 | 5.975 |
| T1 | 1.554 | 1.305 | 1.141 | 1.522 | 1.615 |
| G12 | 0.275 | 0.134 | 0.053 | 0.290 | 0.094 |
| T2 | 0.235 | 0.200 | 0.200 | 0.200 | 0.200 |
| G23 | 0.283 | 0.637 | 0.111 | 0.327 | 0.488 |
| T3 | 0.518 | 0.432 | 0.231 | 0.447 | 0.366 |
| G34 | 0.625 | 0.780 | 0.217 | 0.627 | 0.537 |
| T4 | 0.557 | 0.390 | 0.263 | 0.504 | 0.334 |
| G45 | 0.189 | 0.451 | 0.127 | 0.216 | 0.417 |
| T5 | 0.471 | 0.331 | 0.328 | 0.214 | 0.417 |
| G56 | 0.592 | 0.920 | 0.595 | 0.390 | 0.567 |
| T6 | 0.705 | 0.200 | 0.256 | 0.397 | 0.383 |
| G67 | 0.057 | 0.034 | 0.038 | 0.026 | 0.039 |
| T7 | 0.957 | 0.574 | 0.224 | 0.793 | 0.990 |
| G78 | 0.828 | 1.247 | 2.330 | 0.782 | 0.896 |
| T8 | 0.586 | 0.329 | 0.583 | 1.545 | 1.513 |
| G8P | 0.267 | 0.267 | 0.267 | 0.267 | 0.267 |
| TTF | 0.294 | 0.294 | 0.294 | 0.294 | 0.294 |
| GFP | 0.029 | 0.077 | 0.611 | 0.035 | 0.024 |
| V1 | 55.987 | 55.987 | 55.987 | 55.987 | 55.987 |
| V2 | 19.480 | 19.480 | 19.480 | 19.480 | 19.480 |
| V3 | 55.987 | 55.987 | 55.987 | 55.987 | 55.987 |
| V4 | 19.480 | 19.480 | 37.533 | 19.480 | 19.480 |
| V5 | 55.987 | 55.987 | 55.987 | 55.987 | 55.987 |
| V6 | 19.480 | 19.480 | 37.533 | 19.480 | 19.480 |
| V7 | 55.987 | 55.987 | 55.987 | 55.987 | 55.987 |
| V8 | 55.987 | 55.987 | 55.987 | 55.987 | 55.987 |
| BFL | 0.589 | 0.638 | 1.171 | 0.595 | 0.584 |
| ALT | 5.583 | 3.761 | 3.226 | 5.622 | 5.818 |
| AAG | 2.849 | 4.205 | 3.472 | 2.658 | 3.037 |
| TL | 8.432 | 7.966 | 6.698 | 8.280 | 8.856 |
| TTL | 9.021 | 8.603 | 7.869 | 8.875 | 9.440 |
| EPD | 4.279 | 4.826 | 3.350 | 4.846 | 4.500 |

FIG. 46C

| Embodiment | 6th | 7th | 8th | 9th | 10th |
|---|---|---|---|---|---|
| Fno*(D12t32+D41t52)/(T1+G34) | 1.972 | 1.853 | 2.155 | 1.464 | 1.882 |
| ALT*Fno/T1 | 6.107 | 4.324 | 6.300 | 5.289 | 6.300 |
| (D12t32+D41t52)/G34 | 4.044 | 3.301 | 6.056 | 3.504 | 4.312 |
| (V4+V6+V8)/V5 | 1.696 | 1.696 | 2.341 | 1.696 | 1.696 |
| Fno*TTL/(T1+D71t82) | 3.906 | 3.735 | 4.100 | 2.738 | 3.292 |
| D21t32/G34 | 1.658 | 1.627 | 2.500 | 1.553 | 1.961 |
| (D21t32+T6+G67)/(T4+G45) | 2.409 | 1.788 | 2.142 | 1.939 | 1.963 |
| (EPD+ImgH)/ALT | 1.802 | 2.984 | 2.720 | 1.800 | 1.800 |
| (T6+G67+G78)/T8 | 2.711 | 4.500 | 4.500 | 0.780 | 0.871 |
| (G12+D21t32)/T4 | 2.353 | 3.600 | 2.261 | 2.507 | 3.429 |
| D21t32/G45 | 5.479 | 2.815 | 4.261 | 4.508 | 2.526 |
| (T5+T6)/G56 | 1.984 | 0.577 | 0.980 | 1.566 | 1.411 |
| V5+V6 | 75.467 | 75.467 | 93.520 | 75.467 | 75.467 |
| V3+V4 | 75.467 | 75.467 | 93.520 | 75.467 | 75.467 |
| V4+V7 | 75.467 | 75.467 | 93.520 | 75.467 | 75.467 |
| TL/EPD | 1.971 | 1.651 | 1.999 | 1.709 | 1.968 |
| EFL/(T1+G34) | 3.338 | 3.472 | 5.498 | 3.228 | 3.656 |
| Fno*(T2+T3+T5+T6+G78+BFL)/AAG | 1.996 | 1.087 | 2.899 | 1.420 | 1.638 |

FIG. 46D

OPTICAL IMAGING LENS

CROSS-REFERENCE TO RELATED APPLICATIONS

This application claims priority to P.R.C. Patent Application No. 202111624128.1 titled "Optical Imaging Lens," filed on Dec. 28, 2021, with the China National Intellectual Property Administration (CNIPA) of the People's Republic of China.

TECHNICAL FIELD

The present disclosure relates to optical imaging lenses, and particularly, optical imaging lenses having, in some embodiments, eight lens elements.

BACKGROUND

As the specifications of mobile electronical devices rapidly evolve, various types of key components, such as optical imaging lenses, are developed. Desirable objectives for designing an optical imaging lens may not be limited to great aperture stop and compact sizes, but may also include high pixel number along with high resolution. High pixel number implies that an image height must be increased by using a greater image sensor accepting imaging ray. Traditional designs providing high pixel number may force the resolution to be raised, and enlarging aperture stop in such designs will raise difficulty of design. Accordingly, adding lens elements in a limit system length, promoting resolution and enlarging aperture stop, along with increasing image height in an optical imaging lens may be a challenge in the industry.

SUMMARY

In light of aforesaid problems, the present disclosure provides for optical imaging lenses showing a slim and compact appearance, small Fno, great image height and good imaging quality.

In an example embodiment, an optical imaging lens may be used for shooting a video or picture in a mobile electronical device, such as cell phone, digital camera, tablet computer, personal digital assistant (PDA), or augmented reality (AR) helmet-mounted display, virtual reality (VR) helmet-mounted display, mixed reality (MR) helmet-mounted display, etc. The optical imaging lens may comprise eight lens elements, hereinafter referred to as first, second, third, fourth, fifth, sixth, seventh and eighth lens elements and positioned sequentially from an object side to an image side along an optical axis. Each of the first, second, third, fourth, fifth, sixth, seventh and eighth lens elements may also have an object-side surface facing toward the object side and allowing imaging rays to pass through. Each of the first, second, third, fourth, fifth, sixth, seventh and eighth lens elements may also have an image-side surface facing toward the image side and allowing the imaging rays to pass through. Through configuration of convex/concave surface shape of the eight lens elements, the optical imaging lens may increase resolution and enlarge aperture stop and image height at the same time.

In the specification, parameters used here are defined as follows: A thickness of the first lens element along the optical axis is represented by T1. A distance from the image-side surface of the first lens element to the object-side surface of the second lens element along the optical axis, i.e. an air gap between the first lens element and the second lens element along the optical axis, is represented by G12. A thickness of the second lens element along the optical axis is represented by T2. A distance from the image-side surface of the second lens element to the object-side surface of the third lens element along the optical axis, i.e. an air gap between the second lens element and the third lens element along the optical axis, is represented by G23. A thickness of the third lens element along the optical axis is represented by T3. A distance from the image-side surface of the third lens element to the object-side surface of the fourth lens element along the optical axis, i.e. an air gap between the third lens element and the fourth lens element along the optical axis, is represented by G34. A thickness of the fourth lens element along the optical axis is represented by T4. A distance from the image-side surface of the fourth lens element to the object-side surface of the fifth lens element along the optical axis, i.e. an air gap between the fourth lens element and the fifth lens element along the optical axis, is represented by G45. A thickness of the fifth lens element along the optical axis is represented by T5. A distance from the image-side surface of the fifth lens element to the object-side surface of the sixth lens element along the optical axis, i.e. an air gap between the fifth lens element and the sixth lens element along the optical axis, is represented by G56. A thickness of the sixth lens element along the optical axis is represented by T6. A distance from the image-side surface of the sixth lens element to the object-side surface of the seventh lens element along the optical axis, i.e. an air gap between the sixth lens element and the seventh lens element along the optical axis, is represented by G67. A thickness of the seventh lens element along the optical axis is represented by T7. A distance from the image-side surface of the seventh lens element to the object-side surface of the eighth lens element along the optical axis, i.e. an air gap between the seventh lens element and the eighth lens element along the optical axis, is represented by G78. A thickness of the eighth lens element along the optical axis is represented by T8. An air gap between the eighth lens element and a filtering unit along the optical axis is represented by G8F, a thickness of the filtering unit along the optical axis is represented by TTF, an air gap between the filtering unit and an image plane along the optical axis is represented by GFP, a focal length of the first lens element is represented by f1, a focal length of the second lens element is represented by f2, a focal length of the third lens element is represented by f3, a focal length of the fourth lens element is represented by f4, a focal length of the fifth lens element is represented by f5, a focal length of the sixth lens element is represented by f6, a focal length of the seventh lens element is represented by f7, a focal length of the eighth lens element is represented by f8, a refractive index of the first lens element is represented by n1, a refractive index of the second lens element is represented by n2, a refractive index of the third lens element is represented by n3, a refractive index of the fourth lens element is represented by n4, a refractive index of the fifth lens element is represented by n5, a refractive index of the sixth lens element is represented by n6, a refractive index of the seventh lens element is represented by n7, a refractive index of the eighth lens element is represented by n8, an Abbe number of the first lens element is represented by V1, an Abbe number of the second lens element is represented by V2, an Abbe number of the third lens element is represented by V3, an Abbe number of the fourth lens element is represented by V4, an Abbe number of the fifth lens element is represented by V5, an Abbe number of the sixth lens element is represented by V6, an Abbe number of the seventh lens element is represented by V7, an Abbe number of the eighth lens element is represented by V8, a half field of view of the optical imaging lens is represented by HFOV, a f-number of the optical imaging lens is represented by Fno, and an effective focal length of the optical imaging lens is represented by EFL. A distance from the object-side surface of the first lens element to the image plane along the optical axis, i.e. a system length, is represented by TTL. A sum of the thicknesses of all eight lens elements along the optical axis, i.e. a sum of T1, T2, T3, T4, T5, T6, T7 and T8, is represented by ALT. A sum of the seven air gaps between the first lens element and the eighth lens element along the optical axis, i.e. a sum of G12, G23, G34, G45, G56, G67 and G78, is represented by AAG. A back focal length of the optical imaging lens, which is defined as the distance from the image-side surface of the eighth lens element to the image plane along the optical axis, i.e. a sum of G8F, TTF and GFP, is represented by BFL. A distance from the object-side surface of the first lens element to the image-side surface of the eighth lens element along the optical axis is represented by TL. An image height of optical imaging lens is represented by ImgH. An entrance pupil diameter of the optical imaging lens, equal to the effective focal length of the optical imaging lens divided by the f-number, is represented by EPD. A distance from the image-side surface of the first lens element to the image-side surface of the third lens element along the optical axis is represented by D12t32, a distance from the object-side surface of the fourth lens element to the image-side surface of the fifth lens element along the optical axis is represented by D41t52, a distance from the object-side surface of the seventh lens element to the image-side surface of the eight lens element along the optical axis is represented by D71t82, and a distance from the object-side surface of the second lens element to the image-side surface of the third lens element along the optical axis is represented by D21t32.

In an aspect of the present disclosure, in the optical imaging lens, the third lens element has positive refracting power, an optical axis region of the object-side surface of the fourth lens element is convex, an optical axis region of the object-side surface of the fifth lens element is convex, and an optical axis region of the image-side surface of the fifth lens element is concave, an optical axis region of the object-side surface of the sixth lens element is concave, a periphery region of the object-side surface of the eighth lens element is convex, lens elements of the optical imaging lens are only the eight lens elements describe above, and the optical imaging lens satisfies the inequality:

Fno*(D12t32+D41t52)/(T1+G34)≤3.300    Inequality (1).

In another aspect of the present disclosure, in the optical imaging lens, the third lens element has positive refracting power, an optical axis region of the image-side surface of the fourth lens element is concave, and a periphery region of the image-side surface of the fourth lens element is convex, an optical axis region of the image-side surface of the fifth lens element is concave, the sixth lens element has positive refracting power, and an optical axis region of the object-side surface of the sixth lens element is concave, the seventh lens element has positive refracting power, lens elements of the optical imaging lens are only the eight lens elements describe above, and the optical imaging lens satisfies the inequality:

Fno*(D12t32+D41t52)/(T1+G34)≤3.600    Inequality (2).

In yet another aspect of the present disclosure, in the optical imaging lens, the third lens element has positive refracting power, and a periphery region of the object-side surface of the third lens element is convex, an optical axis region of the object-side surface of the fourth lens element is convex, and a periphery region of the image-side surface of the fourth lens element is convex, an optical axis region of the object-side surface of the fifth lens element is convex, and an optical axis region of the image-side surface of the fifth lens element is concave, an optical axis region of the object-side surface of the sixth lens element is concave, an optical axis region of the image-side surface of the seventh lens element is concave, lens elements of the optical imaging lens are only the eight lens elements describe above, and the optical imaging lens satisfies Inequality (1).

In another example embodiment, other inequality(s), such as those relating to the ratio among parameters could be taken into consideration. For example:

| ALT*Fno/T1≤6.300 | Inequality (3); |
|---|---|
| (D12t32+D41t52)/G34≤6.100 | Inequality (4); |
| (V4+V6+V8)/V5≤2.400 | Inequality (5); |
| Fno*TTL/(T1+D71t82)≤4.100 | Inequality (6); |
| D21t32/G34≤2.500 | Inequality (7); |
| (D21t32+T6+G67)/(T4+G45)≤3.300 | Inequality (8); |
| (EPD+ImgH)/ALT≥1.800 | Inequality (9); |
| (T6+G67+G78)/T8≤4.500 | Inequality (10); |
| (G12+D21t32)/T4≤3.600 | Inequality (11); |
| D21t32/G45≤5.600 | Inequality (12); |
| (T5+T6)/G56≤4.900 | Inequality (13); |
| V5+V6≤100.000 | Inequality (14); |
| V3+V4≤100.000 | Inequality (15); |
| V4+V7≤100.000 | Inequality (16); |
| TL/EPD≤2.000 | Inequality (17); |
| EFL/(T1+G34)≤5.500 | Inequality (18); and/or |
| Fno*(T2+T3+T5+T6+G78+BFL)/AAG≤2.900 | Inequality (19); |

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

It is readily understood that through controlling the convex or concave shape of the surfaces, the optical imaging lens of the present invention may provide for increased resolution, enlarged aperture stop and image height and good imaging quality.

BRIEF DESCRIPTION OF THE DRAWINGS

Example embodiments will be more readily understood from the following detailed description when read in conjunction with the appended drawing, in which:

FIG. 3 depicts a cross-sectional view showing a first example of determining the shape of lens element regions and the boundaries of regions;

FIG. 4 depicts a cross-sectional view showing a second example of determining the shape of lens element regions and the boundaries of regions;

FIG. 5 depicts a cross-sectional view showing a third example of determining the shape of lens element regions and the boundaries of regions;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of a tenth embodiment of an optical imaging lens according to the present disclosure;

FIG. 45 depicts a table of aspherical data of a tenth embodiment of the optical imaging lens according to the present disclosure;

FIGS. 46A, 46B, 46C and 46D depict tables for the values of Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of all ten example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

Figure 1:
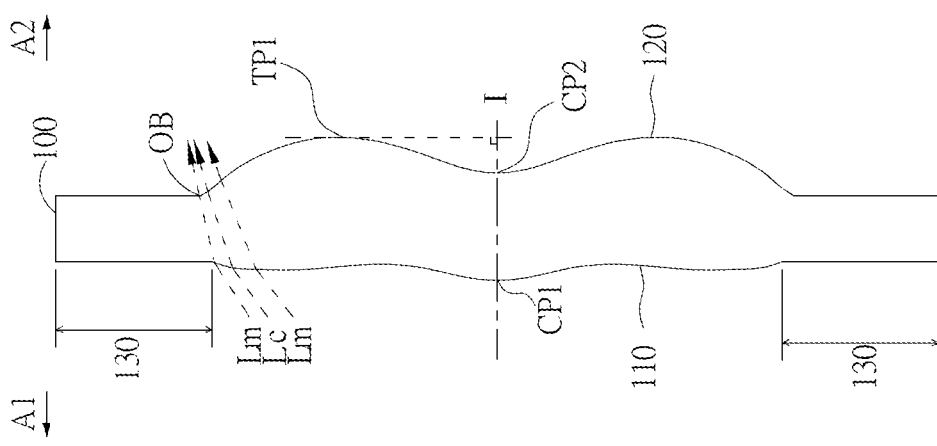
FIG. 1 depicts a cross-sectional view of one single lens element according to the present disclosure.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
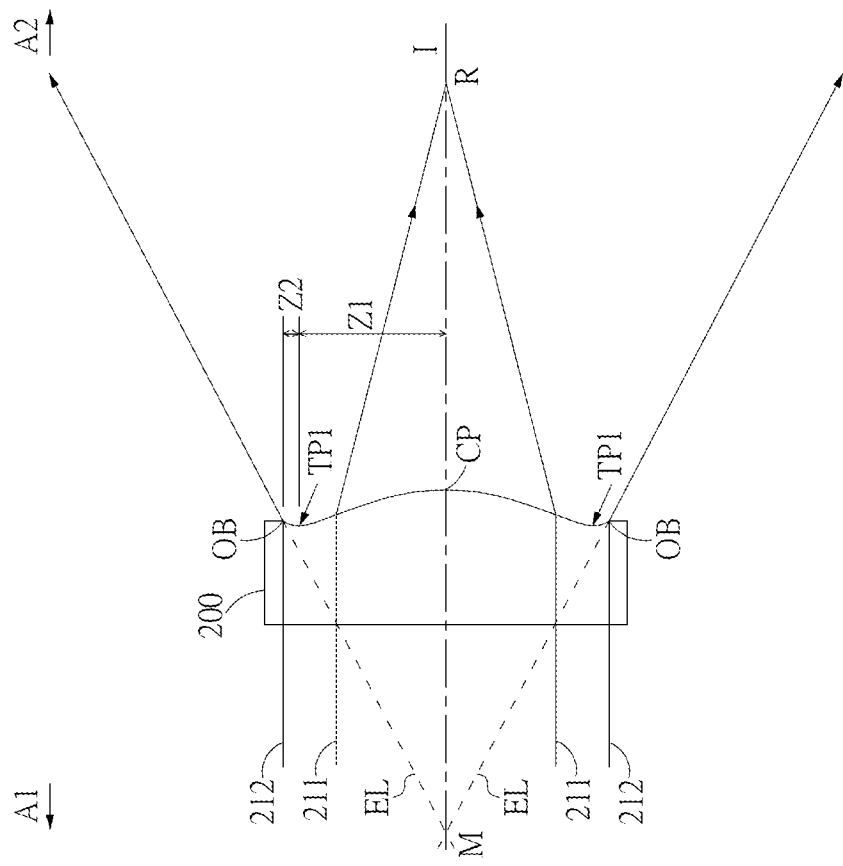
FIG. 2 depicts a cross-sectional view showing the relation between the shape of a portion and the position where a collimated ray meets the optical axis.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, example embodiments of an optical imaging lens may comprise a first lens element, a second lens element, a third lens element, a fourth lens element, a fifth lens element, a sixth lens element, a seventh lens element and an eighth lens element. Each of the lens elements may comprise an object-side surface facing toward an object side allowing imaging rays to pass through and an image-side surface facing toward an image side allowing the imaging rays to pass through. These lens elements may be arranged sequentially from the object side to the image side along an optical axis, and example embodiments of the lens may comprise no other lens elements having refracting power beyond the eight lens elements. Through controlling the convex or concave shape of the surfaces, the optical imaging lens in example embodiments may provide for higher resolution along with enlarged aperture stop and image height.

Example embodiments of an optical imaging lens may be designed with configuration of refracting power and surface shapes, for example: combining positive refracting power of the third lens element, a concave optical axis region of the image-side surface of the fifth lens element, a concave optical axis region of the object-side surface of the sixth lens element, a convex periphery region of the object-side surface of the eighth lens element and satisfying Fno*(D12t32+D41t52)/(T1+G34)≤3.300 that facilitate presenting great aperture and image height. Preferably, the optical imaging lens may satisfy 1.200≤Fno*(D12t32+D41t52)/(T1+G34) ≤3.300. When the optical imaging lens is further designed with a convex optical axis region of the object-side surface of the fourth lens element and a convex optical axis region of the object-side surface of the fifth lens element, TTL may be effectively decreased. Additionally, when the optical imaging lens is further designed with positive refracting power of the first lens element or negative refracting power of the second lens element, it may be benefit to match the surface shape of the third and fourth lens elements to modify longitudinal spherical aberration.

Example embodiments of an optical imaging lens may be designed with configuration of refracting power and surface shapes, for example: combining positive refracting power of the third lens element, a concave optical axis region of the image-side surface of the fifth lens element, a concave optical axis region of the object-side surface of the sixth lens element and satisfying Fno*(D12t32+D41t52)/(T1+G34) ≤3.600 that facilitate presenting great aperture and image height. Preferably, the optical imaging lens may satisfy 1.200≤Fno*(D12t32+D41t52)/(T1+G34)≤3.600. When the optical imaging lens is further designed with a concave optical axis region of the image-side surface of the fourth lens element and a convex periphery region of the image-side surface of the fourth lens element, TTL may be effectively decreased. When the optical imaging lens is further designed with positive refracting power of the sixth lens element and positive refracting power of the seventh lens element, it may be benefit to adjust aberration within 0.0~0.2 field of view. Additionally, when the optical imaging lens is further designed with positive refracting power of the first lens element or negative refracting power of the second lens element, it may be benefit to match the surface shape of the third and fourth lens elements to modify longitudinal spherical aberration.

Example embodiments of an optical imaging lens may be designed with configuration of refracting power and surface shapes, for example: combining positive refracting power of the third lens element, a concave optical axis region of the image-side surface of the fifth lens element, a concave optical axis region of the object-side surface of the sixth lens element, a concave optical axis region of the image-side surface of the seventh lens element and satisfying Fno*(D12t32+D41t52)/(T1+G34)≤3.300 that facilitate presenting great aperture and image height. Preferably, the optical imaging lens may satisfy 1.200≤Fno*(D12t32+D41t52)/(T1+G34)≤3.300. When the optical imaging lens is further designed with a convex periphery region of the object-side surface of the third lens element, a convex optical axis region of the object-side surface of the fourth lens element, a convex periphery region of the image-side surface of the fourth lens element and a convex optical axis region of the object-side surface of the fifth lens element, TTL may be effectively decreased. Additionally, when the optical imaging lens is further designed with positive refracting power of the first lens element or negative refracting power of the second lens element, it may be benefit to match the surface shape of the third and fourth lens elements to modify longitudinal spherical aberration.

When example embodiments of an optical imaging lens satisfy Fno*(D12t32+D41t52)/(T1+G34)≤3.300, compared with satisfying Fno*(D12t32+D41t52)/(T1+G34)≤3.600, it may be beneficial to present a larger aperture.

When example embodiments of an optical imaging lens are designed with positive refracting power of at least one of the first and sixth lens elements, it may be beneficial to adjust aberration within 0.0~0.2 field of view. Additionally, in the optical imaging lens, when at least one of the second and fourth lens elements has negative refracting power, it may be beneficial to match the third lens element to adjust aberration.

When example embodiments of an optical imaging lens satisfy (V4+V6+V8)/V5 ≤2.400, V5+V6 ≤100.000, V3+V4 ≤100.000 or V4+V7 ≤100.000, MTF (modulation transfer function) may be increased to increase resolution; preferably, the optical imaging lens may satisfy 1.200≤(V4+V6+V8)/V5 ≤2.400, 38.000≤V5+V6 ≤100.000, 38.000≤V3+V4 ≤100.000 or 38.000 V4+V7 ≤100.000.

When the optical imaging lens provided with great aperture and image height satisfies at least one of the inequalities listed below, a proper value of the thickness of the lens elements and/or the air gaps between the lens elements may be kept to avoid any excessive value of the parameters which may thicken the system length of the whole system of the optical imaging lens, and to avoid any insufficient value of the parameters which may increase the production difficulty of the optical imaging lens:

ALT*Fno/T1 ≤6.300, and preferably, the optical imaging lens may satisfy 4.000≤ALT*Fno/T1 ≤6.300;

(D12t32+D41t52)/G34 ≤6.100, and preferably, the optical imaging lens may satisfy 2.400≤(D12t32+D41t52)/G34 ≤6.100;

Fno*TTL/(T1+D71t82)≤4.100, and preferably, the optical imaging lens may satisfy 2.400≤Fno*TTL/(T1+D71 t82)≤4.100;

D21t32/G34 ≤2.500, and preferably, the optical imaging lens may satisfy 1.100≤D21 t32/G34 ≤2.500;

(D21t32+T6+G67)/(T4+G45)≤3.300, and preferably, the optical imaging lens may satisfy 0.900≤(D21t32+T6+G67)/(T4+G45)≤3.300;

(EPD+ImgH)/ALT≥1.800, and preferably, the optical imaging lens may satisfy 1.800≤(EPD+ImgH)/ALT≤3.000;

(T6+G67+G78)/T8 ≤4.500, and preferably, the optical imaging lens may satisfy 0.700≤(T6+G67+G78)/T8 ≤4.500;

(G12+D21t32)/T4 ≤3.600, and preferably, the optical imaging lens may satisfy 2.000≤(G12+D21t32)/T4 ≤3.600;

D21t32/G45 ≤5.600, and preferably, the optical imaging lens may satisfy 1.200≤D21t32/G45 ≤5.600;

(T5+T6)/G56 ≤4.900, and preferably, the optical imaging lens may satisfy 0.500≤(T5+T6)/G56 ≤4.900;

TL/EPD≤2.000, and preferably, the optical imaging lens may satisfy 1.500≤TL/EPD≤2.000;

EFL/(T1+G34)≤5.500, and preferably, the optical imaging lens may satisfy 2.600≤EFL/(T1+G34)≤5.500;

Fno*(T2+T3+T5+T6+G78+BFL)/AAG≤2.900, and preferably, the optical imaging lens may satisfy 0.900≤Fno*(T2+T3+T5+T6+G78+BFL)/AAG≤2.900.

In light of the unpredictability in an optical system, satisfying these inequalities listed above may result in shortening the system length of the optical imaging lens, enlarging the image height, promoting the imaging quality and/or increasing the yield in the assembly process in the present disclosure.

When implementing example embodiments, more details about the convex or concave surface or refracting power could be incorporated for one specific lens element or broadly for a plurality of lens elements to improve the control for the system performance and/or resolution, or promote the yield. For example, in an example embodiment, each lens element may be made from all kinds of transparent material, such as glass, resin, etc. It is noted that the details listed here could be incorporated in example embodiments if no inconsistency occurs.

Figure 6:
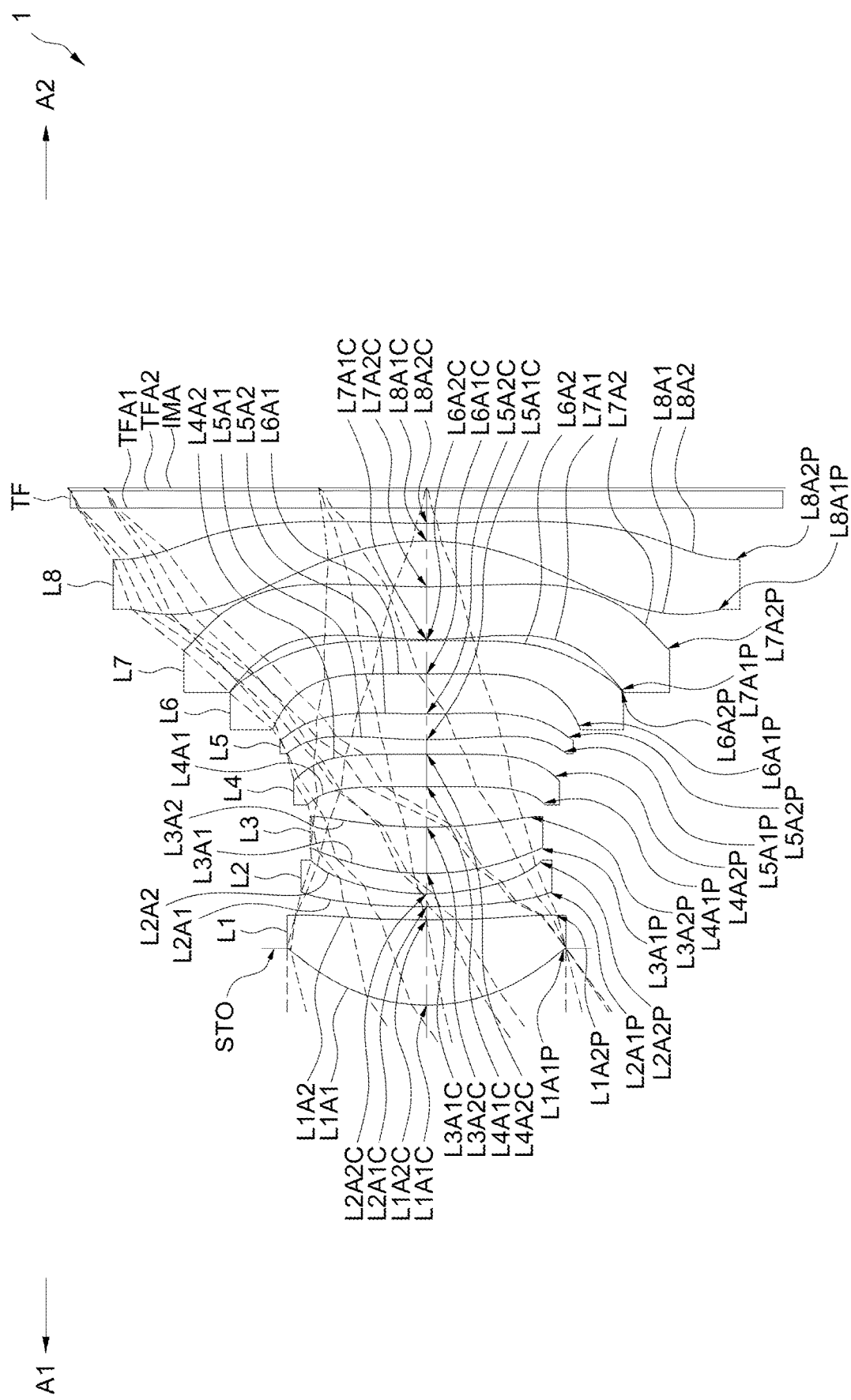
FIG. 6 depicts a cross-sectional view of a first embodiment of an optical imaging lens according to the present disclosure.

Several example embodiments and associated optical data will now be provided for illustrating example embodiments of an optical imaging lens with higher resolution, and enlarged field of view. Reference is now made to FIGS. 6-9. FIG. 6 illustrates an example cross-sectional view of an optical imaging lens 1 according to a first example embodiment. FIGS. 7A, 7B, 7C and 7D show example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop STO, a first lens element L1, a second lens element L2, a third lens element L3, a fourth lens element L4, a fifth lens element L5, a sixth lens element L6, a seventh lens element L7 and an eighth lens element L8. A filtering unit TF and an image plane IMA of an image sensor may be positioned at the image side A2 of the optical lens 1. Each of the first, second, third, fourth, fifth, sixth, seventh and eighth lens elements L1, L2, L3, L4, L5, L6, L7, L8 and the filtering unit TF may comprise an object-side surface L1A1/L2A1/L3A1/L4A1/L5A1/L6A1/L7A1/L8A1/TFA1 facing toward the object side A1 and an image-side surface L1A2/L2A2/L3A2/L4A2/L5A2/L6A2/L7A2/L8A2/TFA2 facing toward the image side A2. The filtering unit TF, positioned between the eighth lens element L8 and the image plane IMA, may selectively absorb ray with specific wavelength(s) from the ray passing through optical imaging lens 1. The example embodiment of the filtering unit TF which may selectively absorb ray with specific wavelength(s) from the ray passing through optical imaging lens 1 may be an IR cut filter (infrared cut filter). Then, IR ray may be absorbed, and this may prohibit the IR ray, which might not be seen by human eyes, from producing an image on the image plane IMA.

Please refer to the drawings for the details of each lens element of the optical imaging lens 1, which may be constructed by plastic material or other material for light weight.

In the first example embodiment, the first lens element L1 may have positive refracting power. On the object-side surface UAL both an optical axis region L1A1C and a periphery region L1A1P may be convex. On the image-side surface L1A2, an optical axis region L1A2C may be concave, and a periphery region L1A2P may be convex.

The second lens element L2 may have negative refracting power. On the object-side surface L2A1, both an optical axis region L2A1C and a periphery region L2A1P may be convex. On the image-side surface L2A2, both an optical axis region L2A2C and a periphery region L2A2P may be concave.

The third lens element L3 may have positive refracting power. On the object-side surface L3A1, both an optical axis region L3A1C and a periphery region L3A1P may be convex. On the image-side surface L3A2, an optical axis region L3A2C may be concave, and a periphery region L3A2P may be convex.

The fourth lens element L4 may have negative refracting power. On the object-side surface L4A1, an optical axis region L4A1C may be convex, and a periphery region L4A1P may be concave. On the image-side surface L4A2, an optical axis region L4A2C may be concave, and a periphery region L4A2P may be convex.

The fifth lens element L5 may have positive refracting power. On the object-side surface L5A1, an optical axis region L5A1C may be convex, and a periphery region L5A1P may be concave. On the image-side surface L5A2, an optical axis region L5A2C may be concave, and a periphery region L5A2P may be convex.

The sixth lens element L6 may have positive refracting power. On the object-side surface L6A1, both an optical axis region L6A1C and a periphery region L6A1P may be concave. On the image-side surface L6A2, both an optical axis region L6A2C and a periphery region L6A2P may be convex.

The seventh lens element L7 may have positive refracting power. On the object-side surface L7A1, an optical axis region L7A1C may be convex and a periphery region L7A1P may be concave. On the image-side surface L7A2, an optical axis region L7A2C may be concave, and a periphery region L7A2P may be convex.

The eighth lens element L8 may have negative refracting power. On the object-side surface L8A1, an optical axis region L8A1C may be concave, and a periphery region L8A1P may be convex. On the image-side surface L8A2, an optical axis region L8A2C may be concave and a periphery region L8A2P may be convex.

A total of 16 aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, the object-side surface L6A1 and the image-side surface L6A2 of the sixth lens element L6, the object-side surface L7A1 and the image-side surface L7A2 of the seventh lens element L7 and the object-side surface L8A1 and the image-side surface L8A2 of the eighth lens element L8 may all be defined by the following aspherical formula (1):

$$Z(Y) = \frac{Y^2}{R}/(1 + \sqrt{1 - (1+K)\frac{Y^2}{R^2}}) + \sum_{i=1}^{n} a_i \times Y^i \quad \text{Formula (1)}$$

wherein Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; Y represents the perpendicular distance between the point of the aspherical surface and the optical axis; K represents a conic constant; a, represents an aspherical coefficient of $i^{th}$ level.

The values of each aspherical parameter are shown in FIG. 9.

Figure 7A:
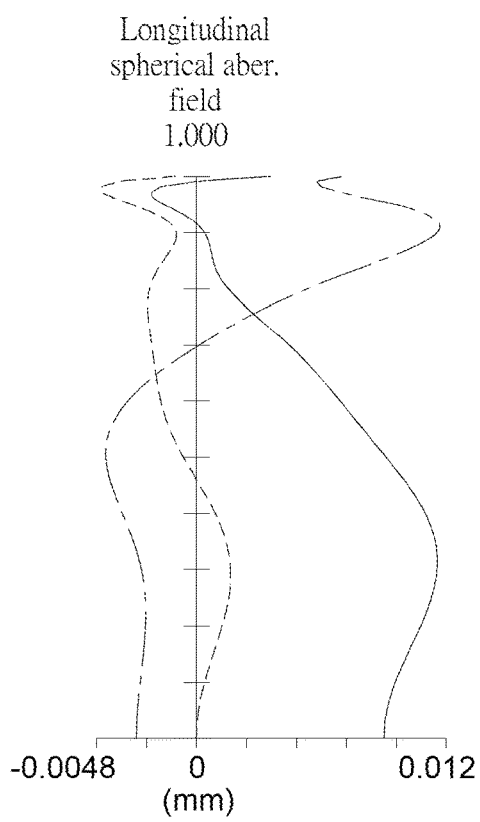
FIGS. 7A-7D depict charts of a longitudinal spherical aberration and other kinds of optical aberrations of a first embodiment of the optical imaging lens according to the present disclosure.
Figure 7B:
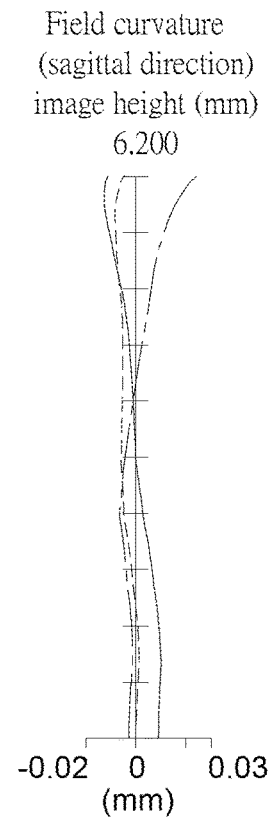
Figure 7C:
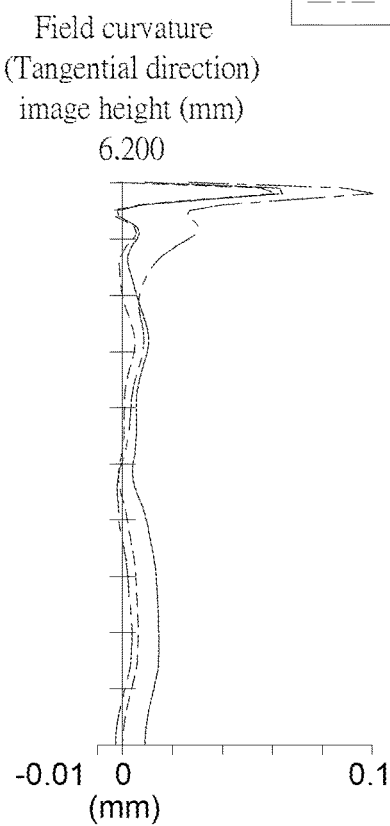
Figure 7D:
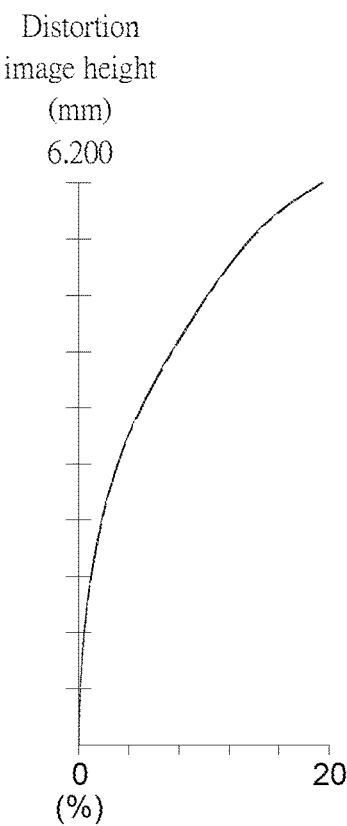

Referring to FIG. 7A, a longitudinal spherical aberration of three representative wavelengths (470 nm, 555 nm, 650 nm) of the optical imaging lens 1 in the present embodiment is shown in coordinates in which a vertical axis represents field of view, and FIG. 7B, curvature of field of three representative wavelengths (470 nm, 555 nm, 650 nm) of the optical imaging lens 1 in the present embodiment in the sagittal direction is shown in coordinates in which a vertical axis represents image height, and FIG. 7C, curvature of field in the tangential direction of three representative wavelengths (470 nm, 555 nm, 650 nm) of the optical imaging lens 1 in the present embodiment is shown in coordinates in which a vertical axis represents image height, and FIG. 7D, distortion aberration of the optical imaging lens 1 in the present embodiment is shown in coordinates in which a vertical axis represents image height. The curve of each of these wavelengths may be close to each other, and this represents that off-axis ray with respect to the three representative wavelengths (470 nm, 555 nm, 650 nm) may be focused around an image point. From the vertical deviation of each curve shown in FIG. 7A, the offset of the off-axis ray relative to the image point may be within −0.0048~0.012 mm. Therefore, the present embodiment improves the longitudinal spherical aberration with respect to different wavelengths certainly. Further, for curvature of field in the sagittal direction shown in FIG. 7B, the focus variation with respect to the three wavelengths in the whole field may fall within −0.02~0.03 mm. For curvature of field in the tangential direction shown in FIG. 7C, the focus variation with respect to the three wavelengths in the whole field may fall within −0.01~0.1 mm. The variation of the distortion aberration shown in FIG. 7D may be within 0~20%.

As shown in FIG. 8, the Fno the optical imaging lens 1 is 1.500, and the image height is 6.200 mm. Referring to the aberration shown in FIGS. 7A-7D, it may be readily understood that the optical imaging lens 1 is capable to provide with enlarged aperture stop and image height, as well as good optical characteristics.

Please also refer to FIGS. 46A and 46B for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 10:
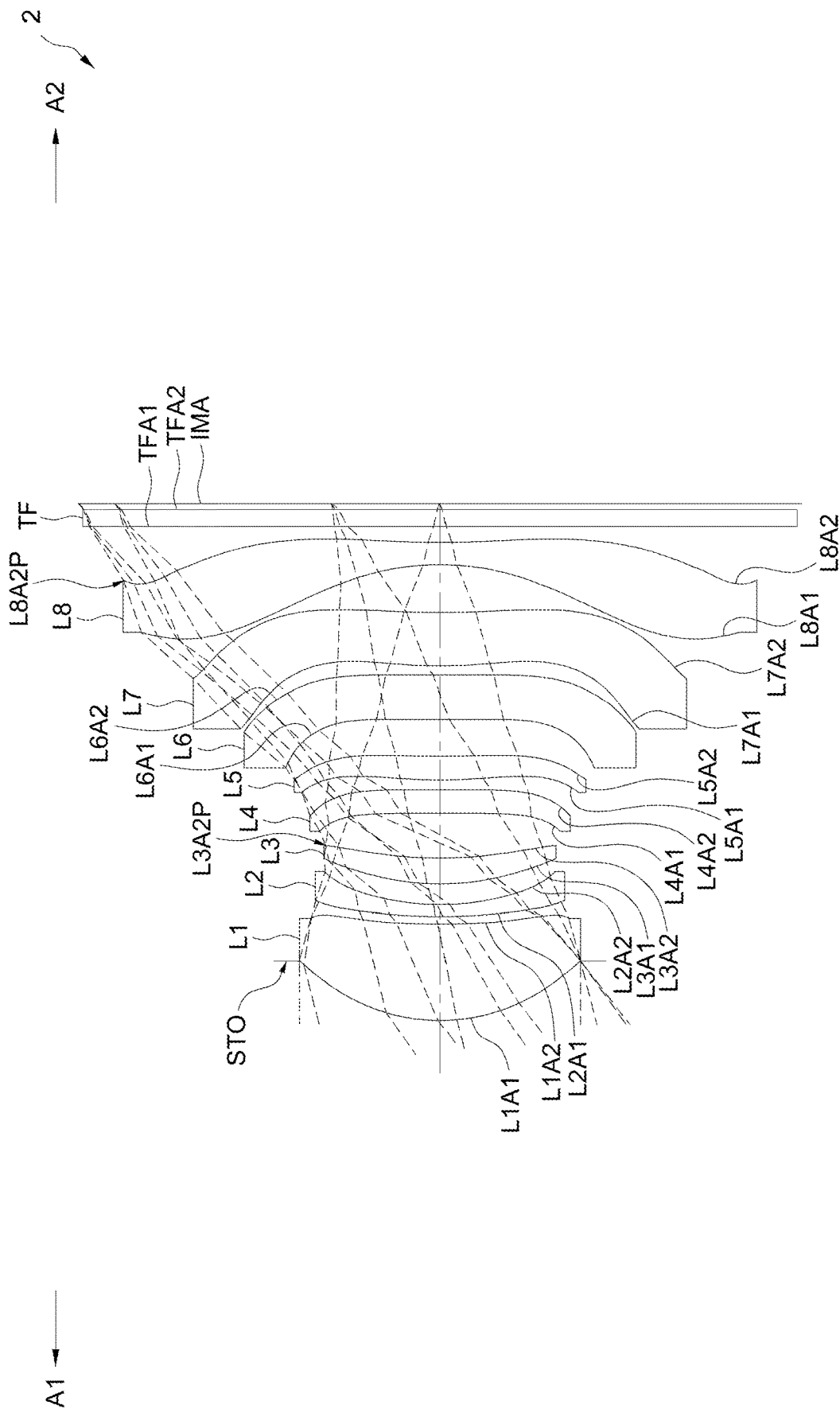
FIG. 10 depicts a cross-sectional view of a second embodiment of an optical imaging lens according to the present disclosure.

Reference is now made to FIGS. 10-13. FIG. 10 illustrates an example cross-sectional view of an optical imaging lens 2 according to a second example embodiment. FIGS. 11A, 11B, 11C and 11D show example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A1, L6A1, L7A1 and L8A1 and the image-side surfaces L1A2, L2A2, L4A2, L5A2, L6A2 and L7A2, and positive or negative configuration of the refracting power of each lens element may be similar to those in the first embodiment; however the concave/convex shape of the image-side surfaces L3A2, L8A2 may be different from those in the first embodiment. Further, the radius of curvature and thickness of each lens element, aspherical data and related optical parameters, such as effective focal length, may be different from those in the first embodiment. Specifically, a periphery region L3A2P on the image-side surface L3A2 of the third lens element L8 may be concave, and a periphery region L8A2P on the image-side surface L8A2 of the eighth lens element L8 may be concave.

Here, for clearly showing the drawings of the present embodiment, only the surface shapes which are different from that in the first embodiment may be labeled. Please refer to FIG. 12 for the optical characteristics of each lens elements in the optical imaging lens 2 of the present embodiment.

Figure 11A:
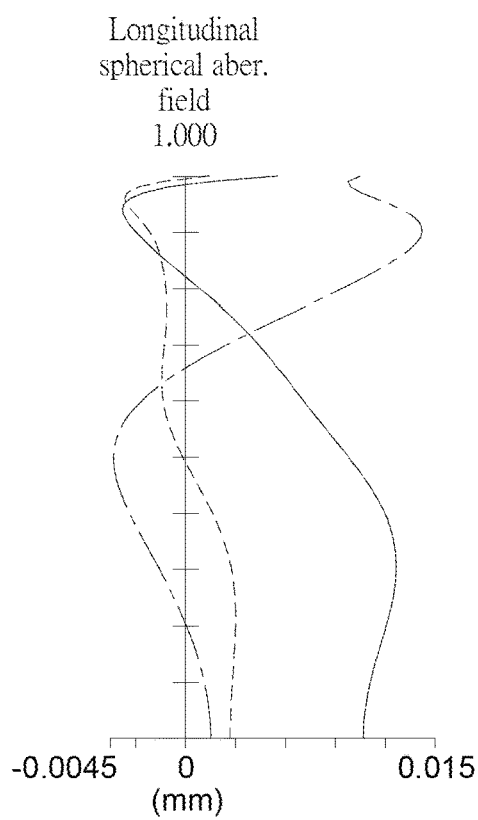
FIGS. 11A-11D depict charts of a longitudinal spherical aberration and other kinds of optical aberrations of a second embodiment of the optical imaging lens according to the present disclosure.
Figure 11B:
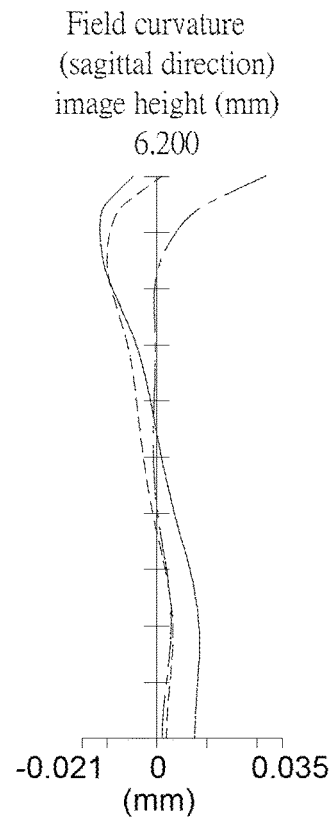
Figure 11C:
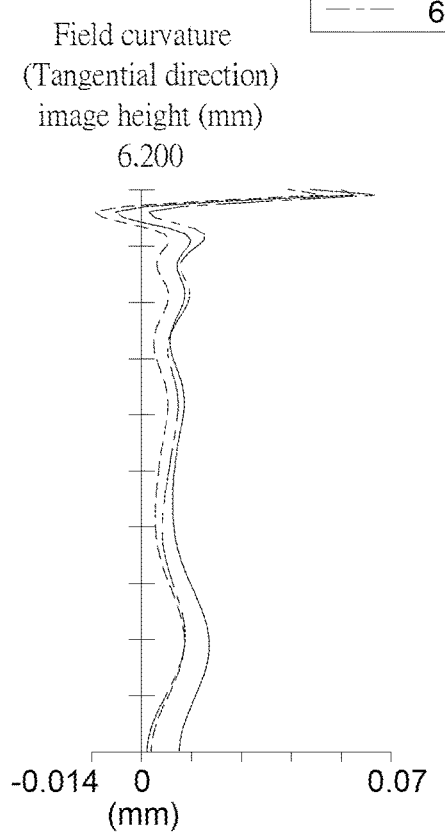
Figure 11D:
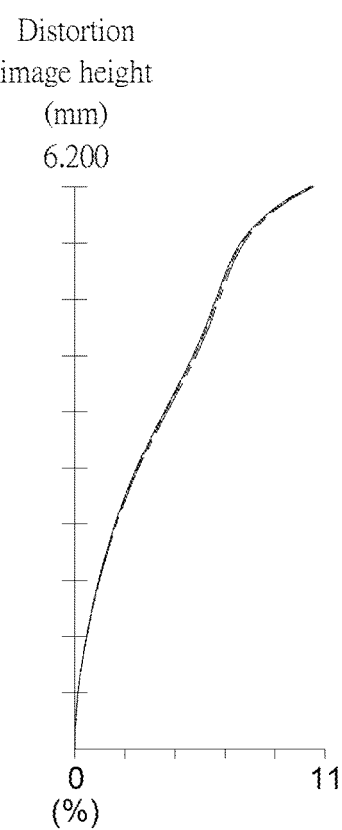

As the longitudinal spherical aberration shown in FIG. 11A, the offset of the off-axis ray relative to the image point may be within −0.0045~0.015 mm. As the curvature of field in the sagittal direction shown in FIG. 11B, the focus variation with regard to the three wavelengths in the whole field may fall within −0.021~0.035 mm. As the curvature of field in the tangential direction shown in FIG. 11C, the focus variation with regard to the three wavelengths in the whole field may fall within −0.014~0.07 mm. As shown in FIG. 11D, the variation of the distortion aberration may be within 0~11%. Compared with the first embodiment, the distortion aberration may be less in the present embodiment.

As shown in FIG. 12, in the optical imaging lens 2, the Fno is 1.500 and the image height is 6.200 mm. Referring to the aberration shown in FIGS. 11A-11D, it may be readily understood that the optical imaging lens 2 is capable to provide with enlarged aperture stop and image height, as well as good imaging quality.

Please refer to FIGS. 46A and 46B for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 14:
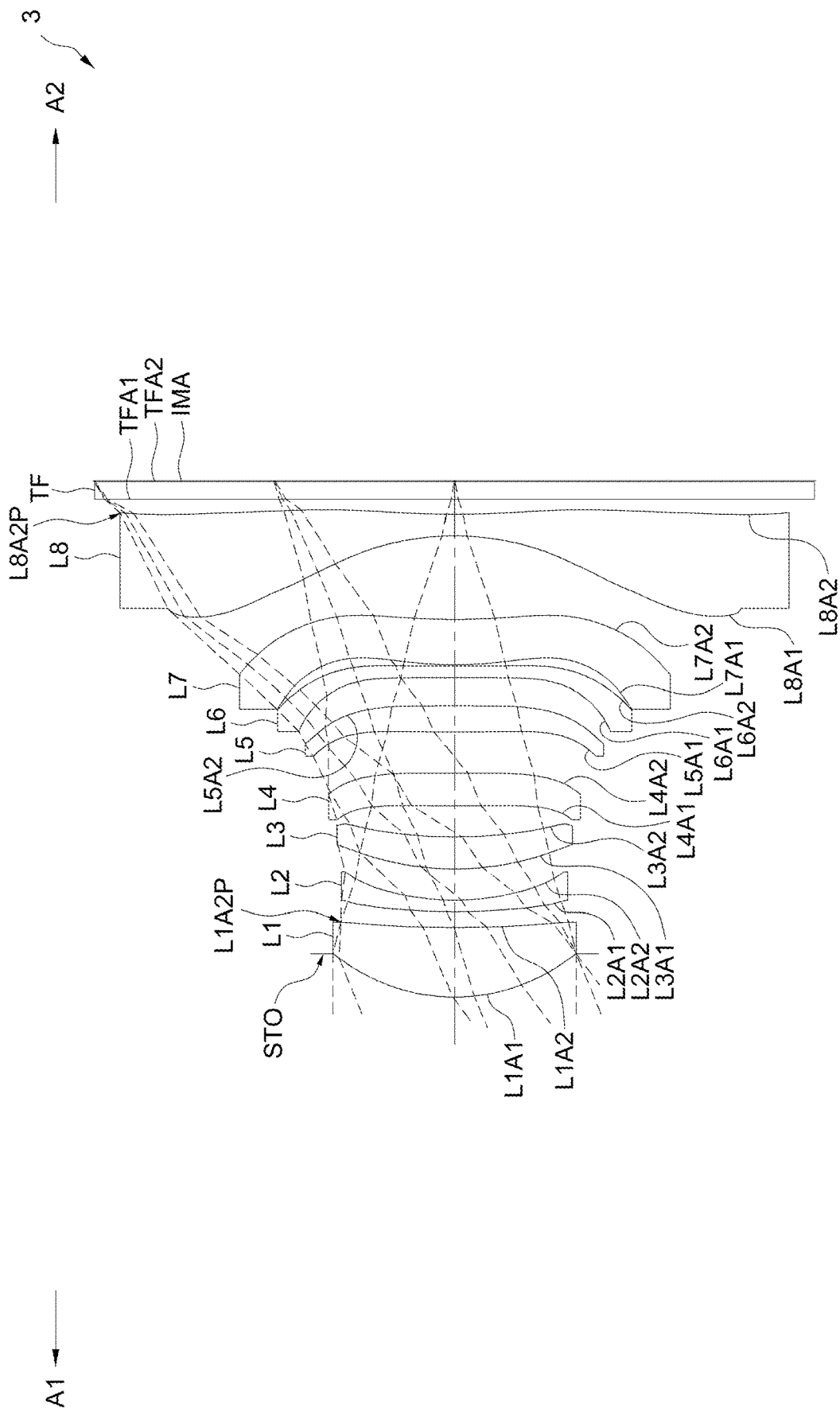
FIG. 14 depicts a cross-sectional view of a third embodiment of an optical imaging lens according to the present disclosure.

Reference is now made to FIGS. 14-17. FIG. 14 illustrates an example cross-sectional view of an optical imaging lens 3 according to a third example embodiment. FIGS. 15A, 15B, 15C and 15D show example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A2, L6A1, L7A1 and L8A1 and the image-side surfaces L2A2, L3A2, L4A2, L5A2, L6A2 and L7A2, and positive or negative configuration of the refracting power of each lens element, except for the fourth lens element L4, may be similar to those in the first embodiment; however, the configuration of the concave/convex shape of the image-side surfaces L1A2, L8A1 and positive refracting power of the fourth lens element L4 may be different from those in the first embodiment. Further, the radius of curvature and thickness of each lens element, aspherical data and related optical parameters, such as effective focal length, may be different from those in the first embodiment. Specifically, a periphery region L1A2P on the image-side surface L1A2 of the first lens element L1 may be concave, and a periphery region L8A2P on the image-side surface L8A2 of the eighth lens element L8 may be concave.

Here, for clearly showing the drawings of the present embodiment, only the surface shapes which are different from that in the first embodiment may be labeled. Please refer to FIG. 16 for the optical characteristics of each lens elements in the optical imaging lens 3 of the present embodiment.

Figure 15A:
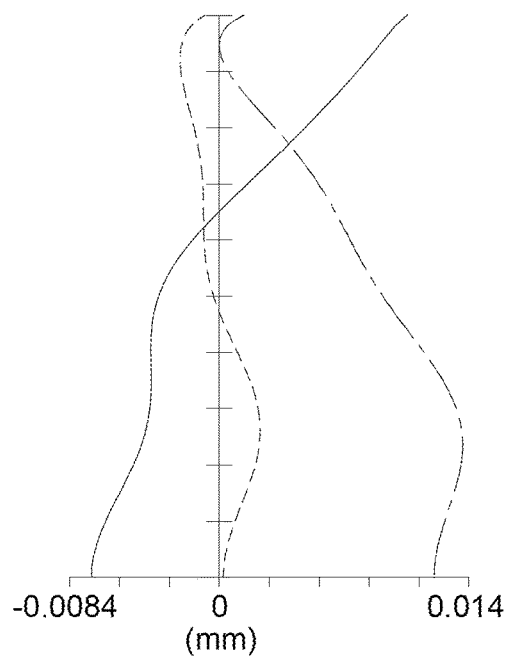
FIGS. 15A-15D depict charts of a longitudinal spherical aberration and other kinds of optical aberrations of a third embodiment of the optical imaging lens according to the present disclosure.
Figure 15B:
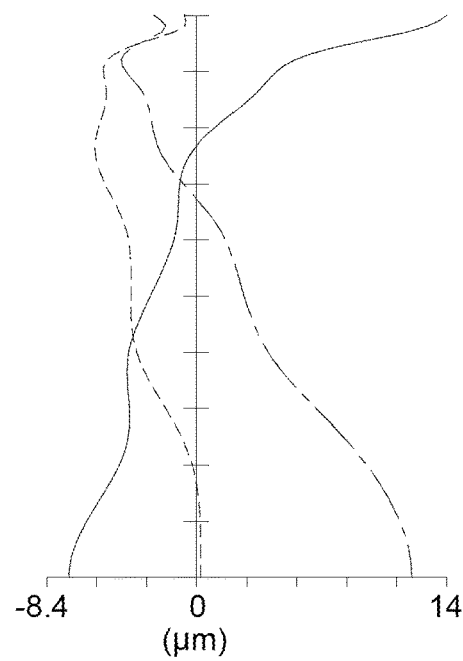
Figure 15C:
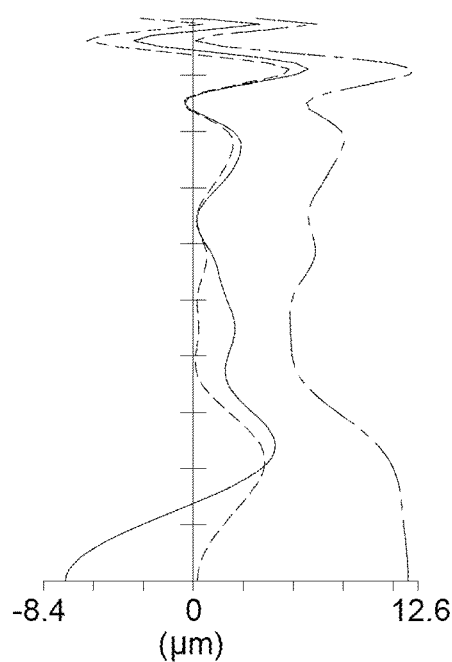
Figure 15D:
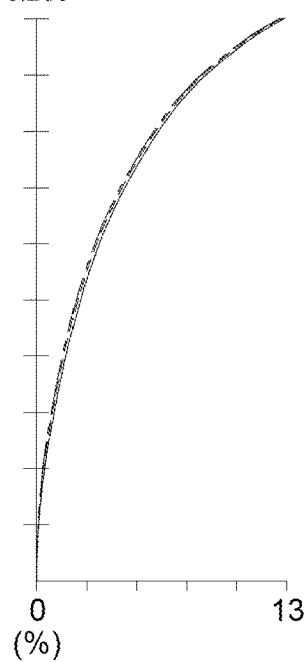

As the longitudinal spherical aberration shown in FIG. 15A, the offset of the off-axis ray relative to the image point may be within −0.0084~0.014 mm. As the curvature of field in the sagittal direction shown in FIG. 15B, the focus variation with regard to the three wavelengths in the whole field may fall within −8.4~14 μm. As the curvature of field in the tangential direction shown in FIG. 15C, the focus variation with regard to the three wavelengths in the whole field may fall within −8.4~12.6 μm. As shown in FIG. 15D, the variation of the distortion aberration may be within 0~13%. Compared with the first embodiment, the curvature of field in both the sagittal and tangential directions and the distortion aberration may be less.

As shown in FIG. 16, in the optical imaging lens 3, the Fno is 1.750 and the image height is 6.200 mm. Referring to the aberration shown in FIGS. 15A-15D, it may be readily understood that the optical imaging lens 3 is capable to provide with enlarged aperture stop and image height, as well as good imaging quality.

Please refer to FIGS. 46A and 46B for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 18:
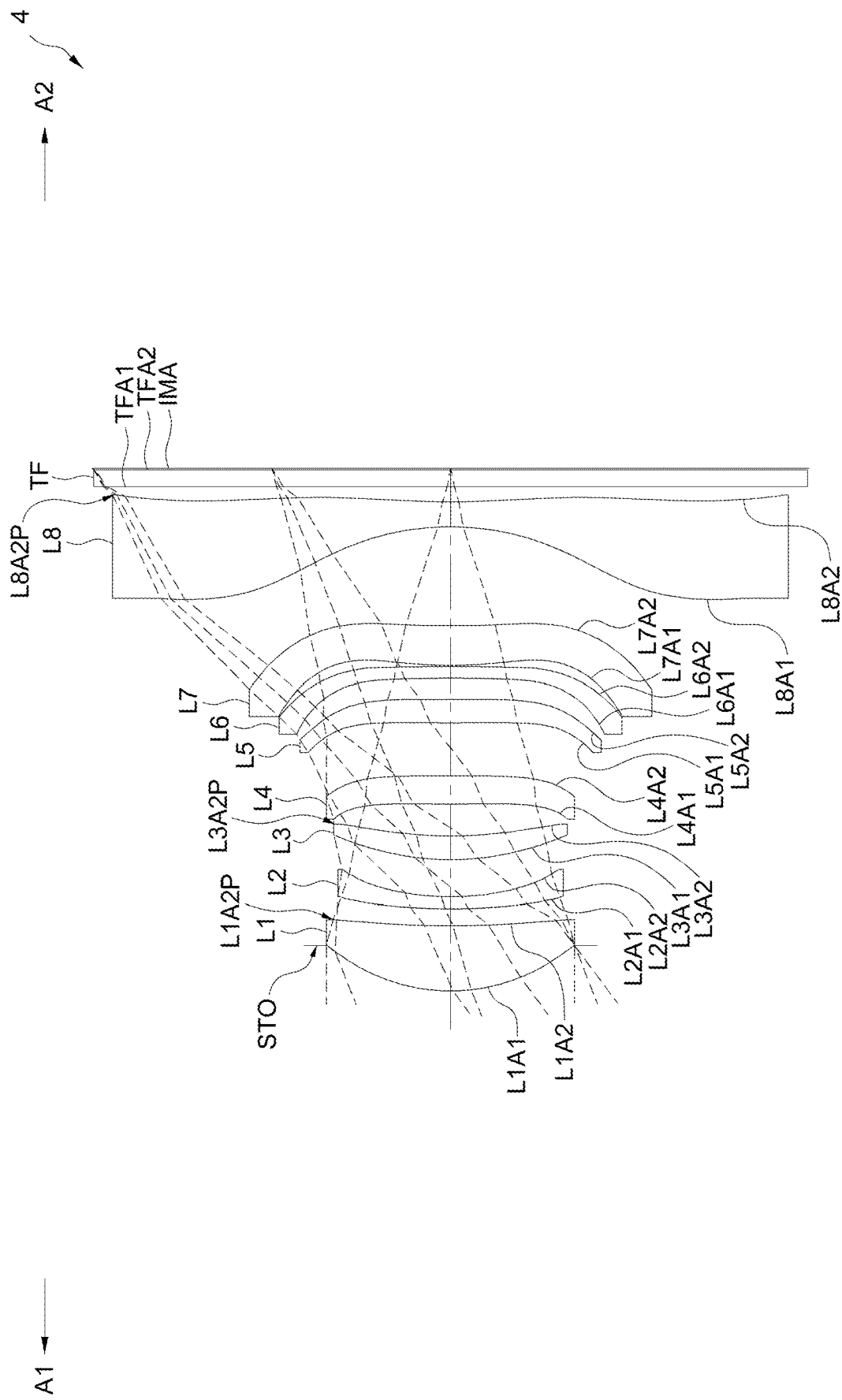
FIG. 18 depicts a cross-sectional view of a fourth embodiment of an optical imaging lens according to the present disclosure.

Reference is now made to FIGS. 18-21. FIG. 18 illustrates an example cross-sectional view of an optical imaging lens 4 according to a fourth example embodiment. FIGS. 19A, 19B, 19C and 19D show example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A1, L6A1, L7A1 and L8A1 and the image-side surfaces L2A2, L4A2, L5A2, L6A2 and L7A2, and positive or negative configuration of the refracting power of each lens element, except for the fourth lens element L4, may be similar to those in the first embodiment; however, the configuration of the concave/convex shape of the image-side surfaces L1A2, L3A2, L8A2 and positive refracting power of the fourth lens element L4 may be different from those in the first embodiment. Further, the radius of curvature and thickness of each lens element, aspherical data and related optical parameters, such as effective focal length, may be different from those in the first embodiment. Specifically, a periphery region L1A2P on the image-side surface L1A2 of the first lens element L1 may be concave, a periphery region L3A2P on the image-side surface L3A2 of the third lens element L3 may be concave, and a periphery region L8A2P on the image-side surface L8A2 of the eighth lens element L8 may be concave.

Here, for clearly showing the drawings of the present embodiment, only the surface shapes which are different from that in the first embodiment may be labeled. Please refer to FIG. 20 for the optical characteristics of each lens elements in the optical imaging lens 4 of the present embodiment.

Figure 19A:
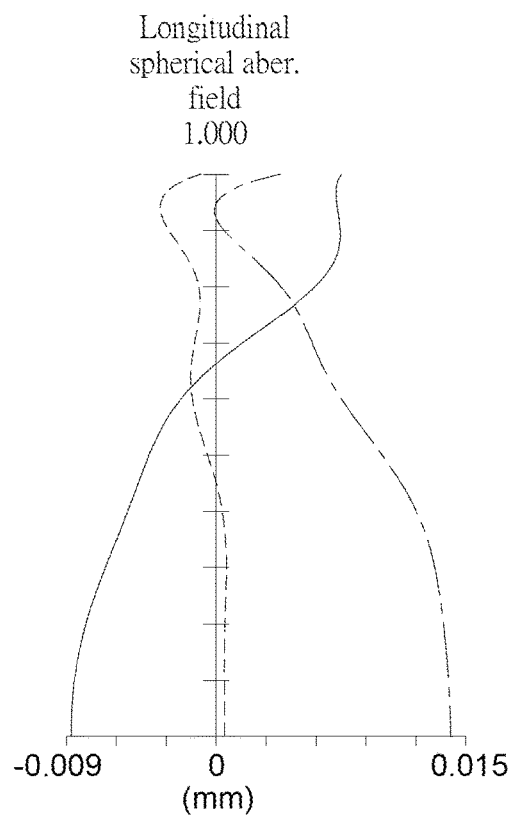
FIGS. 19A-19D depict charts of a longitudinal spherical aberration and other kinds of optical aberrations of a fourth embodiment of the optical imaging lens according to the present disclosure.
Figure 19B:
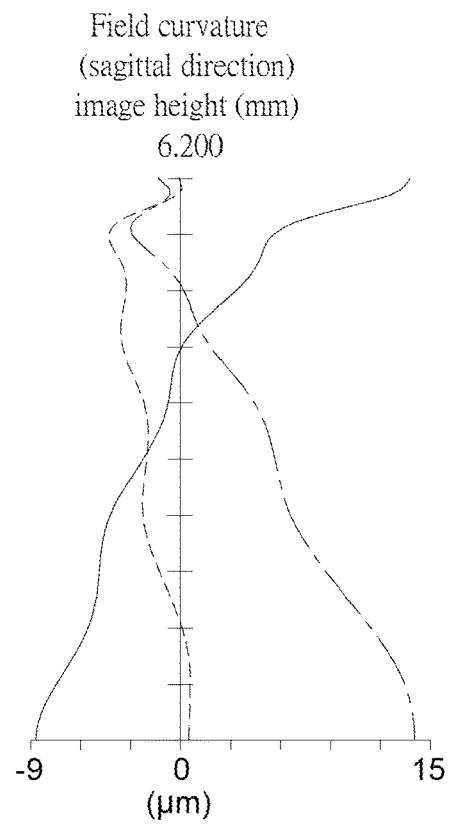
Figure 19C:
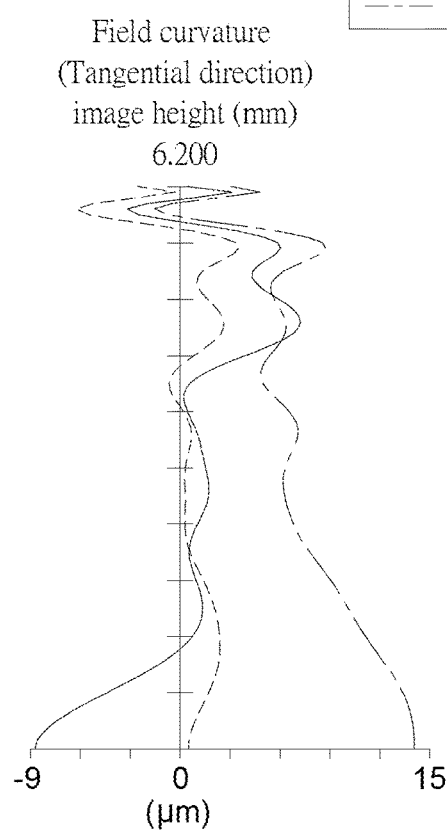
Figure 19D:
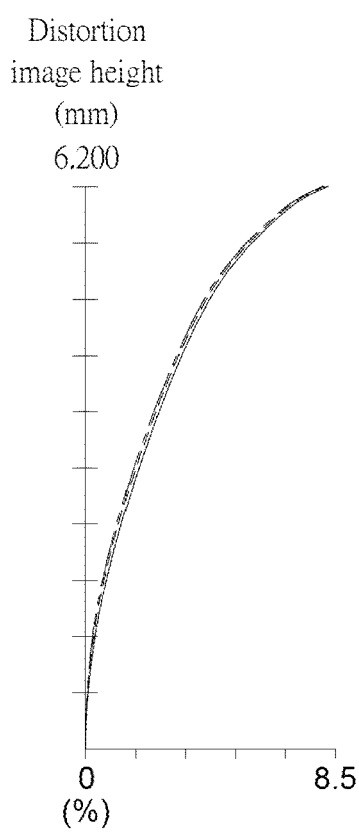

As the longitudinal spherical aberration shown in FIG. 19A, the offset of the off-axis ray relative to the image point may be within −0.009~0.015 mm. As the curvature of field in the sagittal direction shown in FIG. 19B, the focus variation with regard to the three wavelengths in the whole field may fall within −9~15 μm. As the curvature of field in the tangential direction shown in FIG. 19C, the focus variation with regard to the three wavelengths in the whole field may fall within −9~15 μm. As shown in FIG. 19D, the variation of the distortion aberration may be within 0~8.5%. Compared with the first embodiment, the curvature of the field in both the sagittal and tangential directions and the distortion aberration may be less.

As shown in FIG. 20, in the optical imaging lens 4, the Fno is 1.800 and the image height is 6.200 mm. Referring to the aberration shown in FIGS. 19A-19D, it may be readily understood that the optical imaging lens 4 is capable to provide with enlarged aperture stop and image height, as well as good imaging quality.

Please refer to FIGS. 46A and 46B for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 22:
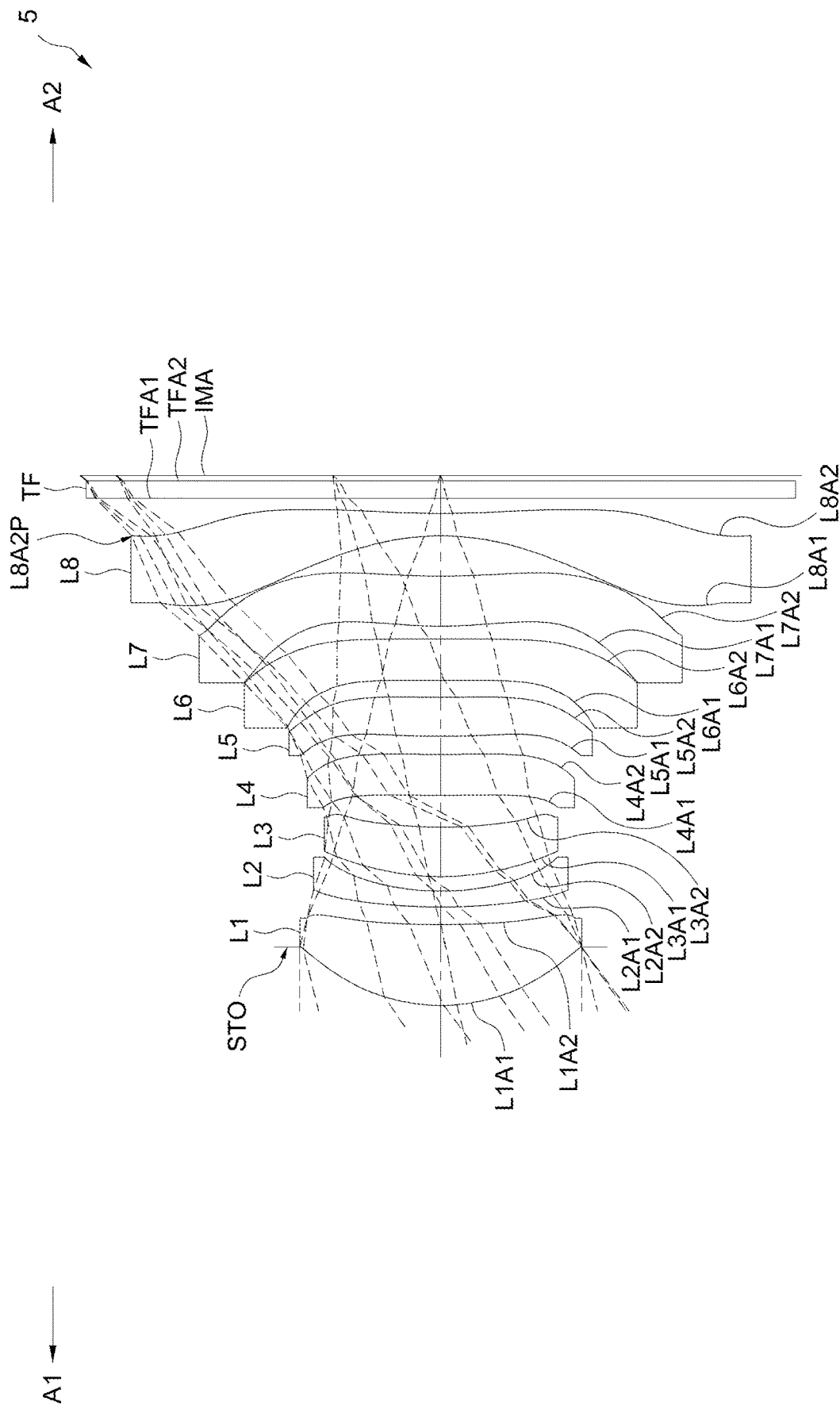
FIG. 22 depicts a cross-sectional view of a fifth embodiment of an optical imaging lens according to the present disclosure.

Reference is now made to FIGS. 22-25. FIG. 22 illustrates an example cross-sectional view of an optical imaging lens 5 according to a fifth example embodiment. FIGS. 23A, 23B, 23C and 23D show example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A1, L6A1, L7A1 and L8A1 and the image-side surfaces L1A2, L2A2, L3A2, L4A2, L5A2, L6A2 and L7A2, and positive or negative configuration of the refracting power of each lens element, except for the fourth lens element L4, may be similar to those in the first embodiment; however, the configuration of the concave/convex shape of the image-side surface L8A2 and positive refracting power of the fourth lens element L4 may be different from those in the first embodiment. Further, the radius of curvature and thickness of each lens element, aspherical data and related optical parameters, such as effective focal length, may be different from those in the first embodiment. Specifically, a periphery region L8A2P on the image-side surface L8A2 of the eighth lens element L8 may be concave.

Here, for clearly showing the drawings of the present embodiment, only the surface shapes which are different from that in the first embodiment may be labeled. Please refer to FIG. 24 for the optical characteristics of each lens elements in the optical imaging lens 5 of the present embodiment.

Figure 23A:
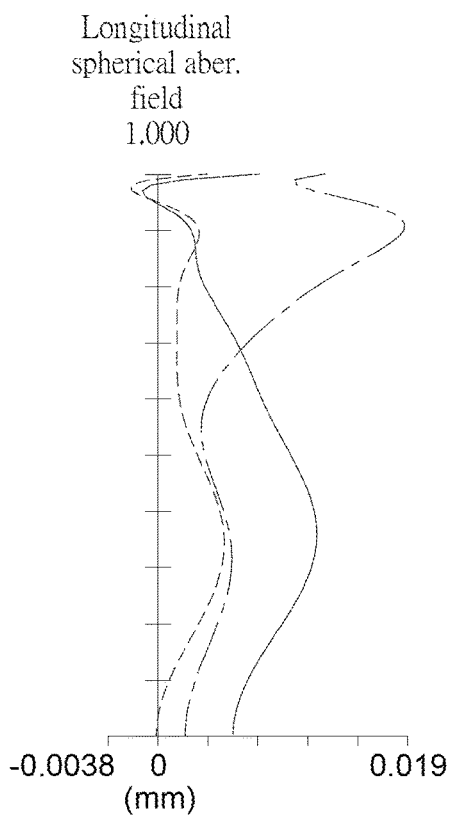
FIGS. 23A-23D depict charts of a longitudinal spherical aberration and other kinds of optical aberrations of a fifth embodiment of the optical imaging lens according to the present disclosure.
Figure 23B:
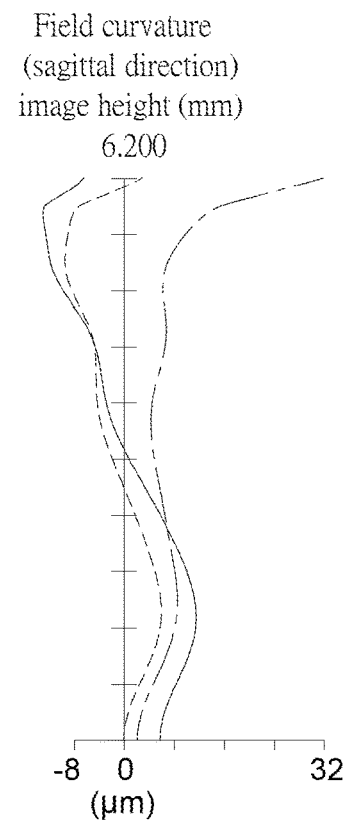
Figure 23C:
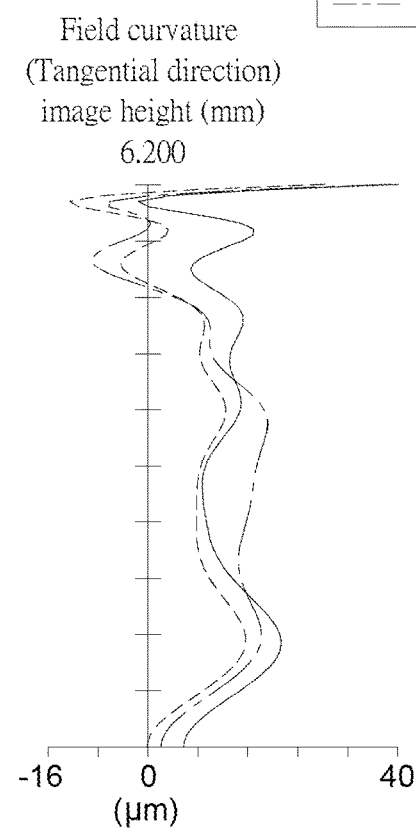
Figure 23D:
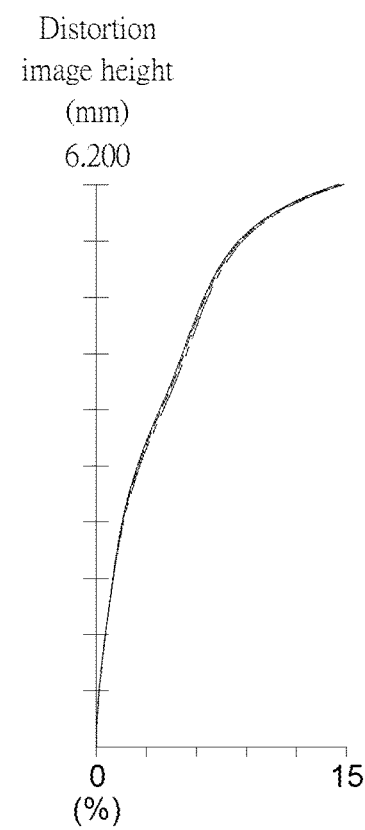

As the longitudinal spherical aberration shown in FIG. 23A, the offset of the off-axis ray relative to the image point may be within −0.0038~0.019 mm. As the curvature of field in the sagittal direction shown in FIG. 23B, the focus variation with regard to the three wavelengths in the whole field may fall within −8~32 μm. As the curvature of field in the tangential direction shown in FIG. 23C, the focus variation with regard to the three wavelengths in the whole field may fall within −16~40 μm. As shown in FIG. 23D, the variation of the distortion aberration may be within 0~15%. Compared with the first embodiment, the curvature of field in both the sagittal and tangential directions and the distortion aberration may be smaller in the present embodiment.

As shown in FIG. 24, in the optical imaging lens 5, the Fno is 1.500 and the image height is 6.200 mm. Referring to the aberration shown in FIGS. 23A-23D, it may be readily understood that the optical imaging lens 5 is capable to provide with enlarged aperture stop and image height, as well as good imaging quality.

Please refer to FIGS. 46A and 46B for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 26:
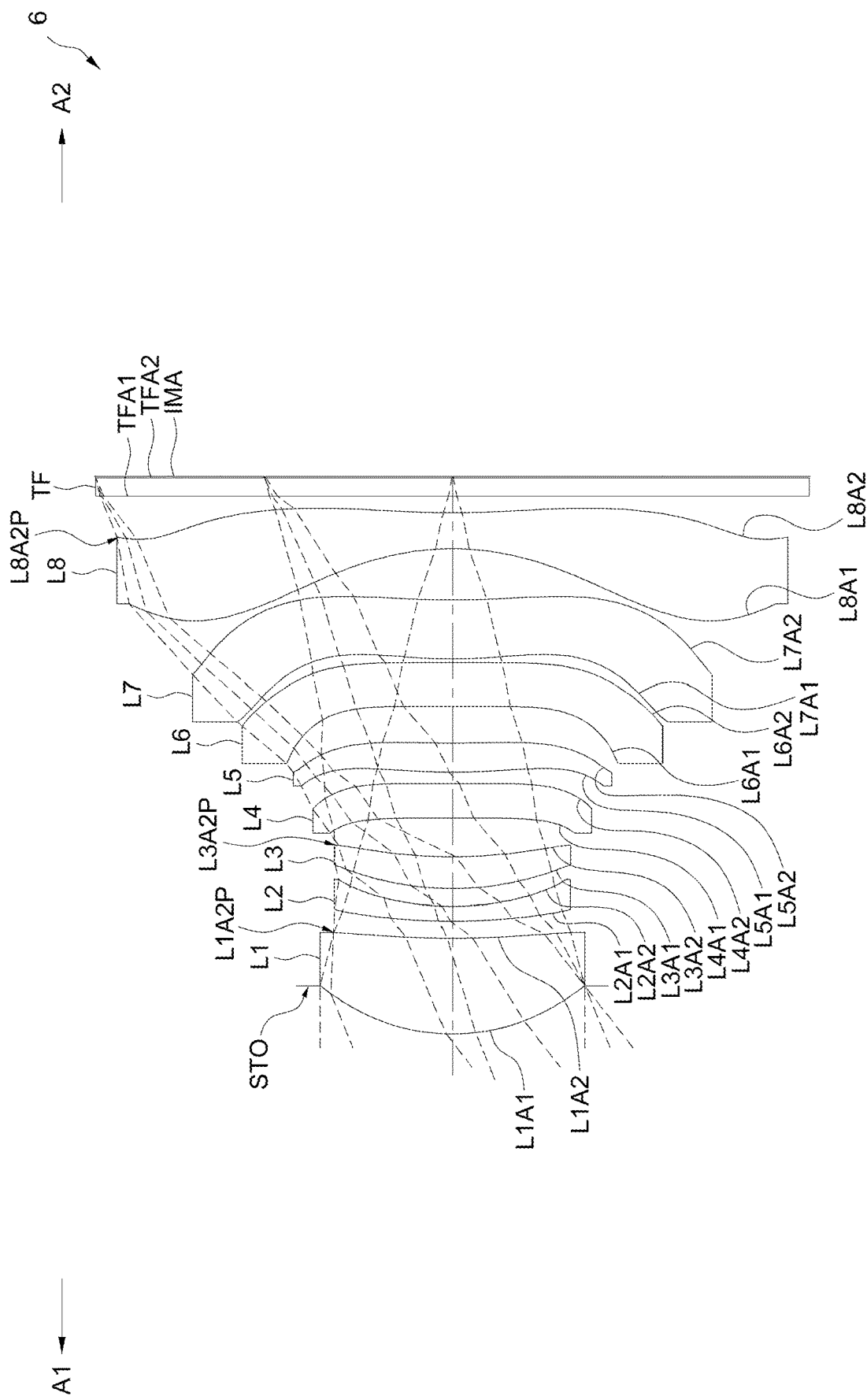
FIG. 26 depicts a cross-sectional view of a sixth embodiment of an optical imaging lens according to the present disclosure.

Reference is now made to FIGS. 26-29. FIG. 26 illustrates an example cross-sectional view of an optical imaging lens 6 according to a sixth example embodiment. FIGS. 27A, 27B, 27C and 27D show example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A2, L6A1, L7A1 and L8A1 and the image-side surfaces L2A2, L4A2, L5A2, L6A2 and L7A2, and positive or negative configuration of the refracting power of each lens element may be similar to those in the first embodiment; however, the configuration of the concave/convex shape of the image-side surfaces L1A2, L3A2, L8A2 may be different from those in the first embodiment. Further, the radius of curvature and thickness of each lens element, aspherical data and related optical parameters, such as effective focal length, may be different from those in the first embodiment. Specifically, a periphery region L1A2P on the image-side surface L1A2 of the first lens element L1 may be concave, a periphery region L3A2P on the image-side surface L3A2 of the third lens element L3 may be concave, and a periphery region L8A2P on the image-side surface L8A2 of the eighth lens element L8 may be concave.

Here, for clearly showing the drawings of the present embodiment, only the surface shapes which are different from that in the first embodiment may be labeled. Please refer to FIG. 28 for the optical characteristics of each lens elements in the optical imaging lens 6 of the present embodiment.

Figure 27A:
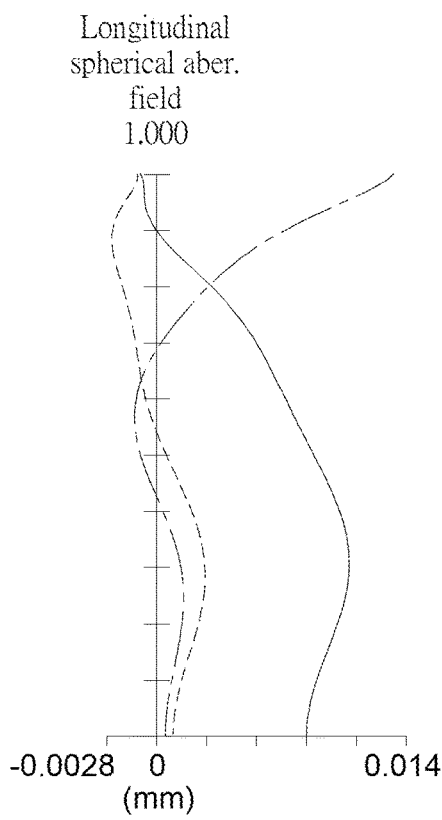
FIGS. 27A-27D depict charts of a longitudinal spherical aberration and other kinds of optical aberrations of a sixth embodiment of the optical imaging lens according the present disclosure.
Figure 27B:
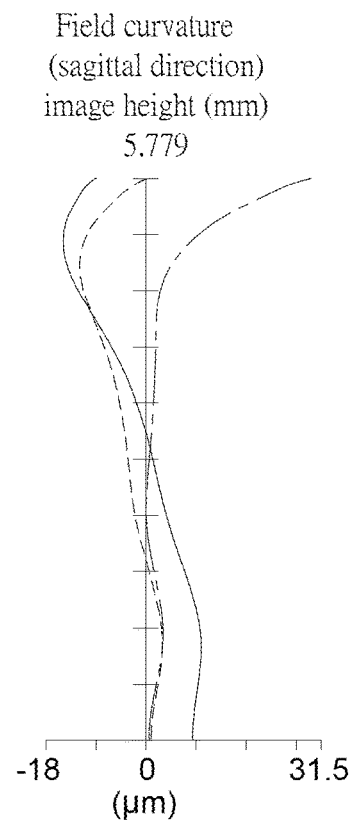
Figure 27C:
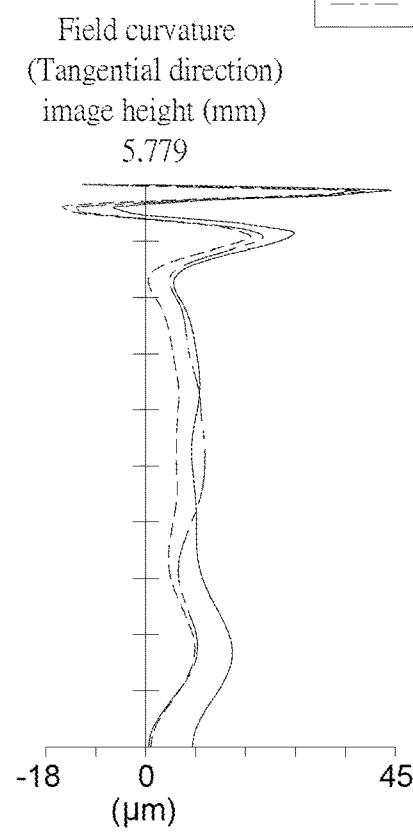
Figure 27D:
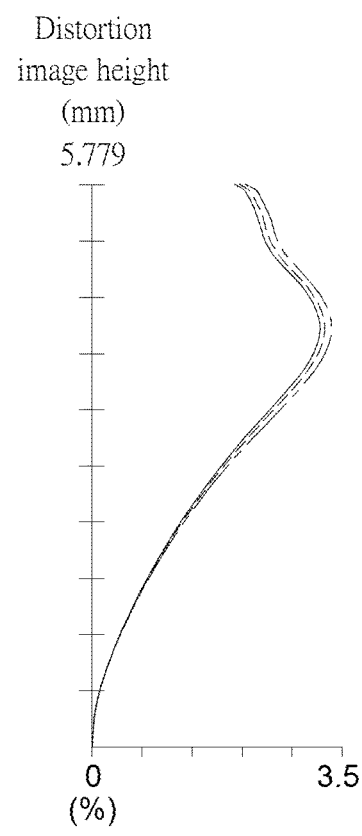

As the longitudinal spherical aberration shown in FIG. 27A, the offset of the off-axis ray relative to the image point may be within −0.0028~0.014 mm. As the curvature of field in the sagittal direction shown in FIG. 27B, the focus variation with regard to the three wavelengths in the whole field may fall within −18~31.5 μm. As the curvature of field in the tangential direction shown in FIG. 27C, the focus variation with regard to the three wavelengths in the whole field may fall within −18~45 μm. As shown in FIG. 27D, the variation of the distortion aberration may be within 0~3.5%. Compared with the first embodiment, the curvature of field in both the sagittal and tangential directions and the distortion aberration may be smaller in the present embodiment.

As shown in FIG. 28, in the optical imaging lens 6, the Fno is 1.700 and the image height is 5.779 mm. Referring to the aberration shown in FIGS. 27A-27D, it may be readily understood that the optical imaging lens 6 is capable to provide with enlarged aperture stop and image height, as well as good imaging quality.

Please refer to FIGS. 46C and 46D for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 30:
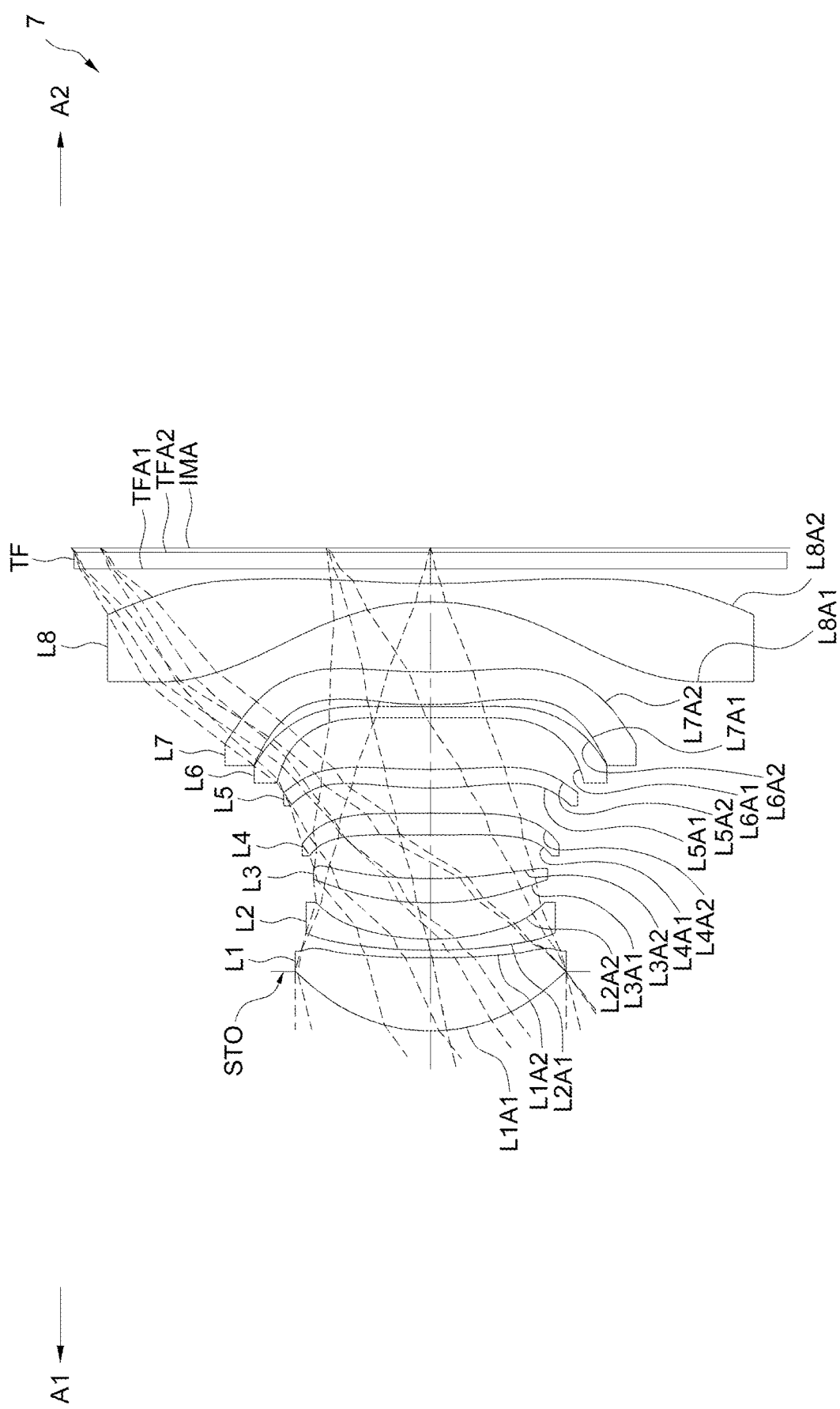
FIG. 30 depicts a cross-sectional view of a seventh embodiment of an optical imaging lens according to the present disclosure.

Reference is now made to FIGS. 30-33. FIG. 30 illustrates an example cross-sectional view of an optical imaging lens 7 according to a seventh example embodiment. FIGS. 31A, 31B, 31C and 31D show example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A1, L6A1, L7A1 and L8A1 and the image-side surfaces L1A2, L2A2, L3A2, L4A2, L5A2, L6A2, L7A2 and L8A2, and positive or negative configuration of the refracting power of each lens element, except for the fourth lens element L4, may be similar to those in the first embodiment; however, positive refracting power of the fourth lens element L4 may be different. Further, the radius of curvature and thickness of each lens element, aspherical data and related optical parameters, such as effective focal length, may be different from those in the first embodiment.

Here, for clearly showing the drawings of the present embodiment, only the surface shapes which are different from that in the first embodiment may be labeled. Please refer to FIG. 32 for the optical characteristics of each lens elements in the optical imaging lens 7 of the present embodiment.

Figure 31A:
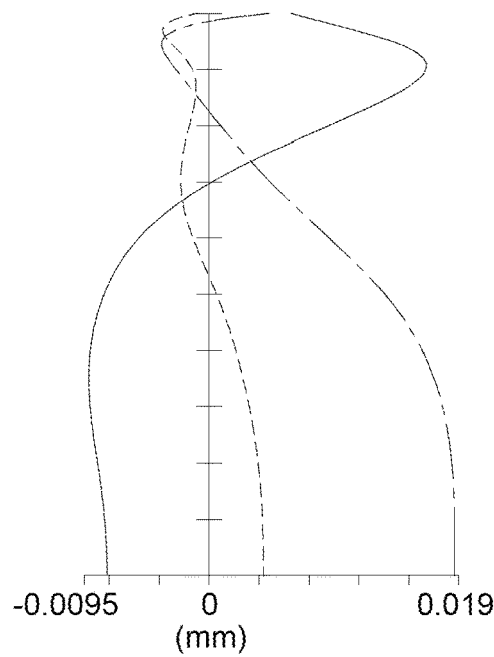
FIGS. 31A-31D depict charts of a longitudinal spherical aberration and other kinds of optical aberrations of a seventh embodiment of the optical imaging lens according to the present disclosure.
Figure 31B:
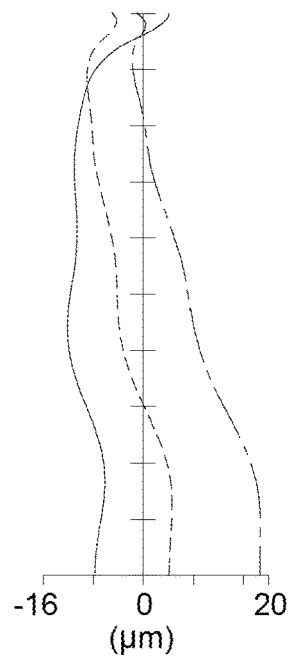
Figure 31C:
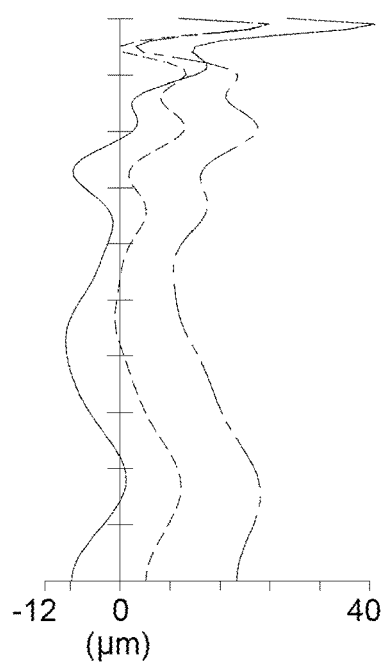
Figure 31D:
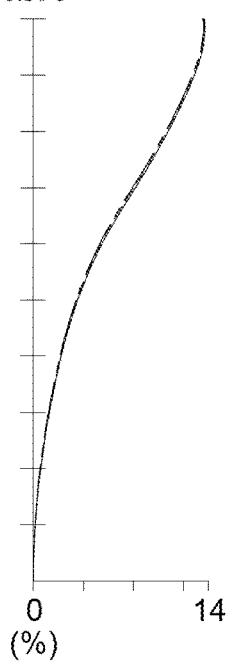

As the longitudinal spherical aberration shown in FIG. 31A, the offset of the off-axis ray relative to the image point may be within −0.0095~0.019 mm. As the curvature of field in the sagittal direction shown in FIG. 31B, the focus variation with regard to the three wavelengths in the whole field may fall within −16~20 μm. As the curvature of field in the tangential direction shown in FIG. 31C, the focus variation with regard to the three wavelengths in the whole field may fall within −12~40 μm. As shown in FIG. 31D, the variation of the distortion aberration may be within 0~14%. Compared with the first embodiment, the curvature of field in both the sagittal and tangential directions and the distortion aberration may be less in the present embodiment.

As shown in FIG. 32, in the optical imaging lens 7, the Fno is 1.500 and the image height is 6.396 mm. Referring to the aberration shown in FIGS. 31A-31D, it may be readily understood that the optical imaging lens 7 is capable to provide with enlarged aperture stop and image height, as well as good imaging quality.

Please refer to FIGS. 46C and 46D for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 34:
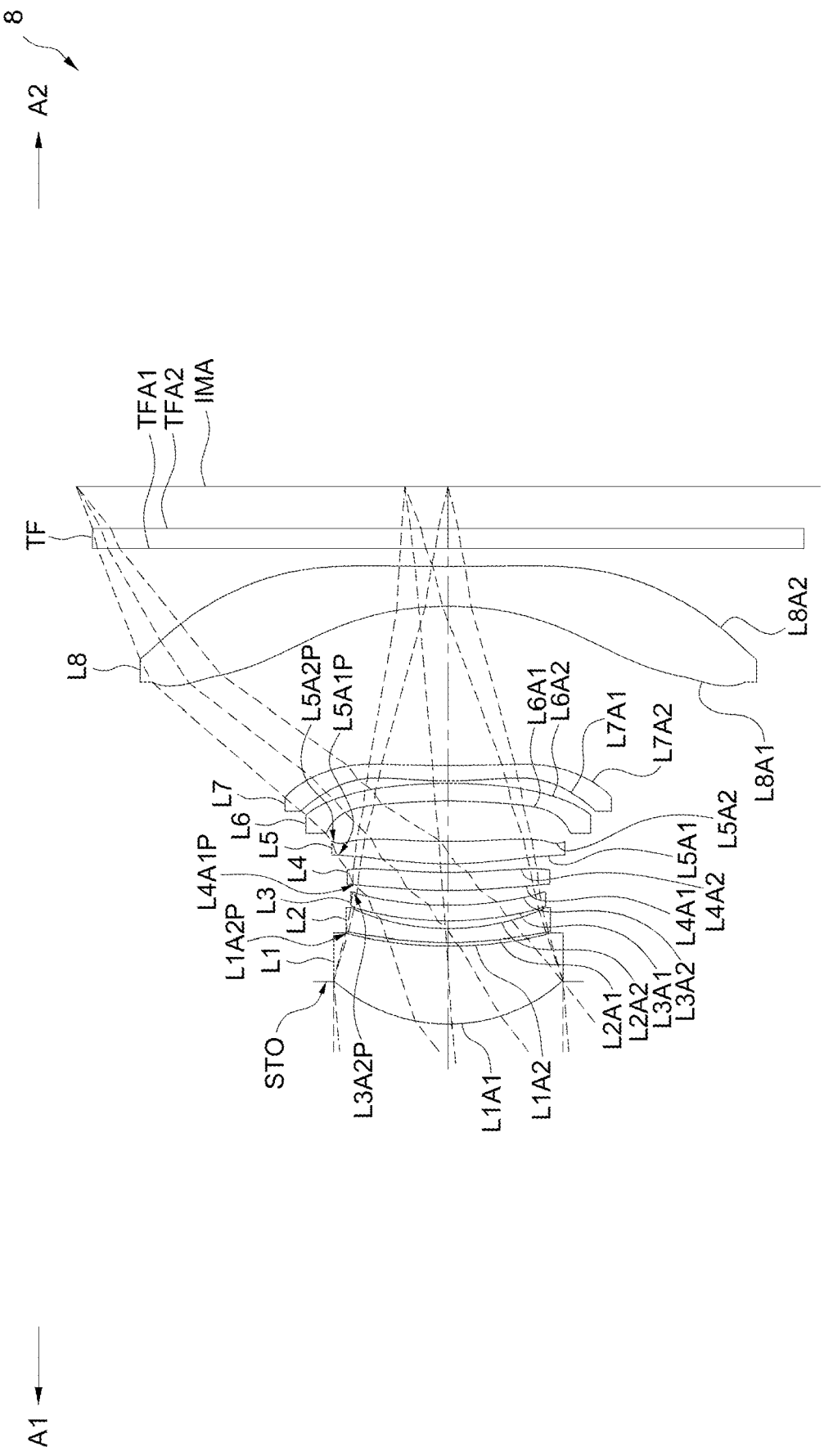
FIG. 34 depicts a cross-sectional view of an eighth embodiment of an optical imaging lens according to the present disclosure.

Reference is now made to FIGS. 34-37. FIG. 34 illustrates an example cross-sectional view of an optical imaging lens 8 according to an eighth example embodiment. FIGS. 35A, 35B, 35C and 35D show example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L6A1, L7A1 and L8A1 and the image-side surfaces L2A2, L4A2, L6A2, L7A2 and L8A2, and positive or negative configuration of the refracting power of each lens element, except for the fourth lens element L4, may be similar to those in the first embodiment; however, the configuration of the concave/convex shape of the object-side surface L4A1, L5A1 and the image-side surfaces L1A2, L3A2, L5A2 and positive refracting power of the fourth lens element L4 may be different. Further, the radius of curvature and thickness of each lens element, aspherical data and related optical parameters, such as effective focal length, may be different from those in the first embodiment. Specifically, a periphery region L1A2P on the image-side surface L1A2 of the first lens element L1 may be concave, a periphery region L3A2P on the image-side surface L3A2 of the third lens element L3 may be concave, a periphery region L4A1P on the object-side surface L4A1 of the fourth lens element L4 may be convex, a periphery region L5A1P on the object-side surface L5A1 of the fifth lens element L5 may be convex, and a periphery region L5A2P on the image-side surface L5A2 of the fifth lens element L5 may be concave.

Here, for clearly showing the drawings of the present embodiment, only the surface shapes which are different from that in the first embodiment may be labeled. Please refer to FIG. 36 for the optical characteristics of each lens elements in the optical imaging lens 8 of the present embodiment.

Figure 35A:
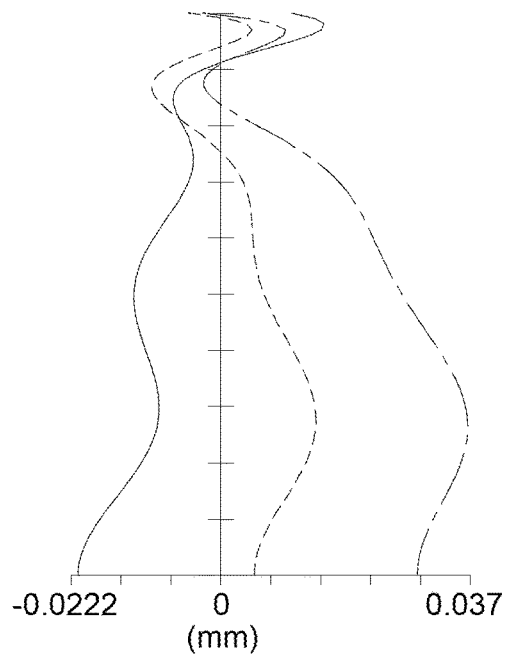
FIGS. 35A-35D depict charts of a longitudinal spherical aberration and other kinds of optical aberrations of an eighth embodiment of the optical imaging lens according to the present disclosure.
Figure 35B:
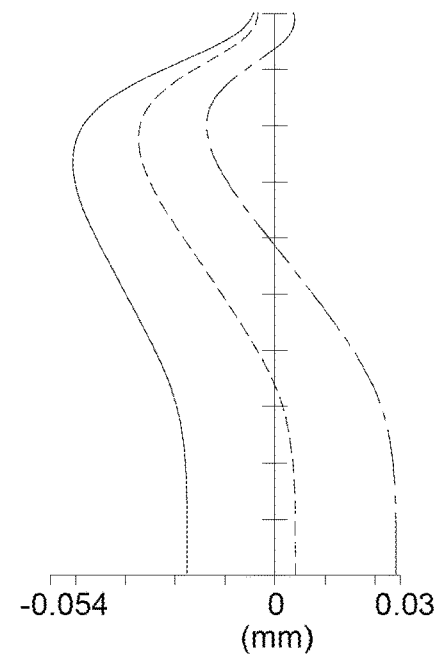
Figure 35C:
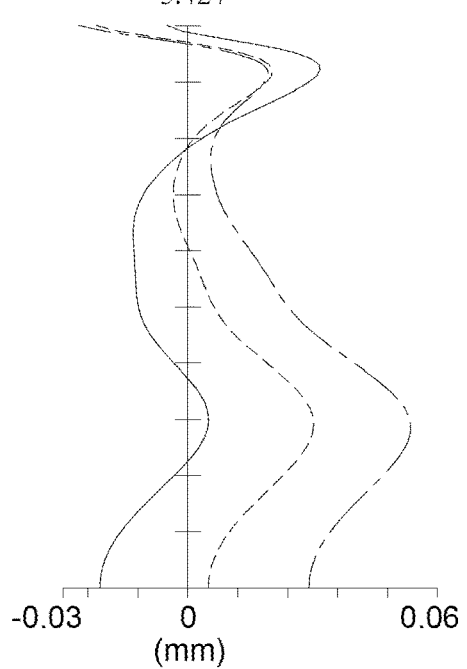
Figure 35D:
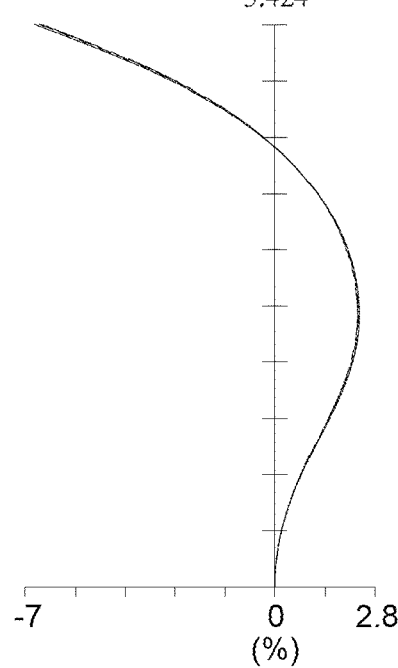

As the longitudinal spherical aberration shown in FIG. 35A, the offset of the off-axis ray relative to the image point may be within −0.0222~0.037 mm. As the curvature of field in the sagittal direction shown in FIG. 35B, the focus variation with regard to the three wavelengths in the whole field may fall within −0.054~0.03 mm. As the curvature of field in the tangential direction shown in FIG. 35C, the focus variation with regard to the three wavelengths in the whole field may fall within −0.03~0.06 mm. As shown in FIG. 35D, the variation of the distortion aberration may be within −7~2.8%. Compared with the first embodiment, the distortion aberration may be smaller in the present embodiment.

As shown in FIG. 36, in the optical imaging lens 8, the Fno is 2.229 and the image height is 5.424 mm. Referring to the aberration shown in FIGS. 35A-35D, it may be readily understood that the optical imaging lens 8 is capable to provide with enlarged aperture stop and image height, as well as good imaging quality.

Please refer to FIGS. 46C and 46D for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 38:
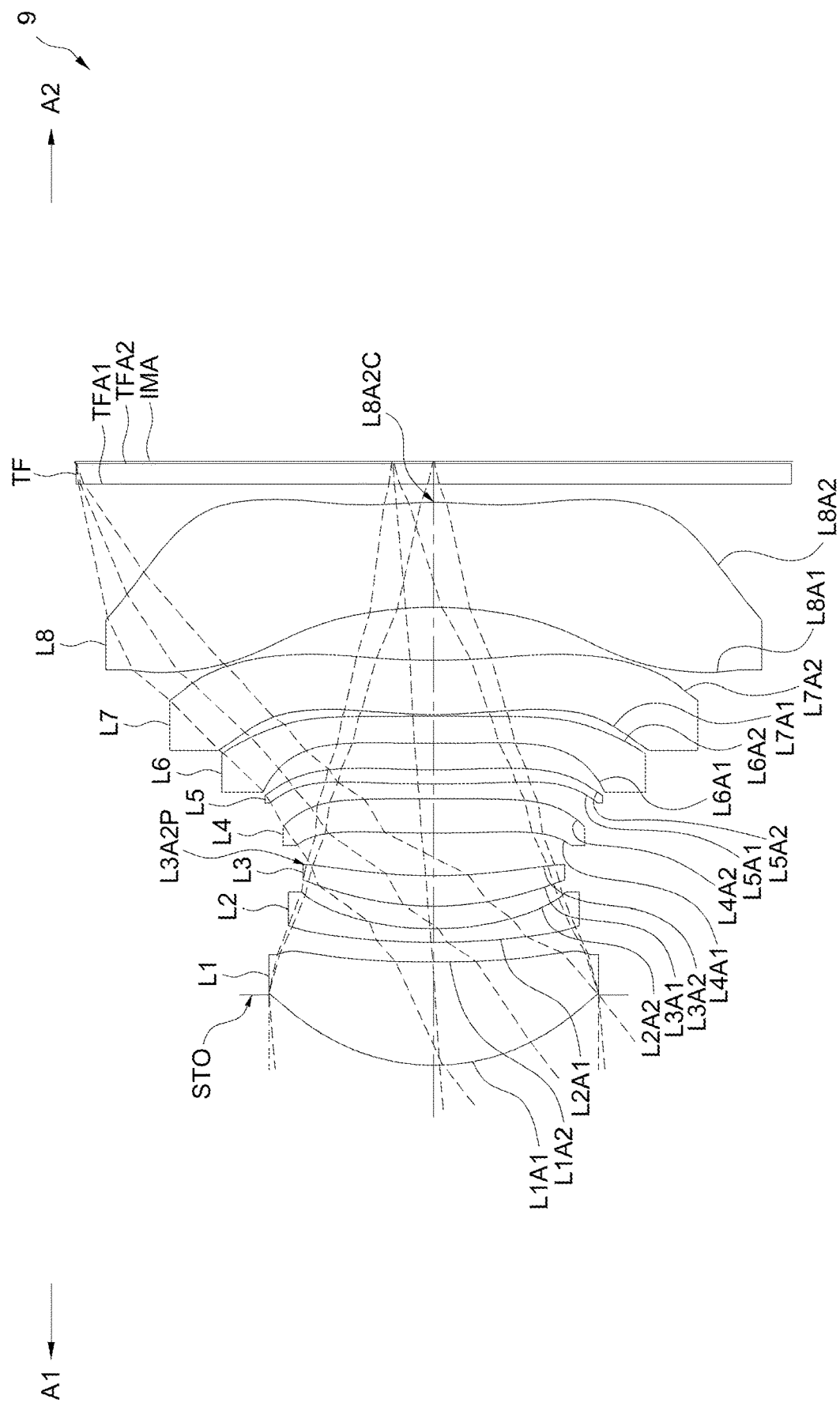
FIG. 38 depicts a cross-sectional view of a ninth embodiment of an optical imaging lens according to the present disclosure.

Reference is now made to FIGS. 38-41. FIG. 38 illustrates an example cross-sectional view of an optical imaging lens 9 according to a ninth example embodiment. FIGS. 39A, 39B, 39C and 39D show example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces L1A1, L2A1, L3A1, L4A1, L5A1, L6A1, L7A1 and L8A1 and the image-side surfaces L1A2, L2A2, L4A2, L5A2, L6A2 and L7A2, and positive or negative configuration of the refracting power of each lens element, except for the fourth lens element L4, the fifth lens element L5 and the eighth lens element L8, may be similar to those in the first embodiment; however, the configuration of the concave/convex shape of the image-side surface L3A2, L8A2, positive refracting power of the fourth lens element L4, negative refracting power of the fifth lens element L5 and positive refracting power of the eighth lens element L8 may be different from those in the first embodiment. Further, the radius of curvature and thickness of each lens element, aspherical data and related optical parameters, such as effective focal length, may be different from those in the first embodiment. Specifically, a periphery region L3A2P on the image-side surface L3A2 of the third lens element L3 may be concave, and an optical axis region L8A2C on the image-side surface L8A2 of the eighth lens element L8 may be convex.

Here, for clearly showing the drawings of the present embodiment, only the surface shapes which are different from that in the first embodiment may be labeled. Please refer to FIG. 40 for the optical characteristics of each lens elements in the optical imaging lens 9 of the present embodiment.

Figure 39A:
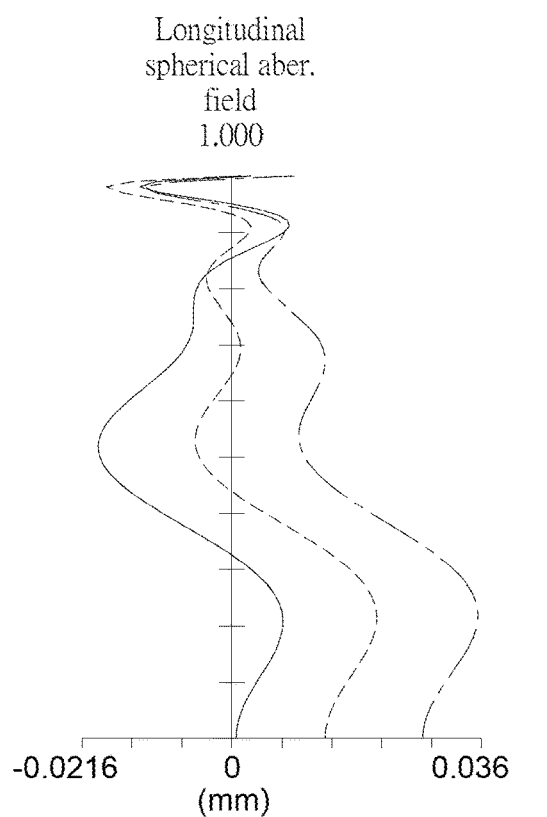
FIGS. 39A-39D depict charts of a longitudinal spherical aberration and other kinds of optical aberrations of a ninth embodiment of the optical imaging lens according to the present disclosure.
Figure 39B:
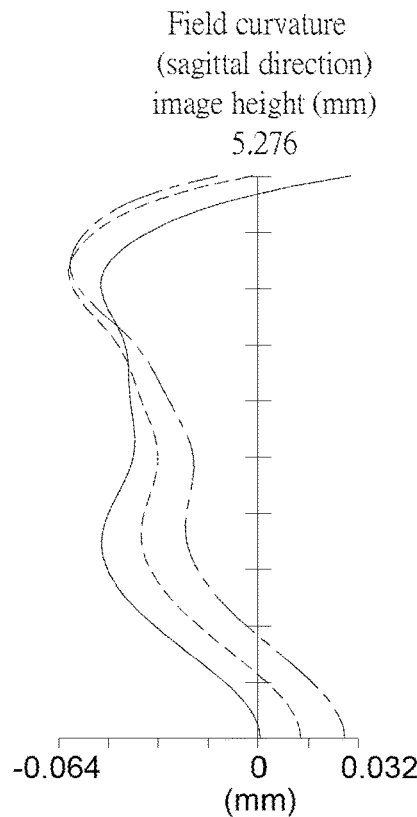
Figure 39C:
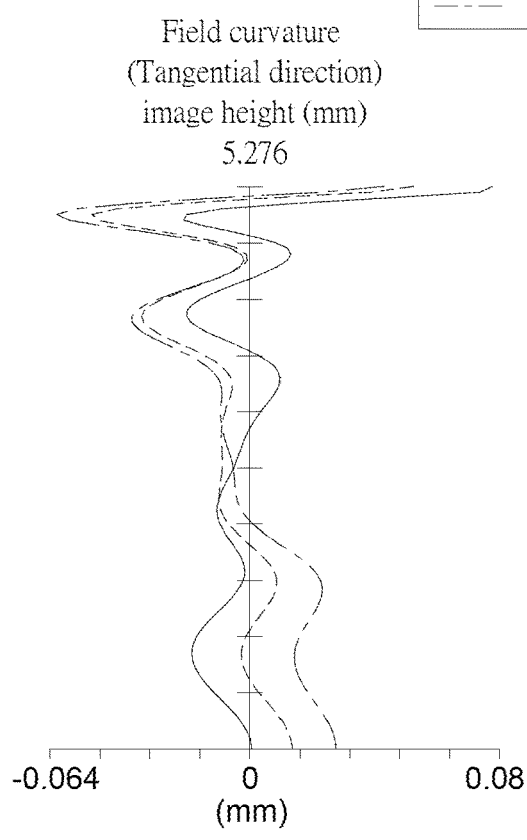
Figure 39D:
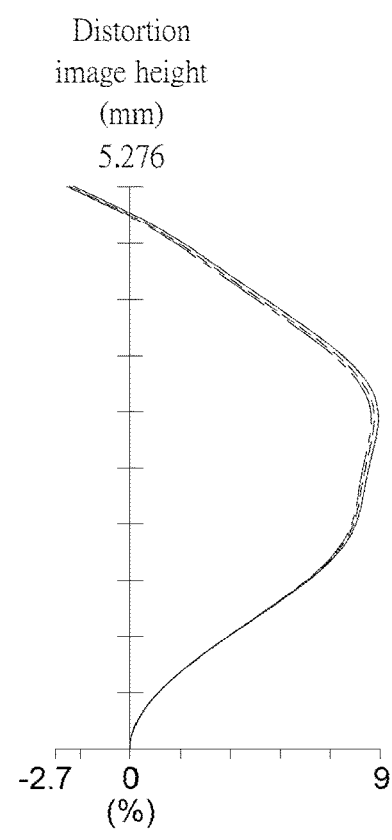

As the longitudinal spherical aberration shown in FIG. 39A, the offset of the off-axis ray relative to the image point may be within −0.0216~0.036 mm. As the curvature of field in the sagittal direction shown in FIG. 39B, the focus variation with regard to the three wavelengths in the whole field may fall within −0.064~0.032 mm. As the curvature of field in the tangential direction shown in FIG. 39C, the focus variation with regard to the three wavelengths in the whole field may fall within −0.064~0.08 mm. As shown in FIG. 39D, the variation of the distortion aberration may be within −2.7~9%. Compared with the first embodiment, the longitudinal spherical aberration, the distortion aberration may be smaller in the present embodiment.

As shown in FIG. 40, in the optical imaging lens 9, the Fno is 1.432 and the image height is 5.276 mm. Referring to the aberration shown in FIGS. 39A-39D, it may be readily understood that the optical imaging lens 9 is capable to provide with enlarged aperture stop and image height, as well as good imaging quality.

Please refer to FIGS. 46C and 46D for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Figure 42:
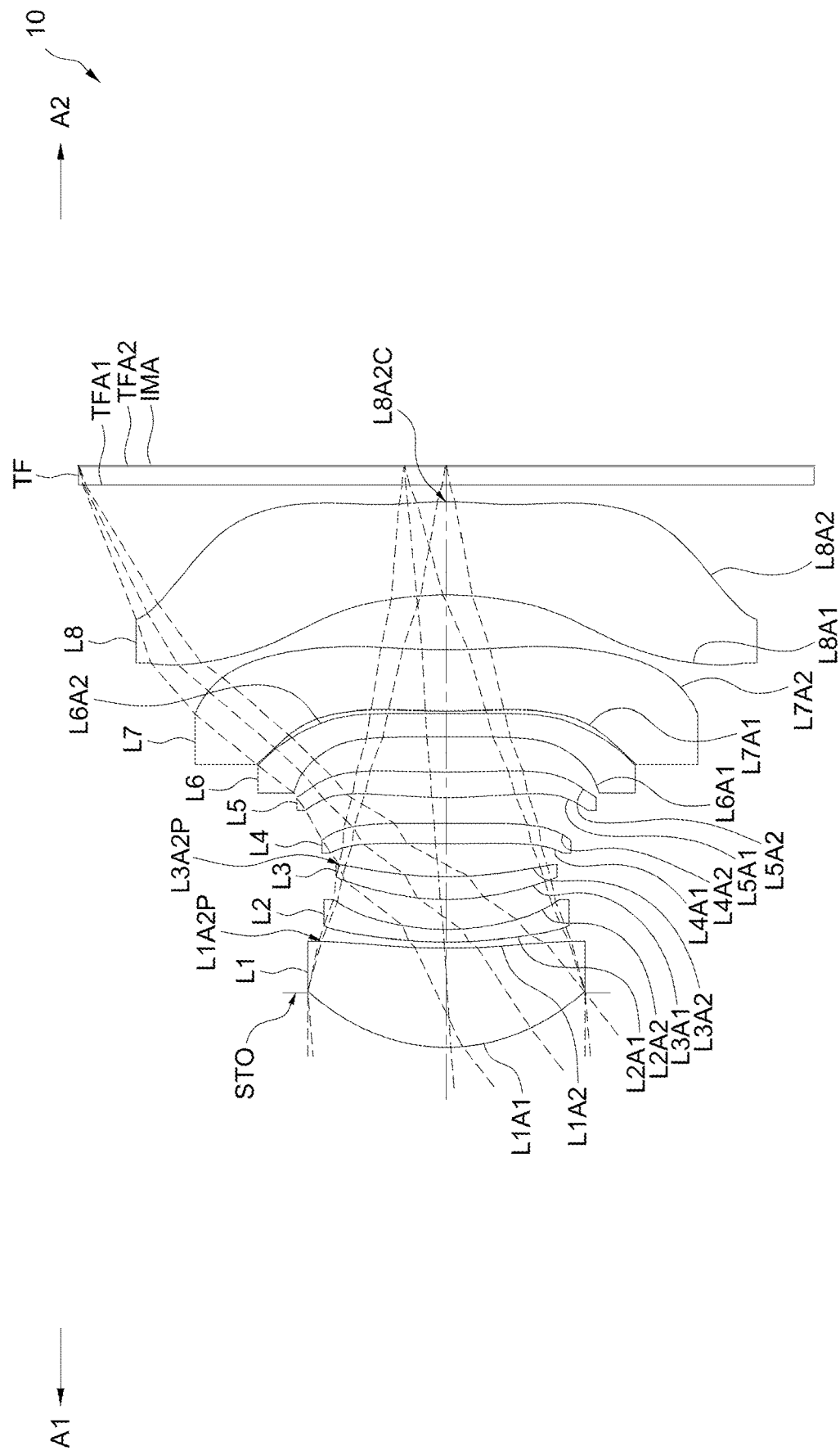
FIG. 42 depicts a cross-sectional view of a tenth embodiment of an optical imaging lens according to the present disclosure.

Reference is now made to FIGS. 42-45. FIG. 42 illustrates an example cross-sectional view of an optical imaging lens 10 according to a tenth example embodiment. FIGS. 43A, 43B, 43C and 43D show example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42, the optical imaging lens 10 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The configuration of the concave/convex shape of surfaces, comprising the object-side surfaces UAL L2A1, L3A1, L4A1, L5A1, L6A1, L7A1 and L8A1, and the image-side surfaces L2A2, L4A2, L5A2, L6A2 and L7A2, and positive or negative configuration of the refracting power of each lens element, except for the fourth lens element L4, the sixth lens element L6, the seventh lens element L7 and the eighth lens element L8, may be similar to those in the first embodiment; however, the configuration of the concave/convex shape of the image-side surfaces L1A2, L3A2, L8A2, positive refracting power of the fourth lens element L4, negative refracting power of the sixth lens element L6, negative refracting power of the seventh lens element L7 and positive refracting power of the eighth lens element L8 may be different from those in the first embodiment. Further, the radius of curvature and thickness of each lens element, aspherical data and related optical parameters, such as effective focal length, may be different from those in the first embodiment. Specifically, a periphery region L1A2P on the image-side surface L1A2 of the first lens element L1 may be concave, a periphery region L3A2P on the image-side surface L3A2 of the third lens element L3 may be concave, and an optical axis region L8A2C on the image-side surface L8A2 of the eighth lens element L8 may be convex.

Here, for clearly showing the drawings of the present embodiment, only the surface shapes which are different from that in the first embodiment may be labeled. Please refer to FIG. 44 for the optical characteristics of each lens elements in the optical imaging lens 10 of the present embodiment.

Figure 43A:
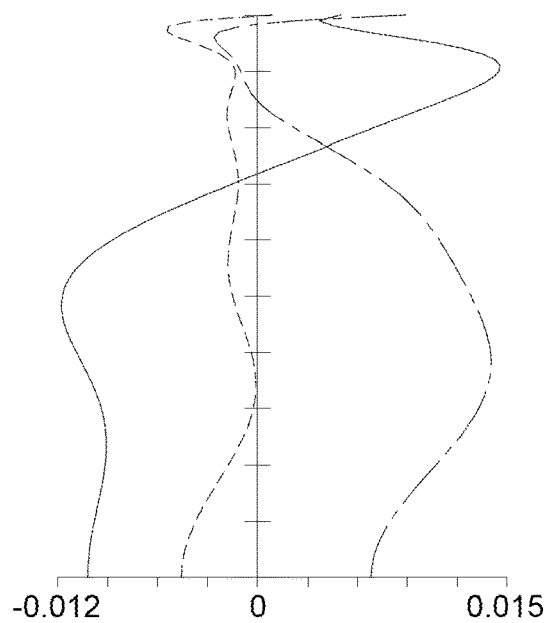
FIGS. 43A-43D depict charts of a longitudinal spherical aberration and other kinds of optical aberrations of a tenth embodiment of the optical imaging lens according to the present disclosure.
Figure 43B:
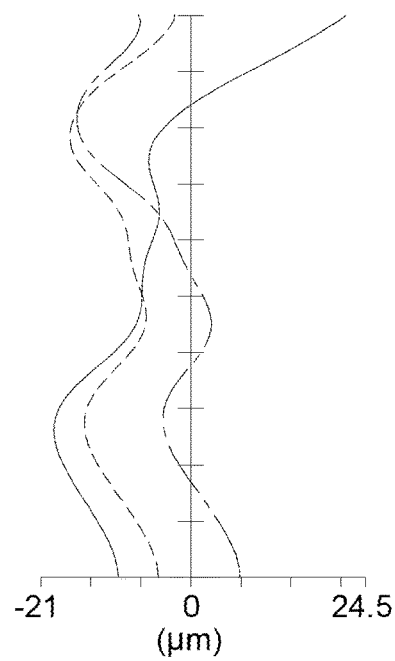
Figure 43C:
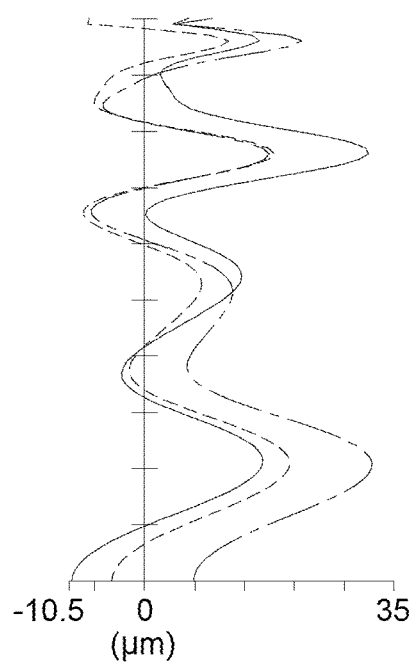
Figure 43D:
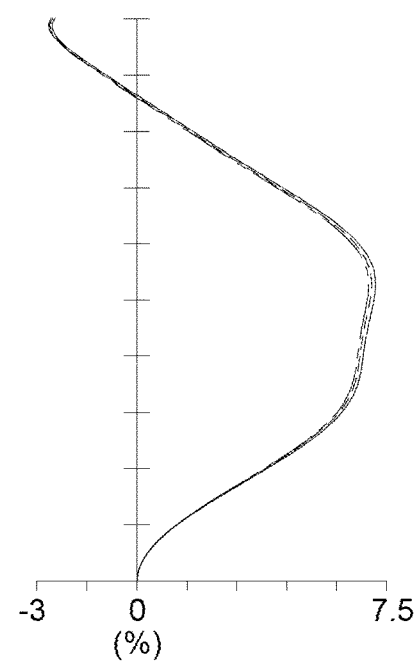

As the longitudinal spherical aberration shown in FIG. 43A, the offset of the off-axis ray relative to the image point may be within −0.012~0.015 mm. As the curvature of field in the sagittal direction shown in FIG. 43B, the focus variation with regard to the three wavelengths in the whole field may fall within −21~24.5 μm. As the curvature of field in the tangential direction shown in FIG. 43C, the focus variation with regard to the three wavelengths in the whole field may fall within −10.5~35 μm. As shown in FIG. 43D, the variation of the distortion aberration may be within −3.0~7.5%. Compared with the first embodiment, the curvature of field in the sagittal direction and the distortion aberration may be less.

As shown in FIG. 44, in the optical imaging lens 10, the Fno is 1.748 and the image height is 5.975 mm. Referring to the aberration shown in FIGS. 43A-43D, it may be readily understood that the optical imaging lens 10 is capable to provide with enlarged aperture stop and image height, as well as good imaging quality.

Please refer to FIGS. 46C and 46D for the values of each parameter and Fno*(D12t32+D41t52)/(T1+G34), ALT*Fno/T1, (D12t32+D41t52)/G34, (V4+V6+V8)/V5, Fno*TTL/(T1+D71t82), D21t32/G34, (D21t32+T6+G67)/(T4+G45), (EPD+ImgH)/ALT, (T6+G67+G78)/T8, (G12+D21t32)/T4, D21t32/G45, (T5+T6)/G56, V5+V6, V3+V4, V4+V7, TL/EPD, EFL/(T1+G34) and Fno*(T2+T3+T5+T6+G78+BFL)/AAG of the present embodiment.

Any range of which upper and lower limits, including the upper and lower limits, defined by the values disclosed in all of the embodiments herein may be implemented in the present embodiments.

According to above illustration, the longitudinal spherical aberration, field curvature in both the sagittal direction and tangential direction and distortion aberration in all embodiments may meet the user requirement of a related product in the market. The off-axis ray with regard to three different wavelengths may be focused around an image point and the offset of the off-axis ray relative to the image point may be well controlled with suppression for the longitudinal spherical aberration, field curvature both in the sagittal direction and tangential direction and distortion aberration. The curves of different wavelengths may be close to each other, and this represents that the focusing for ray having different wavelengths may be good to suppress chromatic dispersion. In summary, lens elements are designed and matched for achieving good imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \leq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:

the third lens element has positive refracting power;

an optical axis region of the object-side surface of the fourth lens element is convex;

an optical axis region of the object-side surface of the fifth lens element is convex, and an optical axis region of the image-side surface of the fifth lens element is concave;

an optical axis region of the object-side surface of the sixth lens element is concave;

a periphery region of the object-side surface of the eighth lens element is convex;

lens elements of the optical imaging lens are only the eight lens elements describe above; and a f-number of the optical imaging lens is represented by Fno, a distance from the image-side surface of the first lens element to the image-side surface of the third lens element along the optical axis is represented by D12t32, a distance from the object-side surface of the fourth lens element to the image-side surface of the fifth lens element along the optical axis is represented by D41t52, a thickness of the first lens element along the optical axis is represented by T1, a distance from the image-side surface of the third lens element to the object-side surface of the fourth lens element along the optical axis is represented by G34, and the optical imaging lens satisfies the inequality:

$$\text{Fno}*(D12t32+D41t52)/(T1+G34) \leq 3.300.$$

2. The optical imaging lens according to claim 1, a sum of the thicknesses of all eight lens elements along the optical axis is represented by ALT, and ALT, Fno and T1 satisfy the inequality:

$$\text{ALT}*\text{Fno}/T1 \leq 6.300.$$

3. The optical imaging lens according to claim 1, wherein D12t32, D41t52 and G34 satisfy the inequality:

$$(D12t32+D41t52)/G34 \leq 6.100.$$

4. The optical imaging lens according to claim 1, wherein an Abbe number of the fourth lens element is represented by V4, an Abbe number of the fifth lens element is represented by V5, an Abbe number of the sixth lens element is represented by V6, an Abbe number of the eighth lens element is represented by V8, and V4, V6, V8 and V5 satisfy the inequality:

$$(V4+V6+V8)/V5 \leq 2.400.$$

5. The optical imaging lens according to claim 1, wherein a distance from the object-side surface of the first lens element to an image plane along the optical axis is represented by TTL, a distance from the object-side surface of the seventh lens element to the image-side surface of the eight lens element along the optical axis is represented by D71t82, and Fno, TTL, T1 and D71t82 satisfy the inequality:

$$\text{Fno}*\text{TTL}/(T1+D71t82) \leq 4.100.$$

6. The optical imaging lens according to claim 1, wherein a distance from the object-side surface of the second lens element to the image-side surface of the third lens element along the optical axis is represented by D21t32, and D21t32 and G34 satisfy the inequality:

$$D21t32/G3 \leq 2.500.$$

7. The optical imaging lens according to claim 1, wherein a distance from the object-side surface of the second lens element to the image-side surface of the third lens element along the optical axis is represented by D21t32, a thickness of the sixth lens element along the optical axis is represented by T6, a distance from the image-side surface of the sixth lens element to the object-side surface of the seventh lens element along the optical axis is represented by G67, a thickness of the fourth lens element along the optical axis is represented by T4, a distance from the image-side surface of the fourth lens element to the object-side surface of the fifth lens element along the optical axis is represented by G45, and D21t32, T6, G67, T4 and G45 satisfy the inequality:

$$(D21t32+T6+G67)/(T4+G45) \leq 3.300.$$

8. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:

the third lens element has positive refracting power;

an optical axis region of the image-side surface of the fourth lens element is concave, and a periphery region of the image-side surface of the fourth lens element is convex;

an optical axis region of the image-side surface of the fifth lens element is concave;

the sixth lens element has positive refracting power, and an optical axis region of the object-side surface of the sixth lens element is concave;

the seventh lens element has positive refracting power;

lens elements of the optical imaging lens are only the eight lens elements describe above; and a f-number of the optical imaging lens is represented by Fno, a distance from the image-side surface of the first lens element to the image-side surface of the third lens element along the optical axis is represented by D12t32, a distance from the object-side surface of the fourth lens element to the image-side surface of the fifth lens element along the optical axis is represented by D41t52, a thickness of the first lens element along the optical axis is represented by T1, a distance from the image-side surface of the third lens element to the object-side surface of the fourth lens element along the optical axis is represented by G34, and the optical imaging lens satisfies the inequality:

$$\text{Fno}*(D12t32+D41t52)/(T1+G34) \leq 3.600.$$

9. The optical imaging lens according to claim 8, wherein an entrance pupil diameter of the optical imaging lens is represented by EPD, an image height of the optical imaging lens is represented by ImgH, a sum of the thicknesses of all eight lens elements along the optical axis is represented by ALT, and EPD, ImgH and ALT satisfy the inequality:

$$(\text{EPD}+\text{ImgH})/\text{ALT} \geq 1.800.$$

10. The optical imaging lens according to claim 8, wherein a thickness of the sixth lens element along the optical axis is represented by T6, a distance from the image-side surface of the sixth lens element to the object-side surface of the seventh lens element along the optical axis is represented by G67, a distance from the image-side surface of the seventh lens element to the object-side surface of the eighth lens element along the optical axis is represented by G78, a thickness of the eighth lens element along the optical axis is represented by T8, and T6, G67, G78 and T8 satisfy the inequality:

$$(T6+G67+G78)/T8 \leq 4.500.$$

11. The optical imaging lens according to claim 8, wherein a distance from the image-side surface of the first lens element to the object-side surface of the second lens element along the optical axis is represented by G12, a distance from the object-side surface of the second lens element to the image-side surface of the third lens element along the optical axis is represented by D21t32, a thickness of the fourth lens element along the optical axis is represented by T4, and G12, D21t32 and T4 satisfy the inequality:

$$(G12+D21t32)/T4 \leq 3.600.$$

12. The optical imaging lens according to claim 8, wherein a distance from the object-side surface of the second lens element to the image-side surface of the third lens element along the optical axis is represented by D21t32, a distance from the image-side surface of the fourth lens element to the object-side surface of the fifth lens element along the optical axis is represented by G45, and D21t32 and G45 satisfy the inequality:

$$D21t32/G45 \leq 5.600.$$

13. The optical imaging lens according to claim 8, wherein a thickness of the fifth lens element along the optical axis is represented by T5, a thickness of the sixth lens element along the optical axis is represented by T6, a distance from the image-side surface of the fifth lens element to the object-side surface of the sixth lens element along the optical axis is represented by G56, and T5, T6 and G56 satisfy the inequality:

$$(T5+T6)/G56 \leq 4.900.$$

14. The optical imaging lens according to claim 8, wherein an Abbe number of the fifth lens element is represented by V5, an Abbe number of the sixth lens element is represented by V6, and V5 and V6 satisfy the inequality:

$$V5+V6 \leq 100.000.$$

15. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:
  the third lens element has positive refracting power, and a periphery region of the object-side surface of the third lens element is convex;
  an optical axis region of the object-side surface of the fourth lens element is convex, and a periphery region of the image-side surface of the fourth lens element is convex;
  an optical axis region of the object-side surface of the fifth lens element is convex, and an optical axis region of the image-side surface of the fifth lens element is concave;
  an optical axis region of the object-side surface of the sixth lens element is concave;
  an optical axis region of the image-side surface of the seventh lens element is concave;
  lens elements of the optical imaging lens are only the eight lens elements describe above; and
  a f-number of the optical imaging lens is represented by Fno, a distance from the image-side surface of the first lens element to the image-side surface of the third lens element along the optical axis is represented by D12t32, a distance from the object-side surface of the fourth lens element to the image-side surface of the fifth lens element along the optical axis is represented by D41t52, a thickness of the first lens element along the optical axis is represented by T1, a distance from the image-side surface of the third lens element to the object-side surface of the fourth lens element along the optical axis is represented by G34, and the optical imaging lens satisfies the inequality:

$$Fno*(D12t32+D41t52)/(T1+G34) \leq 3.300.$$

16. The optical imaging lens according to claim 15, wherein an Abbe number of the third lens element is represented by V3, an Abbe number of the fourth lens element is represented by V4, and V3 and V4 satisfy the inequality:

$$V3+V4 \leq 100.000.$$

17. The optical imaging lens according to claim 15, wherein an Abbe number of the fourth lens element is represented by V4, an Abbe number of the seventh lens element is represented by V7, and V4 and V7 satisfy the inequality:

$$V4+V7 \leq 100.000.$$

18. The optical imaging lens according to claim 15, wherein a distance from the object-side surface of the first lens element to the image-side surface of the eighth lens element along the optical axis is represented by TL, an entrance pupil diameter of the optical imaging lens is represented by EPD, and TL and EPD satisfy the inequality:

$$TL/EPD \leq 2.000.$$

19. The optical imaging lens according to claim 15, wherein an effective focal length of the optical imaging lens is represented by EFL, and EFL, T1 and G34 satisfy the inequality:

$$EFL/(T1+G34) \leq 5.500.$$

20. The optical imaging lens according to claim 15, wherein a thickness of the second lens element along the optical axis is represented by T2, a thickness of the third lens element along the optical axis is represented by T3, a thickness of the fifth lens element along the optical axis is represented by T5, a thickness of the sixth lens element along the optical axis is represented by T6, a distance from the image-side surface of the seventh lens element to the object-side surface of the eighth lens element along the optical axis is represented by G78, a distance from the image-side surface of the eighth lens element to an image plane along the optical axis is represented by BFL, a sum of seven air gaps between the first lens element and the eighth lens element along the optical axis is represented by AAG, and Fno, T2, T3, T, T6, G78, BFL and AAG satisfy the inequality:

$$Fno*(T2+T3+T5+T6+G78+BFL)/AAG-2.900.$$

\* \* \* \* \*